US008874489B2

(12) United States Patent
Abhyanker

(10) Patent No.: US 8,874,489 B2
(45) Date of Patent: Oct. 28, 2014

(54) SHORT-TERM RESIDENTIAL SPACES IN A GEO-SPATIAL ENVIRONMENT

(71) Applicant: Raj V. Abhyanker, Cupertino, CA (US)

(72) Inventor: Raj V. Abhyanker, Cupertino, CA (US)

(73) Assignee: Fatdoor, Inc., Palo Alto, CA (US)

( * ) Notice: Subject to any disclaimer, the term of this patent is extended or adjusted under 35 U.S.C. 154(b) by 0 days.

(21) Appl. No.: 14/102,474

(22) Filed: Dec. 10, 2013

(65) Prior Publication Data

US 2014/0100900 A1 Apr. 10, 2014

Related U.S. Application Data

(63) Continuation-in-part of application No. 11/653,194, filed on Jan. 12, 2007, and a continuation-in-part of (Continued)

(51) Int. Cl.
| | |
|---|---|
| *G06Q 10/00* | (2012.01) |
| *G06Q 50/00* | (2012.01) |
| *G06Q 10/02* | (2012.01) |
| *H04W 64/00* | (2009.01) |
| *G06Q 30/02* | (2012.01) |
| *G06Q 10/08* | (2012.01) |
| *G06Q 10/10* | (2012.01) |

(52) U.S. Cl.
CPC ............... *G06Q 50/01* (2013.01); *G06Q 10/02* (2013.01); *H04W 64/003* (2013.01); *G06Q 30/0261* (2013.01); *G06Q 10/087* (2013.01); *G06Q 10/10* (2013.01); *G06Q 30/02* (2013.01)
USPC .......................... 705/319; 705/14.58; 705/28

(58) Field of Classification Search
CPC ........ G06Q 50/01; G06Q 10/02; G06F 21/31; G06F 3/0484; H04L 67/306; H04W 4/021; H04W 48/08
See application file for complete search history.

(56) References Cited

U.S. PATENT DOCUMENTS

| | | | |
|---|---|---|---|
| 2,035,218 A | 3/1936 | Bloom | |
| 5,032,989 A * | 7/1991 | Tornetta | 705/313 |

(Continued)

FOREIGN PATENT DOCUMENTS

| | | | | |
|---|---|---|---|---|
| EP | 1176840 A1 * | 1/2002 | | H04Q 7/22 |
| EP | 1426876 A1 | 6/2004 | | |

(Continued)

OTHER PUBLICATIONS

Airbnb screenshots from webarchive Aug. 6, 2013; Sep. 1, 2013; Oct. 23, 2013; Oct. 31, 2013 & Nov. 1, 2013. 21 pages.*

(Continued)

*Primary Examiner* — Brett Feeney
(74) *Attorney, Agent, or Firm* — Raj Abhyanker, P.C.

(57) ABSTRACT

Disclosed are a method, a device and a system of short-term residential spaces in a geo-spatial environment. In one embodiment, a method of a short-term listing server comprises validating that a place-to-stay listing data is associated with a verified user of the short-term listing server using a processor and a memory, verifying that a set of geospatial coordinates associated with the place-to-stay listing data are trusted based on a claimed geospatial location of the verified user of the short-term listing server, determining that a time stamp associated with a creation date and a creation time of the place-to-stay listing data is trusted based the claimed geospatial location of the verified user of the short-term listing server, and processing a payment associated with a renter of a space in a private residential home associated with the place-to-stay listing data through the short-term listing server.

9 Claims, 35 Drawing Sheets

Related U.S. Application Data application No. 11/827,774, filed on Jul. 13, 2007, now abandoned, and a continuation-in-part of application No. 13/236,964, filed on Sep. 20, 2011, now abandoned, and a continuation-in-part of application No. 13/242,303, filed on Sep. 23, 2011, now abandoned, and a continuation-in-part of application No. 13/272,245, filed on Oct. 13, 2011, now Pat. No. 8,660,897, and a continuation-in-part of application No. 14/079,611, filed on Nov. 13, 2013, and a continuation-in-part of application No. 14/089,779, filed on Nov. 26, 2013, which is a continuation-in-part of application No. 11/603,442, filed on Nov. 22, 2006, now abandoned.

(60) Provisional application No. 61/894,443, filed on Oct. 23, 2013, provisional application No. 61/526,693, filed on Aug. 24, 2011, provisional application No. 60/783,226, filed on Mar. 17, 2006, provisional application No. 60/817,470, filed on Jun. 28, 2006, provisional application No. 60/853,499, filed on Oct. 19, 2006, provisional application No. 60/854,230, filed on Oct. 25, 2006.

(56) References Cited

U.S. PATENT DOCUMENTS

| | | | | |
|---|---|---|---|---|
| 5,325,294 | A | 6/1994 | Keene | |
| 5,581,630 | A * | 12/1996 | Bonneau, Jr. | 382/116 |
| 5,584,025 | A * | 12/1996 | Keithley et al. | 707/752 |
| 5,590,062 | A | 12/1996 | Nagamitsu et al. | |
| 5,671,342 | A * | 9/1997 | Millier et al. | 345/418 |
| 5,805,810 | A | 9/1998 | Maxwell | |
| 5,831,664 | A * | 11/1998 | Wharton et al. | 725/81 |
| 5,905,499 | A | 5/1999 | McDowall et al. | |
| 5,926,765 | A * | 7/1999 | Sasaki | 455/456.1 |
| 5,930,474 | A * | 7/1999 | Dunworth et al. | 709/217 |
| 5,940,806 | A | 8/1999 | Danial | |
| 6,024,288 | A | 2/2000 | Gottlich et al. | |
| 6,034,618 | A | 3/2000 | Tatebayashi et al. | |
| 6,036,601 | A | 3/2000 | Heckel | |
| 6,047,194 | A | 4/2000 | Andersson | |
| 6,088,702 | A * | 7/2000 | Plantz et al. | 1/1 |
| 6,229,533 | B1 | 5/2001 | Farmer et al. | |
| 6,308,177 | B1 | 10/2001 | Israni et al. | |
| 6,317,718 | B1 * | 11/2001 | Fano | 705/14.39 |
| 6,336,111 | B1 | 1/2002 | Ashby et al. | |
| 6,401,085 | B1 | 6/2002 | Gershman et al. | |
| 6,408,307 | B1 * | 6/2002 | Semple et al. | 707/724 |
| 6,498,982 | B2 | 12/2002 | Bellesfield et al. | |
| 6,532,007 | B1 | 3/2003 | Matsuda | |
| 6,542,813 | B1 * | 4/2003 | Kovacs | 701/484 |
| 6,557,013 | B1 | 4/2003 | Ziff et al. | |
| 6,615,039 | B1 | 9/2003 | Eldering | |
| 6,629,136 | B1 * | 9/2003 | Naidoo | 709/219 |
| 6,636,803 | B1 * | 10/2003 | Hartz et al. | 701/459 |
| 6,643,663 | B1 | 11/2003 | Dabney et al. | |
| 6,647,383 | B1 | 11/2003 | August et al. | |
| 6,654,800 | B1 * | 11/2003 | Rieger, III | 709/223 |
| 6,658,410 | B1 * | 12/2003 | Sakamaki et al. | 1/1 |
| 6,662,016 | B1 | 12/2003 | Buckham et al. | |
| 6,684,196 | B1 * | 1/2004 | Mini et al. | 705/14.34 |
| 6,691,114 | B1 * | 2/2004 | Nakamura | 1/1 |
| 6,711,414 | B1 | 3/2004 | Lightman et al. | |
| 6,716,101 | B1 | 4/2004 | Meadows et al. | |
| 6,719,570 | B2 | 4/2004 | Tsuchioka | |
| 6,721,748 | B1 | 4/2004 | Knight et al. | |
| 6,745,196 | B1 * | 6/2004 | Colyer et al. | 707/608 |
| 6,798,407 | B1 | 9/2004 | Benman | |
| 6,834,229 | B2 | 12/2004 | Rafiah et al. | |
| 6,882,307 | B1 | 4/2005 | Gifford | |
| 6,950,791 | B1 | 9/2005 | Bray et al. | |
| 6,968,179 | B1 * | 11/2005 | De Vries | 455/414.1 |
| 6,968,513 | B1 * | 11/2005 | Rinebold et al. | 715/854 |
| 6,987,976 | B2 | 1/2006 | Kohar et al. | |
| 7,006,881 | B1 | 2/2006 | Hoffberg et al. | |
| 7,024,455 | B2 | 4/2006 | Yokobori et al. | |
| 7,080,019 | B1 * | 7/2006 | Hurzeler | 705/6 |
| 7,080,096 | B1 | 7/2006 | Imamura | |
| 7,085,650 | B2 * | 8/2006 | Anderson | 702/2 |
| 7,136,915 | B2 * | 11/2006 | Rieger, III | 709/223 |
| 7,158,878 | B2 * | 1/2007 | Rasmussen et al. | 701/431 |
| 7,174,301 | B2 * | 2/2007 | Florance et al. | 705/313 |
| 7,177,872 | B2 | 2/2007 | Schwesig et al. | |
| 7,188,153 | B2 | 3/2007 | Lunt et al. | |
| 7,251,647 | B2 | 7/2007 | Hoblit | |
| 7,293,019 | B2 | 11/2007 | Dumais et al. | |
| 7,296,026 | B2 | 11/2007 | Patrick et al. | |
| 7,353,034 | B2 * | 4/2008 | Haney | 455/457 |
| 7,359,871 | B1 | 4/2008 | Paasche et al. | |
| 7,383,251 | B2 | 6/2008 | Might | |
| 7,386,542 | B2 | 6/2008 | Maybury et al. | |
| 7,424,438 | B2 | 9/2008 | Vianello | |
| 7,433,832 | B1 | 10/2008 | Bezos et al. | |
| 7,433,868 | B1 | 10/2008 | Satomi et al. | |
| 7,437,368 | B1 | 10/2008 | Kolluri et al. | |
| 7,441,031 | B2 * | 10/2008 | Shrinivasan et al. | 709/225 |
| 7,447,685 | B2 * | 11/2008 | Nye | 1/1 |
| 7,447,771 | B1 | 11/2008 | Taylor | |
| 7,477,285 | B1 | 1/2009 | Johnson | |
| 7,478,324 | B1 | 1/2009 | Ohtsu | |
| 7,487,114 | B2 * | 2/2009 | Florance et al. | 705/27.2 |
| 7,493,261 | B2 | 2/2009 | Chen et al. | |
| 7,505,919 | B2 | 3/2009 | Richardson | |
| 7,562,023 | B2 | 7/2009 | Yamamoto | |
| 7,584,110 | B2 | 9/2009 | Robertson | |
| 7,587,276 | B2 | 9/2009 | Gold et al. | |
| 7,680,673 | B2 * | 3/2010 | Wheeler | 705/313 |
| 7,801,542 | B1 * | 9/2010 | Stewart | 455/518 |
| 7,812,717 | B1 * | 10/2010 | Cona et al. | 340/506 |
| 7,827,120 | B1 * | 11/2010 | Evans et al. | 705/344 |
| 7,958,011 | B1 * | 6/2011 | Cretney et al. | 705/26.1 |
| 7,966,567 | B2 * | 6/2011 | Abhyanker | 715/757 |
| 8,051,089 | B2 | 11/2011 | Gargi et al. | |
| 8,064,590 | B2 * | 11/2011 | Abhyanker | 379/266.07 |
| 8,073,907 | B2 * | 12/2011 | Roumeliotis et al. | 709/204 |
| 8,095,430 | B2 * | 1/2012 | Abhyanker | 705/26.41 |
| 8,149,113 | B2 * | 4/2012 | Diem | 340/539.13 |
| 8,190,357 | B2 * | 5/2012 | Abhyanker et al. | 701/408 |
| 8,204,776 | B2 * | 6/2012 | Abhyanker | 705/7.32 |
| 8,228,196 | B1 | 7/2012 | Thornton | |
| 8,364,507 | B2 | 1/2013 | Norrid | |
| 8,433,609 | B2 * | 4/2013 | Abhyanker | 705/14.1 |
| 8,433,650 | B1 * | 4/2013 | Thomas | 705/38 |
| 8,447,810 | B2 * | 5/2013 | Roumeliotis et al. | 709/204 |
| 8,660,897 | B2 * | 2/2014 | Abhyanker | 705/14.64 |
| 2001/0005829 | A1 * | 6/2001 | Raveis, Jr. | 705/1 |
| 2001/0020955 | A1 | 9/2001 | Nakagawa et al. | |
| 2001/0029501 | A1 * | 10/2001 | Yokobori et al. | 707/10 |
| 2001/0036833 | A1 | 11/2001 | Koshima et al. | |
| 2001/0042087 | A1 | 11/2001 | Kephart et al. | |
| 2001/0049616 | A1 | 12/2001 | Khuzadi et al. | |
| 2001/0049636 | A1 | 12/2001 | Hudda et al. | |
| 2002/0026388 | A1 | 2/2002 | Roebuck | |
| 2002/0030689 | A1 | 3/2002 | Eichel et al. | |
| 2002/0038225 | A1 | 3/2002 | Klasky et al. | |
| 2002/0049617 | A1 | 4/2002 | Lencki et al. | |
| 2002/0065691 | A1 * | 5/2002 | Twig et al. | 705/7 |
| 2002/0065739 | A1 | 5/2002 | Florance et al. | 705/26 |
| 2002/0070967 | A1 * | 6/2002 | Tanner et al. | 345/764 |
| 2002/0077901 | A1 | 6/2002 | Katz | |
| 2002/0078171 | A1 | 6/2002 | Schneider | |
| 2002/0087506 | A1 | 7/2002 | Reddy | |
| 2002/0090996 | A1 | 7/2002 | Maehiro | |
| 2002/0091556 | A1 | 7/2002 | Fiala et al. | |
| 2002/0097267 | A1 | 7/2002 | Dinan et al. | |
| 2002/0103892 | A1 * | 8/2002 | Rieger, III | 709/223 |
| 2002/0128926 | A1 | 9/2002 | Ohrn | |
| 2002/0130906 | A1 * | 9/2002 | Miyaki | 345/837 |
| 2002/0147638 | A1 | 10/2002 | Banerjee et al. | |
| 2002/0156917 | A1 | 10/2002 | Nye | |
| 2002/0169662 | A1 | 11/2002 | Claiborne | |

(56) References Cited

U.S. PATENT DOCUMENTS

| | | | |
|---|---|---|---|
| 2002/0184496 A1 | 12/2002 | Mitchell et al. | |
| 2003/0004802 A1 | 1/2003 | Callegari | |
| 2003/0005035 A1 | 1/2003 | Rodgers | |
| 2003/0018521 A1* | 1/2003 | Kraft et al. | 705/14 |
| 2003/0023489 A1 | 1/2003 | McGuire et al. | |
| 2003/0023586 A1* | 1/2003 | Knorr | 707/3 |
| 2003/0033176 A1* | 2/2003 | Hancock | 705/6 |
| 2003/0055690 A1 | 3/2003 | Garback | |
| 2003/0064705 A1* | 4/2003 | Desiderio | 455/412 |
| 2003/0078897 A1* | 4/2003 | Florance et al. | 705/80 |
| 2003/0154213 A1* | 8/2003 | Ahn | 707/103 X |
| 2003/0177019 A1* | 9/2003 | Santos et al. | 705/1 |
| 2003/0177192 A1 | 9/2003 | Umeki et al. | |
| 2003/0200192 A1* | 10/2003 | Bell et al. | 707/1 |
| 2003/0218253 A1 | 11/2003 | Avanzino et al. | |
| 2003/0220807 A1* | 11/2003 | Hoffman et al. | 705/1 |
| 2004/0002871 A1* | 1/2004 | Geranio | 705/1 |
| 2004/0021584 A1* | 2/2004 | Hartz et al. | 340/995.24 |
| 2004/0030525 A1 | 2/2004 | Robinson et al. | |
| 2004/0030741 A1 | 2/2004 | Wolton et al. | |
| 2004/0039581 A1* | 2/2004 | Wheeler | 705/1 |
| 2004/0054428 A1* | 3/2004 | Sheha et al. | 700/56 |
| 2004/0109012 A1 | 6/2004 | Kraus et al. | |
| 2004/0111302 A1 | 6/2004 | Falk et al. | |
| 2004/0128215 A1* | 7/2004 | Florance et al. | 705/28 |
| 2004/0135805 A1 | 7/2004 | Gottsacker et al. | |
| 2004/0139049 A1* | 7/2004 | Hancock et al. | 707/1 |
| 2004/0153466 A1* | 8/2004 | Ziff et al. | 707/100 |
| 2004/0158488 A1* | 8/2004 | Johnson | 705/14 |
| 2004/0162064 A1* | 8/2004 | Himmelstein | 455/422.1 |
| 2004/0166878 A1 | 8/2004 | Erskine et al. | |
| 2004/0167787 A1 | 8/2004 | Lynch et al. | |
| 2004/0186766 A1 | 9/2004 | Fellenstein et al. | |
| 2004/0215559 A1 | 10/2004 | Rebenack et al. | |
| 2004/0217884 A1 | 11/2004 | Samadani et al. | |
| 2004/0217980 A1 | 11/2004 | Radburn et al. | |
| 2004/0220906 A1* | 11/2004 | Gargi et al. | 707/3 |
| 2004/0257340 A1 | 12/2004 | Jawerth | |
| 2004/0260604 A1* | 12/2004 | Bedingfield, Sr. | 705/14 |
| 2005/0018177 A1 | 1/2005 | Rosenberg et al. | |
| 2005/0021750 A1* | 1/2005 | Abrams | 709/225 |
| 2005/0027723 A1 | 2/2005 | Jones et al. | |
| 2005/0034075 A1* | 2/2005 | Riegelman et al. | 715/714 |
| 2005/0044061 A1 | 2/2005 | Klemow | |
| 2005/0049971 A1* | 3/2005 | Bettinger | 705/51 |
| 2005/0055353 A1* | 3/2005 | Marx et al. | 707/10 |
| 2005/0091027 A1 | 4/2005 | Zaher et al. | |
| 2005/0096977 A1 | 5/2005 | Rossides | |
| 2005/0114783 A1* | 5/2005 | Szeto | 715/747 |
| 2005/0131761 A1 | 6/2005 | Trika et al. | |
| 2005/0137015 A1 | 6/2005 | Rogers et al. | |
| 2005/0143174 A1 | 6/2005 | Goldman et al. | |
| 2005/0149432 A1* | 7/2005 | Galey | 705/38 |
| 2005/0171832 A1 | 8/2005 | Hull et al. | |
| 2005/0171954 A1 | 8/2005 | Hull et al. | |
| 2005/0187823 A1 | 8/2005 | Howes | |
| 2005/0192859 A1 | 9/2005 | Mertins et al. | |
| 2005/0192912 A1 | 9/2005 | Bator et al. | |
| 2005/0192999 A1 | 9/2005 | Cook et al. | |
| 2005/0197775 A1* | 9/2005 | Smith | 702/3 |
| 2005/0197846 A1* | 9/2005 | Pezaris et al. | 705/1 |
| 2005/0203768 A1* | 9/2005 | Florance et al. | 705/1 |
| 2005/0216186 A1 | 9/2005 | Dorfman et al. | |
| 2005/0235062 A1* | 10/2005 | Lunt et al. | 709/225 |
| 2005/0240580 A1 | 10/2005 | Zamir et al. | |
| 2005/0251331 A1* | 11/2005 | Kreft | 701/207 |
| 2005/0273346 A1* | 12/2005 | Frost | 705/1 |
| 2005/0283497 A1 | 12/2005 | Nurminen et al. | |
| 2005/0288957 A1* | 12/2005 | Eraker et al. | 705/1 |
| 2005/0288958 A1* | 12/2005 | Eraker et al. | 705/1 |
| 2006/0004703 A1 | 1/2006 | Spivack et al. | |
| 2006/0004734 A1 | 1/2006 | Malkin et al. | |
| 2006/0022048 A1* | 2/2006 | Johnson | 235/462.1 |
| 2006/0023881 A1 | 2/2006 | Akiyama et al. | |
| 2006/0036748 A1* | 2/2006 | Nusbaum et al. | 709/228 |
| 2006/0089882 A1 | 4/2006 | Shimansky | |
| 2006/0123053 A1 | 6/2006 | Scannell | |
| 2006/0136127 A1* | 6/2006 | Coch et al. | 701/208 |
| 2006/0136419 A1* | 6/2006 | Brydon et al. | 707/9 |
| 2006/0149624 A1 | 7/2006 | Baluja et al. | |
| 2006/0178972 A1 | 8/2006 | Jung et al. | |
| 2006/0190279 A1* | 8/2006 | Heflin | 705/1 |
| 2006/0200311 A1* | 9/2006 | Arutunian et al. | 701/210 |
| 2006/0200384 A1* | 9/2006 | Arutunian et al. | 705/14 |
| 2006/0238383 A1* | 10/2006 | Kimchi et al. | 340/995.1 |
| 2006/0248573 A1* | 11/2006 | Pannu et al. | 726/1 |
| 2006/0270421 A1* | 11/2006 | Phillips et al. | 455/457 |
| 2007/0002057 A1 | 1/2007 | Danzig et al. | |
| 2007/0003182 A1 | 1/2007 | Hunn | |
| 2007/0011148 A1 | 1/2007 | Burkey et al. | |
| 2007/0011617 A1 | 1/2007 | Akagawa et al. | |
| 2007/0033064 A1 | 2/2007 | Abrahamsohn | |
| 2007/0078747 A1* | 4/2007 | Baack | 705/37 |
| 2007/0105536 A1* | 5/2007 | Tingo | 455/414.1 |
| 2007/0106627 A1 | 5/2007 | Srivastava et al. | |
| 2007/0112729 A1* | 5/2007 | Wiseman et al. | 707/3 |
| 2007/0150375 A1 | 6/2007 | Yang | |
| 2007/0150603 A1 | 6/2007 | Crull et al. | |
| 2007/0156429 A1* | 7/2007 | Godar | 705/1 |
| 2007/0162547 A1* | 7/2007 | Ross | 709/204 |
| 2007/0162942 A1* | 7/2007 | Hamynen et al. | 725/105 |
| 2007/0167204 A1 | 7/2007 | Lyle et al. | |
| 2007/0208802 A1* | 9/2007 | Barman et al. | 709/203 |
| 2007/0218900 A1* | 9/2007 | Abhyanker | 455/435.1 |
| 2007/0219659 A1* | 9/2007 | Abhyanker et al. | 700/98 |
| 2007/0219712 A1* | 9/2007 | Abhyanker | 701/208 |
| 2007/0220174 A1* | 9/2007 | Abhyanker | 709/250 |
| 2007/0233291 A1 | 10/2007 | Herde et al. | |
| 2007/0233367 A1* | 10/2007 | Chen et al. | 701/207 |
| 2007/0233375 A1 | 10/2007 | Garg et al. | |
| 2007/0233582 A1* | 10/2007 | Abhyanker | 705/28 |
| 2007/0239552 A1* | 10/2007 | Sundaresan | 705/26 |
| 2007/0245002 A1* | 10/2007 | Nguyen et al. | 709/223 |
| 2007/0250321 A1 | 10/2007 | Balusu | |
| 2007/0260599 A1* | 11/2007 | McGuire et al. | 707/5 |
| 2007/0266097 A1* | 11/2007 | Harik et al. | 709/204 |
| 2007/0273558 A1 | 11/2007 | Smith et al. | |
| 2007/0281689 A1* | 12/2007 | Altman et al. | 455/435.1 |
| 2007/0288621 A1 | 12/2007 | Gundu et al. | |
| 2007/0294357 A1* | 12/2007 | Antoine | 709/206 |
| 2008/0005231 A1 | 1/2008 | Kelley et al. | |
| 2008/0020814 A1 | 1/2008 | Kernene | |
| 2008/0032666 A1* | 2/2008 | Hughes et al. | 455/404.1 |
| 2008/0032703 A1 | 2/2008 | Krumm et al. | |
| 2008/0051932 A1 | 2/2008 | Jermyn et al. | |
| 2008/0070593 A1* | 3/2008 | Altman et al. | 455/457 |
| 2008/0071929 A1 | 3/2008 | Motte et al. | |
| 2008/0077642 A1* | 3/2008 | Carbone et al. | 707/E17.14 |
| 2008/0086368 A1 | 4/2008 | Bauman et al. | |
| 2008/0091723 A1 | 4/2008 | Zuckerberg et al. | |
| 2008/0097999 A1* | 4/2008 | Horan | 707/10 |
| 2008/0104227 A1* | 5/2008 | Birnie et al. | 709/224 |
| 2008/0115082 A1 | 5/2008 | Simmons et al. | |
| 2008/0117928 A1* | 5/2008 | Abhyanker | 370/431 |
| 2008/0126355 A1 | 5/2008 | Rowley | |
| 2008/0126476 A1 | 5/2008 | Nicholas et al. | |
| 2008/0126478 A1 | 5/2008 | Ferguson et al. | |
| 2008/0148156 A1* | 6/2008 | Brewer et al. | 715/738 |
| 2008/0154733 A1 | 6/2008 | Wolfe | |
| 2008/0155019 A1 | 6/2008 | Wallace et al. | |
| 2008/0162211 A1 | 7/2008 | Addington | |
| 2008/0162260 A1 | 7/2008 | Rohan et al. | |
| 2008/0168068 A1* | 7/2008 | Hutheesing | 707/10 |
| 2008/0168175 A1* | 7/2008 | Tran | 709/229 |
| 2008/0172173 A1* | 7/2008 | Chang et al. | 701/207 |
| 2008/0172288 A1 | 7/2008 | Pilskalns et al. | |
| 2008/0201156 A1* | 8/2008 | Abhyanker | 705/1 |
| 2008/0208956 A1 | 8/2008 | Spiridellis et al. | |
| 2008/0215994 A1 | 9/2008 | Harrison et al. | |
| 2008/0221846 A1 | 9/2008 | Aggarwal et al. | |
| 2008/0221984 A1* | 9/2008 | Abhyanker | 705/14 |
| 2008/0222308 A1* | 9/2008 | Abhyanker | 709/245 |
| 2008/0228719 A1* | 9/2008 | Abhyanker et al. | 707/3 |
| 2008/0228775 A1* | 9/2008 | Abhyanker et al. | 707/10 |

(56) References Cited

U.S. PATENT DOCUMENTS

| | | | |
|---|---|---|---|
| 2008/0229424 A1* | 9/2008 | Harris et al. ................... 726/26 |
| 2008/0231630 A1 | 9/2008 | Shenkar et al. |
| 2008/0240397 A1* | 10/2008 | Abhyanker ............. 379/218.01 |
| 2008/0242317 A1* | 10/2008 | Abhyanker ................ 455/456.3 |
| 2008/0243598 A1* | 10/2008 | Abhyanker .................... 705/12 |
| 2008/0243667 A1 | 10/2008 | Lecomte |
| 2008/0250025 A1* | 10/2008 | Abhyanker .................... 707/10 |
| 2008/0255759 A1* | 10/2008 | Abhyanker .................... 701/209 |
| 2008/0263460 A1 | 10/2008 | Altberg et al. |
| 2008/0270158 A1* | 10/2008 | Abhyanker ..................... 705/1 |
| 2008/0270945 A1* | 10/2008 | Abhyanker ................... 715/848 |
| 2008/0281854 A1* | 11/2008 | Abhyanker ................... 707/102 |
| 2008/0288277 A1 | 11/2008 | Fasciano |
| 2008/0294678 A1* | 11/2008 | Gorman et al. ............. 707/102 |
| 2008/0294747 A1* | 11/2008 | Abhyanker ................... 709/218 |
| 2008/0300979 A1* | 12/2008 | Abhyanker .................... 705/14 |
| 2008/0301565 A1* | 12/2008 | Abhyanker ................... 715/744 |
| 2008/0306754 A1* | 12/2008 | Abhyanker ..................... 705/1 |
| 2008/0307053 A1 | 12/2008 | Mitnick et al. |
| 2008/0307066 A1 | 12/2008 | Amidon et al. |
| 2008/0307320 A1 | 12/2008 | Payne et al. |
| 2008/0319778 A1* | 12/2008 | Abhyanker ..................... 705/1 |
| 2008/0319806 A1* | 12/2008 | Abhyanker ..................... 705/5 |
| 2009/0003265 A1 | 1/2009 | Agarwal et al. |
| 2009/0006177 A1 | 1/2009 | Beaver et al. |
| 2009/0006473 A1 | 1/2009 | Elliott et al. |
| 2009/0007195 A1 | 1/2009 | Beyabani |
| 2009/0015582 A1* | 1/2009 | Abhyanker ................... 345/419 |
| 2009/0018850 A1* | 1/2009 | Abhyanker ..................... 705/1 |
| 2009/0018925 A1* | 1/2009 | Abhyanker .................... 705/26 |
| 2009/0019004 A1* | 1/2009 | Abhyanker ..................... 707/3 |
| 2009/0019085 A1* | 1/2009 | Abhyanker ................ 707/104.1 |
| 2009/0019122 A1* | 1/2009 | Abhyanker ................... 709/206 |
| 2009/0019366 A1* | 1/2009 | Abhyanker ................... 715/706 |
| 2009/0019373 A1* | 1/2009 | Abhyanker ................... 715/751 |
| 2009/0024740 A1* | 1/2009 | Abhyanker ................... 709/225 |
| 2009/0030927 A1 | 1/2009 | Cases et al. |
| 2009/0031006 A1 | 1/2009 | Johnson |
| 2009/0031245 A1 | 1/2009 | Brezina et al. |
| 2009/0043650 A1* | 2/2009 | Abhyanker et al. .............. 705/14 |
| 2009/0044254 A1 | 2/2009 | Tian |
| 2009/0061883 A1* | 3/2009 | Abhyanker .................... 455/445 |
| 2009/0061902 A1* | 3/2009 | Abhyanker ................ 455/456.3 |
| 2009/0063252 A1* | 3/2009 | Abhyanker .................... 705/10 |
| 2009/0063467 A1* | 3/2009 | Abhyanker ..................... 707/5 |
| 2009/0063500 A1 | 3/2009 | Zhai et al. |
| 2009/0063565 A1* | 3/2009 | Abhyanker ................ 707/104.1 |
| 2009/0064011 A1* | 3/2009 | Abhyanker ................... 715/764 |
| 2009/0064144 A1* | 3/2009 | Abhyanker ................... 718/100 |
| 2009/0069034 A1* | 3/2009 | Abhyanker ................ 455/456.3 |
| 2009/0070435 A1* | 3/2009 | Abhyanker ................... 709/218 |
| 2009/0228305 A1 | 9/2009 | Gustafsson et al. |
| 2009/0254971 A1 | 10/2009 | Herz et al. |
| 2009/0284530 A1 | 11/2009 | Lester et al. |
| 2010/0024045 A1 | 1/2010 | Sastry et al. |
| 2010/0079338 A1 | 4/2010 | Wooden et al. |
| 2011/0066648 A1* | 3/2011 | Abhyanker et al. .......... 707/770 |
| 2011/0093340 A1 | 4/2011 | Kramer et al. |
| 2011/0184643 A1* | 7/2011 | Abhyanker ................... 701/201 |
| 2011/0219318 A1* | 9/2011 | Abhyanker ................... 715/757 |
| 2011/0291851 A1* | 12/2011 | Whisenant ................... 340/686.1 |
| 2012/0166935 A1* | 6/2012 | Abhyanker ................... 715/234 |
| 2012/0232958 A1 | 9/2012 | Silbert |
| 2013/0041761 A1 | 2/2013 | Voda |
| 2013/0054317 A1* | 2/2013 | Abhyanker ................... 705/14.4 |
| 2013/0072114 A1* | 3/2013 | Abhyanker ................... 455/41.1 |
| 2013/0073375 A1* | 3/2013 | Abhyanker ................. 705/14.39 |
| 2013/0080217 A1* | 3/2013 | Abhyanker ................... 705/14.1 |
| 2013/0174769 A1 | 7/2013 | Aharonian |

FOREIGN PATENT DOCUMENTS

| | | | | |
|---|---|---|---|---|
| WO | WO 02063853 A2 | * | 8/2002 | |
| WO | WO 2004111754 A2 | * | 12/2004 | |
| WO | WO 2004111754 A3 | * | 2/2005 | |
| WO | 2006020471 A1 | | 2/2006 | |
| WO | 2007113844 A1 | | 10/2007 | |
| WO | WO 2008100938 A2 | * | 8/2008 | ............. G06F 17/30 |

OTHER PUBLICATIONS

Airbnb map screenshot from 04/1/04/2014. 1 page map.*

* cited by examiner

| USER 106 | VERIFIED FIELD? 2002 | RANGE FIELD 2004 | PRINCIPAL ADDRESS FIELD 2006 | RENTAL FIELD 2008 | HOST REVIEWS 2010 | RENTER REVIEWS 2012 |
|---|---|---|---|---|---|---|
| JOE | YES | 5 MILES | 500 CLIFFORD, CUPERTINO CA | 859, BETTE, 854 BETTE | 5 REVIEWS | 4 REVIEWS |
| JANE | NO | NOT ENABLED | 500 JOHNSON, CUPERTINO CA | 851 BETTE, 100 STEVEN'S ROAD | 6 REVIEWS 2 COMMENTS | 1 COMMENT |
| • | • | • | • | • | • | • |
| • | • | • | • | • | • | • |
| • | • | • | • | • | • | • |

TABLE VIEW 2050

FIGURE 20

CLAIM YOUR GEOGRAPHIC LOCATION

WHICH ADDRESS ARE CLAIMING :

[ 201 BENSON AVE ] ~2102

DO YOU WANT TO DELIST THIS PROBLEM [ NO ▶ ] ~2104

ABOUT YOU

UPLOAD PICTURE [ FAMILY PIC ▶ ]

PLEASE NOTE : YOU WILL NEED TO SUBMIT PROOF OF OWNERSHIP/ RESIDENCE IF DISPUTED ~2106

CLAIM VIEW 2150

FIGURE 21

| USER PROFILES FIELD 3102 | ACCOMMODATIONS FIELD 3104 | HOUSE FIELD 3106 | ROOMS FIELD 3108 | ONLINE RESERVATIONS FIELD 3110 |
|---|---|---|---|---|
| KEVIN JOHN | NO | YES | 0 | NO |
| JENNY LEE | NO | YES | 0 | NO |
| THE LAURELS | YES | NO | 5 | YES |
| ••• | ••• | ••• | ••• | ••• |

TABLE VIEW 3100

SHORT-TERM RESIDENTIAL SPACES IN A GEO-SPATIAL ENVIRONMENT

CLAIMS OF PRIORITY

This patent application is a continuation in part, claims priority from, and hereby incorporates by reference and claims priority from the entirety of the disclosures of the following cases and each of the cases on which they depend and further claim priority or incorporate by reference:
(1) U.S. Utility patent application Ser. No. 11/653,194 titled 'LODGING AND REAL PROPERTY IN A GEO-SPATIAL MAPPING ENVIRONMENT' filed on Jan. 12, 2007, which is a CIP of U.S. application Ser. No. 11/603,442, and provisional cases including 60/783,226 filed on Mar. 17, 2006, 60/817,470 filed on Jun. 28, 2006, 60/853,499 filed on Oct. 19, 2006, and 60/854,230 filed on Oct. 25, 2006.

FIELD OF TECHNOLOGY

This disclosure relates generally to data processing devices and, more particularly, to a method, a device and/or a system of short-term residential spaces in a geo-spatial environment.

BACKGROUND

Travelers often need accommodations. Lodging may be expensive and/or availability may be limited. For example, travel planned on short notice may not offer enough time to book reservations in hotels. The travelers may not know in advance which nights they will need the accommodations, which may further limit the travelers' options.

The travelers may prefer to stay in a home-like setting or lease privately owned property, such as a home. For example, the travelers may prefer a home-like ambience. The home-like ambience may offer a "personal touch" of friendly hosts, including opportunities to build lasting friendships. Amenities may include home cooked meals, pet accommodations, childcare opportunities, attractive lease rates, and residential neighborhood settings.

The travelers, however, may not be able to locate such accommodations. Conversely, the hosts may not have a venue to offer such accommodations. Thus, both travelers and hosts may miss mutually rewarding accommodation opportunities.

SUMMARY

Disclosed are a method, a device and a system of short-term residential spaces in a geo-spatial environment.

In one aspect, a method of a short-term listing server comprises validating that a place-to-stay listing data is associated with a verified user of the short-term listing server using a processor and a memory, verifying that a set of geospatial coordinates associated with the place-to-stay listing data are trusted based on a claimed geospatial location of the verified user of the short-term listing server, determining that a time stamp associated with a creation date and a creation time of the place-to-stay listing data is trusted based the claimed geospatial location of the verified user of the short-term listing server, and processing a payment associated with a renter of a space in a private residential home associated with the place-to-stay listing data through the short-term listing server.

The method may automatically publish the place-to-stay listing data on a set of user profiles having associated verified addresses in a threshold radial distance from the set of geospatial coordinates associated with the place-to-stay listing data of the verified user of the short-term listing server using a radial algorithm. Furthermore, the method may process a listing criteria includes a real estate type, a lot size, a square footage, a photograph, a video, a bedroom count, a room size, a description, a cost per month, a rental price, a leasing rate, a number of stories, and/or a location. An availability chart may be populated when a real estate listing associated with the listing criteria may be posted. The availability chart may include a front door key delivery availability timing of the verified user, an on-home lockbox access key, and/or an occupancy availability of the real estate listing.

The place-to-stay listing data may be presented as a real estate pushpin of the real estate listing in a geospatial map surrounding pre-populated residential and/or business listings in a surrounding vicinity, such that the real estate pushpin of the real estate listing may be automatically presented on the geospatial map in addition to being presented on the set of user profiles having associated verified addresses in the threshold radial distance from the set of geospatial coordinates associated with the place-to-stay listing data of the verified user of the short-term listing server. The place-to-stay listing data may be radially distributed through an on-page posting, an electronic communication, and/or a push notification delivered to desktop and/or mobile devices associated with users and/or their user profiles around an epicenter defined at the set of geo spatial coordinates associated with the place-to-stay listing data to all subscribed user profiles in a circular geo-fenced area defined by the threshold distance from the set of geospatial coordinates associated with the place-to-stay listing data through the radial algorithm of a neighborhood broadcasting system that measures a distance away of each address associated with each user profile from the current geospatial location at the epicenter.

The verified user may be permitted to drag and/or drop the real estate pushpin on any location on the geospatial map, and/or automatically determining a latitude and/or a longitude associated with a placed location. A for-rent view of the real estate may be generated in which the verified user offers the real estate for rent through the short-term listing server to other users in the threshold radial distance from the set of geospatial coordinates associated with the place-to-stay listing data of the verified user of the short-term listing server. The geospatial coordinates may be extracted from a metadata associated with the place-to-stay listing data when verifying that the set of geospatial coordinates associated with the place-to-stay listing data are trusted based on the claimed geospatial location of the verified user of the short-term listing server.

A relative match between a persistent clock associated with the short-term listing server and/or a digital clock of a data processing system may be used to determine that the time stamp associated with the creation date and/or time of the place-to-stay listing data may be accurate and/or therefore trusted. A publishing of the place-to-stay listing data may be automatically deleted on a set of user profiles having associated verified addresses in the threshold radial distance from the set of geospatial coordinates associated with the place-to-stay listing data of the verified user of the short-term listing server based on a listing expiration time. A set of residential addresses each associated with a resident name in a neighborhood surrounding the data processing system may be geo-coded. The set of residential addresses each associated with the resident name as the set of user profiles in the threshold radial distance from the claimed geospatial location of the verified user of the short-term listing server in a neighborhood curation system communicatively coupled with the short-term listing server may be prepopulated.

The method may permit the verified user to submit reviews in each of the set of user profiles. In addition, the method may track the submitted reviews through the rental listing system and/or generate a reversible history journal associated with each of the set of user profiles such that a reviews of the verified user can be undone on a modified user profile page. A reviewing credibility of the verified user may be determined based on an review history of the verified user and/or a community contribution validation of the verified user by other users of the rental listing system. In addition, the place-to-stay listing data to a set of user profiles having associated verified addresses in a threshold radial distance from the claimed geospatial location of the verified user of the short-term listing server may be automatically published using the radial algorithm.

A claim request of the verified user generating the place-to-stay listing data may be processed through the data processing system to be associated with an address of the rental listing system. It may be determined if the claimable neighborhood in the rental listing system may be associated with a private neighborhood community in the claimable neighborhood of the rental listing system. The verified user may be associated with the private neighborhood community in the claimable neighborhood of the rental listing system if the private neighborhood community has been activated by the verified user and/or a different verified user. The verified user may be permitted to draw a set of boundary lines in a form of a geospatial polygon such that the claimable neighborhood in a geospatial region surrounding the claim request creates the private neighborhood community in the rental listing system if the private neighborhood community may be inactive.

The claim request of the verified user generating the place-to-stay listing data may be verified through the data processing system to be associated with a neighborhood address of the rental listing system when the address may be determined to be associated with a work address and/or a residential address of the verified user. The place-to-stay listing data may be simultaneously published on the private neighborhood community associated with the verified user generating the place-to-stay listing data through the data processing system in the threshold radial distance from the address associated with the claim request of the verified user of the rental listing system when automatically publishing the place-to-stay listing data on a set of user profiles having associated verified addresses in a threshold radial distance from the claimed geospatial location of the verified user of the short-term listing server based on a set of preferences of the verified user using the radial algorithm.

A summary data may be provided to the verified user generating the place-to-stay listing data through the data processing system of how many user profile pages were updated with an alert of the place-to-stay listing data when publishing the place-to-stay listing data in the private neighborhood community and/or the set of user profiles having associated verified addresses in the threshold radial distance from the claimed geospatial location of the verified user of the short-term listing server based on the set of preferences of the verified user.

The place-to-stay listing data may be live broadcasted to the different verified user and/or other verified users in the private neighborhood community and/or currently within the threshold radial distance from the current geospatial location through the short-term listing server using a multicast algorithm such that a live broadcast multicasts to a plurality of data processing systems associated with each of the different user and/or the other verified users simultaneously when the data processing system of the verified user generating the live-broadcast enables broadcasting of the place-to-stay listing data to any one of a geospatial vicinity around the data processing system of the verified user generating the broadcast and/or in any private neighborhood community in which the verified user has a non-transitory connection. The different verified user and/or other verified users in the private neighborhood community may be permitted to bi-directionally communicate with the verified user generating the broadcast through the short-term listing server.

Any private neighborhood community in which the verified user has the non-transitory connection may be a residential address of the verified user and/or a work address of the verified user that has been confirmed by the short-term listing server as being associated with the verified user. The threshold distance may be between 0.2 and/or 0.4 miles from the set of geospatial coordinates associated with the place-to-stay listing data to optimize a relevancy of the live-broadcast.

The short-term listing server may include a crowdsourced moderation algorithm in which multiple neighbors to a geospatial area determine what content contributed to the short-term listing server persists and/or which may be deleted. The short-term listing server may permit users to mute messages of specific verified users to prevent misuse of the short-term listing server. The real-estate listing server may permit the place-to-stay listing data to be disseminated to adjacent neighborhoods that have been claimed by different users in a manner such that the place-to-stay listing data may be optionally disseminated to the surrounding claimed neighborhoods based on a preference of the verified user. A claimed neighborhood of the verified user may be activated based on a minimum number of other verified users in the threshold radial distance that have been verified through a primary residential address associated with each of the other verified users through a post card verification, a utility bill verification, a privately-published access code, and/or a neighbor vouching method. Access to the place-to-stay listing data may be restricted to the claimed neighborhood of the verified user. Access to the place-to-stay listing data may be denied to users having verified addresses outside the claimed neighborhood of the verified user.

In another aspect, a method of a short-term listing server comprises verifying that an address is associated with a residential-property rentable by a host, permitting the host to list at least one room in the residential-property on an online rental listing system, booking the at least one room in the residential-property of the online rental listing system based on a request of a renter, processing a payment of the renter for the at least one room in the residential-property, permitting the host and the renter to rate and review each other through the online rental listing system, and creating a group associated with hosts and renters sharing common interests and previous stays in the at least one room in the residential-property.

In yet another aspect, a system comprises a short-term listing server to (1) validate that a place-to-stay listing data may be associated with a verified user of the short-term listing server using a processor and/or a memory, and (2) verify that a set of geospatial coordinates associated with the place-to-stay listing data are trusted based on a claimed geospatial location of the verified user of the short-term listing server. This embodiment also includes a network and a client side device. The client device is communicatively coupled with the short-term listing server through the network to provide a payment associated with a renter of a space in a private residential home associated with the place-to-stay listing data through the short-term listing server.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this disclosure are illustrated by way of example and not limitation in the figures of the accompanying drawings, in which like references indicate similar elements and in which:

FIG. 20 is a table view of user address details, according to one embodiment.

FIG. 21 is a user interface view of claim view 2150, according to one embodiment.

FIG. 31 is a table view of information associated with availability of reservations based on type of accommodations, according to one embodiment.

DETAILED DESCRIPTION

Example embodiments, as described below, may be used to provide a method, a system and/or a device for short-term residential spaces in a geo-spatial environment. Although the present embodiments have been described with reference to specific example embodiments, it will be evident that various modifications and changes may be made to these embodiments without departing from the broader spirit and scope of the various embodiments.

Figure 1:
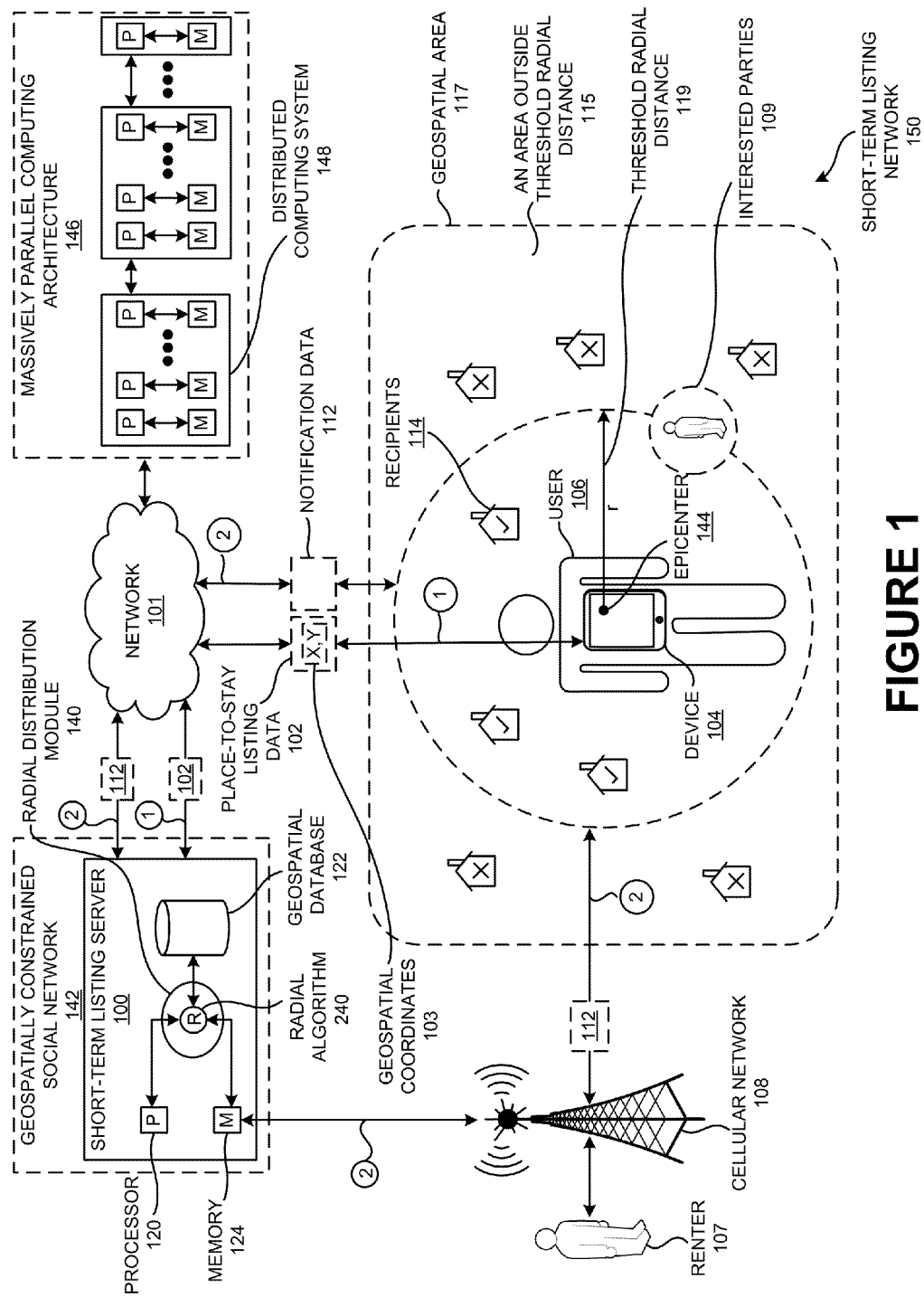
FIG. 1 is a network view of a short-term listing server 100 having a radial distribution module 140 communicating with a device 104 that generates a radial broadcast through an internet protocol network using a radial algorithm 240 of the radial distribution module 140 of the short-term listing server 100, according to one embodiment.

FIG. 1 is a network view of a short-term listing server 100 having a radial distribution module 140 communicating with a device 104 that generates a radial broadcast through an internet protocol network using a radial algorithm 240 of the radial distribution module 140 of the short-term listing server 100, according to one embodiment.

Particularly, FIG. 1 illustrates a short-term listing network 150, according to one embodiment. The embodiment of FIG. 1 describes a short-term listing server 100, a place-to-stay listing data 102, a device 104, a user 106, a cellular network 108, interested parties 109 (including a janitorial services 309A, a college students 309B, a cleaning services 309C, a merchants 309D, an plumber 309E, a mover 309F, a real estate staging company 309G, a landscaper 309H, a gardener 309I, and professional(s) 309N), a notification data 112, a set of recipients 114, an area outside the threshold radial distance 115, a geospatial area 117, a threshold radial distance 119, a processor 120, a geospatial database 122, a memory 124, a radial distribution module 140 (e.g., that applies a radial algorithm 240 of FIG. 2 using a series of modules working in concert as described in FIG. 2), a geospatially constrained social network 142, an epicenter 144, a massively parallel computing architecture 146, and a distributed computing system 148.

The short-term listing server 100 may include a processor 120, a memory 124, and a geospatial database 122, according to the embodiment of FIG. 1. The short-term listing server 100 may be one or more server side data processing systems (e.g., web servers operating in concert with each other) that operate in a manner that provide a set of instructions to any number of client side devices (e.g., the device 104 (e.g., a mobile device 504)) communicatively coupled with the short-term listing server 100 through the network 101. For example, the short-term listing server 100 may be a computing system (e.g., or a group of computing systems) that operates in a larger client-server database framework (e.g., such as in a social networking software such as Nextdoor.com, Fatdoor.com, Facebook.com, etc.).

The device 104 (e.g., the mobile device 504) (e.g., a smartphone, a tablet, a laptop) may access the short-term listing server 100 through the network 101 using a browser application of the device 104 (e.g., Google® Chrome) and/or through a client-side application downloaded to the device 104 (e.g., the mobile device 504) (e.g., a Nextdoor.com mobile application, a Fatdoor.com mobile application) operated by the user 106. In an alternate embodiment, a non-mobile computing device, such as a desktop computer (not shown) and/or a client device may access the short-term listing server 100 through the network 101.

The place-to-stay listing data 102 may be communicated from the device 104 (e.g., a mobile device 504) to the short-term listing server 100 through the network 101. The place-to-stay listing data 102 may include information about a real estate listing (e.g., a real estate opportunity) offered by the user 106 to recipients 114 and/or the interested parties 109 through the network 101. For example, the real estate listing may relate to a paid position of regular employment offered by the user 106 and/or a task, a casual/occasional work offered by the user 106 to the recipients 114 and/or the interested parties 109.

The place-to-stay listing data 102 may be generated and distributed through an application of the radial distribution module 140 (e.g., that applies the radial algorithm 240 of FIG. 2 using a series of modules working in concert as described in FIG. 2) of the short-term listing server 100. The radial distribution module 140 (e.g., that applies the radial algorithm 240 of FIG. 2 using a series of modules working in concert as described in FIG. 2) may be a series of software functions/processes that simulates the experience of transmitting and receiving local broadcasts for the verified user (e.g., the user 106 of FIG. 1 as described as the verified user 706 in FIG. 7), according to one embodiment.

Using an internet protocol based network (e.g., the network 101), the short-term listing server 100 may be able to use the radial distribution module 140 (e.g., that applies the radial algorithm 240 of FIG. 2 using a series of modules working in concert as described in FIG. 2) to simulate a radio frequency (RF) based communication network using an IP network topology of the network 101. Therefore, the place-to-stay listing data 102 can be distributed using the short-term listing server 100 to a geo-constrained area (e.g., the recipients 114 in the geospatial area 117 and/or the interested parties 109 in a geo-constrained area around an area in which the device 104 (e.g., a mobile device 504) operates) without requiring expensive broadcast towers, transceivers, transmitters, amplifiers, antennas, tuners and/or wave generating and interpreting hardware (e.g., as may be required in local ham radio communication, frequency modulation (FM) audio systems, etc.). The radial distribution module 140 (e.g., that applies the radial algorithm 240 of FIG. 2 using a series of modules working in concert as described in FIG. 2) may re-create an experience of communication between parties in a geospatially restricted area (e.g., for example in the same city, in the surrounding neighborhood, in the same zip code, in the same building, in the same claimed neighborhood) through the use of an Internet protocol network. The short-term listing server 100 may overcome technical challenges of determining a user's geospatial location, calculating distance to other verified users based on relative geospatial locations, and/or coordinating information with a database of geo-coded information of interest (e.g., using the geospatial database 122) using the radial distribution module 140 (e.g., that applies the radial algorithm 240 of FIG. 2 using a series of modules working in concert as described in FIG. 2).

The radial distribution module 140 (e.g., that applies the radial algorithm 240 of FIG. 2 using a series of modules working in concert as described in FIG. 2), as a function/module of the short-term listing server 100, may determine the location of the user 106, the distance between the user 106 and other verified users, and the distance between the user 106 and locations of interest. With that information, the radial distribution module 140 (e.g., that applies the radial algorithm 240 of FIG. 2 using a series of modules working in concert as described in FIG. 2) may further determine which verified users are within a predetermined vicinity of a user 106. This set of verified users within the vicinity of another verified user may then be determined to be receptive to broadcasts transmitted by the user 106 and to be available as transmitters of broadcasts to the user 106.

The radial distribution module 140 (e.g., that applies the radial algorithm 240 of FIG. 2 using a series of modules working in concert as described in FIG. 2) in effect may create a link between verified users of the network 101 that allows the users to communicate with each other, and this link may be based on the physical distance between the users as measured relative to a current geospatial location of the device 104 (e.g., a mobile device 504) with a claimed and verified (e.g., through a verification mechanism such as a postcard verification, a utility bill verification, and/or a vouching of the user with other users) non-transitory location (e.g., a home location, a work location) of the user and/or other users. In an alternate embodiment, the transitory location of the user (e.g., their current location, a current location of their vehicle and/or mobile phone) and/or the other users may also be used by the radial algorithm 240 to determine an appropriate threshold distance for broadcasting a message.

Furthermore, the radial distribution module 140 (e.g., that applies the radial algorithm 240 of FIG. 2 using a series of modules working in concert as described in FIG. 2) may automatically update a set of pages associated with profiles of individuals and/or businesses that have not yet joined the network based on preseeded address information. In effect, the radial distribution module 140 (e.g., that applies the radial algorithm 240 of FIG. 2 using a series of modules working in concert as described in FIG. 2) may update preseeded pages in a geo-constrained radial distance from where a broadcast originates (e.g., using an epicenter 144 calculated from the current location of the device 104 (e.g., a mobile device 504)) with information about the place-to-stay listing data 102. In effect, through this methodology, the radial distribution module 140 (e.g., that applies the radial algorithm 240 of FIG. 2 using a series of modules working in concert as described in FIG. 2) may leave 'inboxes' and/or post 'alerts' on pages created for users that have not yet signed up based on a confirmed address of the users through a public and/or a private data source (e.g., from Infogroup®, from a white page directory, etc.).

The radial distribution module 140 (e.g., that applies the radial algorithm 240 of FIG. 2 using a series of modules working in concert as described in FIG. 2) of the short-term listing server 100 may be different from previous implementations because it is the first implementation to simulate the experience of local radio transmission between individuals using the internet and non-radio network technology by basing their network broadcast range on the proximity of verified users to one another, according to one embodiment.

FIG. 1 illustrates a number of operations between the device 104 and the recipients 114 and/or the interested parties 109. Particularly, circle '1' of FIG. 1 illustrates that the user of the device 104 communicates the place-to-stay listing data 102 to the short-term listing server 100 using the network 101. Then, after applying the radial algorithm 240 utilizing the radial distribution module 140, the short-term listing server 100 generates and communicates an appropriate notification data 112 (e.g., the notification data 112) associated with the place-to-stay listing data 102 to a geospatially distributed set of recipients 114 in a radial area (radius represented as 'r' of FIG. 1) in a geospatial vicinity from an epicenter 144 associated a present geospatial location with the device 104 as illustrated as circle '2' in FIG. 1.

The radial algorithm 240 may operate as follows, according to one embodiment. The radial algorithm 240 may utilize a radial distribution function (e.g., a pair correlation function)

$$g(r)$$

in the short-term listing network 150. The radial distribution function may describe how density varies as a function of distance from a user 106, according to one embodiment.

If a given user 106 is taken to be at the origin O (e.g., the epicenter 144), and if $$p = N/V$$

is the average number density of recipients 114 in the short-term listing network 150, then the local time-averaged density at a distance r from O is $$pg(r)$$

according to one embodiment. This simplified definition may hold for a homogeneous and isotropic type of recipients 114, according to one embodiment of the radial algorithm 240.

A more anisotropic distribution (e.g., exhibiting properties with different values when measured in different directions) of the recipients 114 will be described below, according to one embodiment of the radial algorithm 240. In simplest terms it may be a measure of the probability of finding a recipient at a distance of r away from a given user 106, relative to that for an ideal distribution scenario, according to one embodiment. The anisotropic algorithm involves determining how many recipients 114 are within a distance of r and r+dr away from the user 106, according to one embodiment. The radial algorithm 240 may be determined by calculating the distance between all user pairs and binning them into a user histogram, according to one embodiment.

The histogram may then be normalized with respect to an ideal user at the origin o, where user histograms are completely uncorrelated, according to one embodiment. For three dimensions (e.g., such as a building representation in the geospatially constrained social network 142 in which there are multiple residents in each floor), this normalization may be the number density of the system multiplied by the volume of the spherical shell, which mathematically can be expressed as $$g(r)_f = 4\pi r^2 p dr,$$

where p be the user density, according to one embodiment of the radial algorithm 240.

The radial distribution function of the radial algorithm 240 can be computed either via computer simulation methods like the Monte Carlo method, or via the Ornstein-Zernike equation, using approximative closure relations like the Percus-Yevick approximation or the Hypernetted Chain Theory, according to one embodiment.

This may be important because by confining the broadcast reach of a verified user in the short-term listing network 150 to a specified range, the radial distribution module 140 (e.g., that applies the radial algorithm 240 of FIG. 2 using a series of modules working in concert as described in FIG. 2) may replicate the experience of local radio broadcasting and enable verified users to communicate information to their immediate neighbors as well as receive information from their immediate neighbors in areas that they care about, according to one embodiment. Such methodologies can be complemented with hyperlocal advertising targeted to potential users of the short-term listing server 100 on preseeded profile pages and/or active user pages of the short-term listing server 100. Advertisement communications thus may become highly specialized and localized resulting in an increase in their value and interest to the local verified users of the network through the short-term listing server 100.

The radial distribution module 140 (e.g., that applies the radial algorithm 240 of FIG. 2 using a series of modules working in concert as described in FIG. 2) may solve the problem of trying to locate a receptive audience to a verified user's broadcasts, whether that broadcast may be one's personal music, an advertisement for a car for sale, a solicitation for a new employee, and/or a recommendation for a good restaurant in the area. This radial distribution module 140 (e.g., that applies the radial algorithm 240 of FIG. 2 using a series of modules working in concert as described in FIG. 2) may eliminate unnecessarily broadcasting that information to those who are not receptive to it, both as a transmitter and as a recipient of the broadcast. The radial algorithm 240 saves both time and effort of every user involved by transmitting information only to areas that a user cares about, according to one embodiment.

In effect, the radial algorithm 240 of the short-term listing server 100 enables users to notify people around locations that are cared about (e.g., around where they live, work, and/or where they are physically located). In one embodiment, the user 106 can be provided 'feedback' after the place-to-stay listing data 102 may be delivered to the recipients 114 and/or to the interested parties 109 using the radial distribution module 140 (e.g., that applies the radial algorithm 240 of FIG. 2 using a series of modules working in concert as described in FIG. 2) of the short-term listing server 100. For example, after the place-to-stay listing data 102 may be delivered, the device 104 (e.g., a mobile device 504) may display a message saying: "3256 neighbors around a 1 mile radius from you have been notified on their profile pages of your room for rent notification in Menlo Park" and/or "8356 neighbors around a 1 mile radius from you have been notified of your house for rent notification in Mountain View."

The various embodiments described herein of the short-term listing server 100 using the radial distribution module 140 (e.g., that applies the radial algorithm 240 of FIG. 2 using a series of modules working in concert as described in FIG. 2) may solve a central problem of internet radio service providers (e.g., Pandora®) by retaining cultural significance related to a person's locations of association. For example, the radial distribution module 140 (e.g., that applies the radial algorithm 240 of FIG. 2 using a series of modules working in concert as described in FIG. 2) may be used to 'create' new radio stations, television stations, and/or mini alert broadcasts to a geospatially constrained area on one end, and provide a means for those 'tuning in' to consume information posted in a geospatial area that the listener cares about and/or associates themselves with. The information provided can be actionable in that the user 106 may be able to secure new opportunities through face to face human interaction and physical meeting not otherwise possible in internet radio scenarios.

The radial algorithm 240 may be a set of instructions that may enable users (e.g., verified users, non-verified users) of the Nextdoor.com and Fatdoor.com websites and applications to broadcast their activities (e.g., real estate listing, garage sale, t-shirt sale, crime alert) to surrounding neighbors within a claimed neighborhood and to guests of a claimed neighborhood, according to one embodiment. The radial algorithm 240 may be new because current technology does not allow for users of a network (e.g., Nextdoor.com, Fatdoor.com) to locally broadcast their activity to a locally defined geospatial area. With the radial algorithm 240, users of the network may communicate with one another in a locally defined manner, which may present more relevant information and activities, according to one embodiment.

For example, if a verified user of the network broadcasts an item for sale, locally defined neighbors of the verified user may be much more interested in purchasing the product compared to if the item was for sale in a different town or city, according to one embodiment. The radial distribution module 140 may solve the problem of neighbors living in the locally defined geospatial area who don't typically interact, and allows them to connect within a virtual space that did not exist before, according to one embodiment. Prior to the embodiments disclosed herein of the radial algorithm 240 operating through the radial distribution module 140, community boards (e.g., job boards, for sale boards) may have been the method of distributing content in a surrounding neighborhood effectively. However, there may have been no way to easily distribute content related to exigent circumstances and/or with urgency in a broadcast-like manner to those listening around a neighborhood through mobile devices until the various embodiments applying the radial distribution module 140 as described herein.

A radial algorithm 240 may be a method of calculating a sequence of operations, and in this case a sequence of radio operations, according to one embodiment. Starting from an initial state and initial input, the radial algorithm 240 describes a computation that, when executed, proceeds through a finite number of well-defined successive states, eventually producing radial patterned distribution (e.g., simulating a local radio station), according to one embodiment.

The short-term listing server 100 may solve technical challenges through the radial distribution module 140 (e.g., that applies the radial algorithm 240 of FIG. 2 using a series of modules working in concert as described in FIG. 2) by implementing a vigorous screening process to screen out any lewd or vulgar content in one embodiment. For example, what may be considered lewd content sometimes could be subjective, and verified users could argue that an operator of the short-term listing server 100 is restricting their constitutional right to freedom of speech through a crowd-moderation capability enabled by the radial distribution module 140 (e.g., that applies the radial algorithm 240 of FIG. 2 using a series of modules working in concert as described in FIG. 2), according to one embodiment. In one embodiment, verified users may sign an electronic agreement to screen their content and agree that the short-term listing network 150 may delete any content that it deems inappropriate for broadcasting, through the radial distribution module 140 (e.g., that applies the radial algorithm 240 of FIG. 2 using a series of modules working in concert as described in FIG. 2) according to one embodiment.

The radial distribution module 140 (e.g., that applies the radial algorithm 240 of FIG. 2 using a series of modules working in concert as described in FIG. 2) may allow verified users to create and broadcast their own radio show, e.g., music, talk show, commercial, instructional contents, etc., and to choose their neighborhood(s) for broadcasting based on a claimed location, according to one embodiment. The radial distribution module 140 (e.g., that applies the radial algorithm 240 of FIG. 2 using a series of modules working in concert as described in FIG. 2) may allow users to choose the neighborhoods that they would want to receive the broadcasts, live and recorded broadcasts, and/or the types and topics of broadcasts that interest them.

The radial distribution module 140 (e.g., that applies the radial algorithm 240 of FIG. 2 using a series of modules working in concert as described in FIG. 2) based approach of the short-term listing server 100 may be a completely different concept from the currently existing neighborhood (e.g. geospatial) social networking options. The radial distribution module 140 (e.g., that applies the radial algorithm 240 of FIG. 2 using a series of modules working in concert as described in FIG. 2) may also allow the user to create his/her own radio station, television station and/or other content such as the place-to-stay listing data 102 and distribute this content around locations to users and preseeded profiles around them. The radial distribution module 140 (e.g., that applies the radial algorithm 240 of FIG. 2 using a series of modules working in concert as described in FIG. 2) can allow verified users to create their content and broadcast in the selected geospatial area. It also allows verified listeners to listen to only the relevant local broadcasts of their choice.

The radial distribution module 140 (e.g., that applies the radial algorithm 240 of FIG. 2 using a series of modules working in concert as described in FIG. 2) may be important because it may provide any verified user the opportunity to create his/her own radial broadcast message (e.g., can be audio, video, pictoral and/or textual content) and distribute this content to a broad group. Radial distribution module 140 (e.g., that applies the radial algorithm 240 of FIG. 2 using a series of modules working in concert as described in FIG. 2) may also allow verified listeners to listen to any missed live broadcasts through the prerecorded features, according to one embodiment. Through this, the radial distribution module 140 (e.g., that applies the radial algorithm 240 of FIG. 2 using a series of modules working in concert as described in FIG. 2) changes the way social networks (e.g., Nextdoor™, Fatdoor®, Facebook®, Path®, etc.) operate by enabling location centric broadcasting to regions that a user cares about, according to one embodiment. Radial distribution module 140 (e.g., that applies the radial algorithm 240 of FIG. 2 using a series of modules working in concert as described in FIG. 2) may solve a technical challenge by defining ranges based on a type of real estate listing, a type of neighborhood, and/or boundary condition of a neighborhood by analyzing whether the place-to-stay listing data 102 may be associated with a particular kind of job, a particular neighborhood, a temporal limitation, and/or through another criteria.

By using the radial distribution module 140 (e.g., that applies the radial algorithm 240 of FIG. 2 using a series of modules working in concert as described in FIG. 2) of the short-term listing server 100 the user 106 may be able to filter irrelevant offers and information provided by broadcasts. In one embodiment, only the broadcasting user (e.g., the user 106) may be a verified user to create accountability for a particular broadcast and/or credibility of the broadcaster. In this embodiment, recipients 114 of the broadcast may not need to be verified users of the short-term listing network. By directing traffic and organizing the onslaught of broadcasts, the radial distribution module 140 (e.g., that applies the radial algorithm 240 of FIG. 2 using a series of modules working in concert as described in FIG. 2) of the short-term listing server 100 may able to identify the origins and nature of each group of incoming information and locate recipients 114 that are relevant/interested in the place-to-stay listing data 102, maximizing the effective use of each broadcast.

The radial distribution module 140 (e.g., that applies the radial algorithm 240 of FIG. 2 using a series of modules working in concert as described in FIG. 2) of the short-term listing server 100 may process the input data from the device 104 (e.g., a mobile device 504) in order to identify which notification(s) to broadcast to which individual(s). This may be separate from a traditional radio broadcast as it not only geographically constrains broadcasters and recipients 114 but also makes use of user preferences in order to allow broadcasters to target an optimal audience and allow recipients 114 to alter and customize what they consume. The user 106 may associate his/herself with a non-transitory address in order to remain constantly connected to their neighborhood and/or neighbors even when they themselves or their neighbors are away. The radial algorithm 240 may be also unique from a neighborhood social network (e.g., the geospatially constrained social network 142) as it permits users to broadcast offers, information, audio, video etc. to other users, allowing users to create their own stations.

In order to implement the radial distribution module 140 (e.g., that applies the radial algorithm 240 of FIG. 2 using a series of modules working in concert as described in FIG. 2), geospatial data may need to be collected and amassed in order to create a foundation on which users may sign up and verify themselves by claiming a specific address, associating themselves with that geospatial location. The radial distribution module 140 (e.g., that applies the radial algorithm 240 of FIG. 2 using a series of modules working in concert as described in FIG. 2) may then be able to utilize the geospatial database 122 to filter out surrounding noise and deliver only relevant data to recipients 114. In order to accomplish this, the radial distribution module 140 (e.g., that applies the radial algorithm 240 of FIG. 2 using a series of modules working in concert as described in FIG. 2) may be able to verify the reliability of geospatial coordinates 103, time stamps, and user information associated with the device 104 (e.g., a mobile device 504). In addition, threshold geospatial radii, private neighborhood boundaries, and personal preferences may be established in the short-term listing server 100 and accommodated using the radial distribution module 140 (e.g., that applies the radial algorithm 240 of FIG. 2 using a series of modules working in concert as described in FIG. 2). The geospatial database 122 may work in concert with the radial distribution module 140 (e.g., that applies the radial algorithm 240 of FIG. 2 using a series of modules working in concert as described in FIG. 2) to store, organize, and manage broadcasts, pushpins, user profiles, preseeded user profiles, metadata, and epicenter 144 locations associated with the geospatially constrained social network 142 (e.g., a neighborhood social network such as Fatdoor.com, Nextdoor.com).

The radial algorithm 240 may be used to calculate relative distances between each one of millions of records as associated with each placed geo-spatial coordinate in the geospatially constrained social network 142 (e.g., a neighborhood social network such as Fatdoor.com, Nextdoor.com). Calculations of relative distance between each geospatial coordinate can be a large computational challenge because of the high number of reads, writes, modify, and creates associated with each geospatial coordinate added to the geospatially constrained social network 142 and subsequent recalculations of surrounding geospatial coordinates 103 associated with other users and/or other profile pages based a relative distance away from a newly added set of geospatial coordinates 103 (e.g., associated with the place-to-stay listing data 102 and/or with other pushpin types). To overcome this computational challenge, the radial algorithm 240 may leverage a massively parallel computing architecture 146 through which processing functions are distributed across a large set of processors accessed in a distributed computing system 148 through the network 101.

In order to achieve the utilization of the massively parallel computing architecture 146 in a context of a radial distribution function of a geospatially constrained social network 142, a number of technical challenges have been overcome in at least one embodiment. Particularly, the radial distribution module 140 constructs a series of tables based on an ordered geospatial ranking based on frequency of interaction through a set of 'n' number of users simultaneously interacting with the geospatially constrained social network 142, in one preferred embodiment. In this manner, sessions of access between the short-term listing server 100 and users of the short-term listing server 100 (e.g., the user 106) may be monitored based on geospatial claimed areas of the user (e.g., a claimed work and/or home location of the user), and/or a present geospatial location of the user. In this manner, tables associated with data related to claimed geospatial areas of the user and/or the present geospatial location of the user may be anticipatorially cached in the memory 124 to ensure that a response time of the geospatially constrained social network 142 may be not constrained by delays caused by extraction, retrieval, and transformation of tables that are not likely to be required for a current and/or anticipated set of sessions between users and the short-term listing server 100.

In a preferred embodiment, an elastic computing environment may be used by the radial distribution module 140 to provide for increase/decreases of capacity within minutes of a database function requirement. In this manner, the radial distribution module 140 can adapt to workload changes based on number of requests of processing simultaneous and/or concurrent requests associated with place-to-stay listing data 102 by provisioning and deprovisioning resources in an autonomic manner, such that at each point in time the available resources match the current demand as closely as possible.

The radial distribution module 140 (e.g., that applies the radial algorithm 240 of FIG. 2 using a series of modules working in concert as described in FIG. 2) may be a concept whereby a server communicating data to a dispersed group of recipients 114 over a network 101, which may be an internet protocol based wide area network (as opposed to a network communicating by radio frequency communications) communicates that data only to a geospatially-constrained group of recipients 114. The radial distribution module 140 (e.g., that applies the radial algorithm 240 of FIG. 2 using a series of modules working in concert as described in FIG. 2) may apply a geospatial constraint related to a radial distance away from an origin point, or a constraint related to regional, state, territory, county, municipal, neighborhood, building, community, district, locality, and/or other geospatial boundaries.

The radial distribution module 140 (e.g., that applies the radial algorithm 240 of FIG. 2 using a series of modules working in concert as described in FIG. 2) may be new as applied to data traveling over wide area networks using internet protocol topology in a geospatial social networking and commerce context, according to one embodiment. While radio broadcasts, by their nature, are transmitted in a radial pattern surrounding the origin point, there may be no known mechanism for restricting access to the data only to verified users of a service subscribing to the broadcast. As applied to wired computer networks, while techniques for applying geospatial constraints have been applied to search results, and to other limited uses, there has as yet been no application of geospatial constraint as applied to the various embodiments described herein using the radial distribution module 140 (e.g., that applies the radial algorithm 240 of FIG. 2 using a series of modules working in concert as described in FIG. 2).

The radial distribution module 140 (e.g., that applies the radial algorithm 240 of FIG. 2 using a series of modules working in concert as described in FIG. 2) may be roughly analogous to broadcast radio communications such as a) in broadcast radio, b) in wireless computer networking, and c) in mobile telephony. However, all of these systems broadcast their information promiscuously, making the data transmitted available to anyone within range of the transmitter who may be equipped with the appropriate receiving device. In contrast, the radial distribution module 140 (e.g., that applies the radial algorithm 240 of FIG. 2 using a series of modules working in concert as described in FIG. 2) herein describes a system in which networks are used to transmit data in a selective manner in that information may be distributed around a physical location of homes or businesses in areas of interest/relevancy.

The radial distribution module 140 (e.g., that applies the radial algorithm 240 of FIG. 2 using a series of modules working in concert as described in FIG. 2) may solve a problem of restricting data transmitted over networks to specific users who are within a specified distance from the individual who originates the data. In a broad sense, by enabling commerce and communications that are strictly limited within defined neighborhood boundaries, the radial distribution module 140 (e.g., that applies the radial algorithm 240 of FIG. 2 using a series of modules working in concert as described in FIG. 2) may enable the geospatially constrained social network 142 (e.g., a neighborhood social network such as Fatdoor.com, Nextdoor.com, AirBnB.com, ApartmentFinder.com) communications, attacking the serious social conditions of anonymity and disengagement in community that afflict the nation and, increasingly, the world.

The radial distribution module 140 (e.g., that applies the radial algorithm 240 of FIG. 2 using a series of modules working in concert as described in FIG. 2) may comprise one or more modules that instruct the short-term listing server 100 to restrict the broadcasting of the place-to-stay listing data 102 to one or more parts of the geospatial area 117. For example, in the embodiment of FIG. 1, the radial distribution module 140 (e.g., that applies the radial algorithm 240 of FIG. 2 using a series of modules working in concert as described in FIG. 2) may instruct the short-term listing server 100 to broadcast the place-to-stay listing data 102 to the recipients 114 but not to an area outside threshold radial distance 115. It will be understood with those with skill in the art that 'short-term' may refer to a stay in a private residence of a home (e.g., a room of the home and/or the entire home), a stay in an apartment for a limited duration that is offered by an owner of the property (e.g., month to month, one year or less), a bed-and-breakfast, etc.

In one or more embodiments, the radial distribution module 140 (e.g., that applies the radial algorithm 240 of FIG. 2 using a series of modules working in concert as described in FIG. 2) may allow the short-term listing server 100 to function in manner that simulates a traditional radio broadcast (e.g., using a radio tower to transmit a radio frequency signal) in that both the short-term listing server 100 and the radio broadcast are restricted in the geospatial scope of the broadcast transmission. In one or more embodiments, the radial distribution module 140 (e.g., that applies the radial algorithm 240 of FIG. 2 using a series of modules working in concert as described in FIG. 2) may prevent the broadcast of the place-to-stay listing data 102 to any geospatial area to which the user 106 does not wish to transmit the place-to-stay listing data 102, and/or to users that have either muted and/or selectively subscribed to a set of broadcast feeds.

The radial distribution module 140 (e.g., that applies the radial algorithm 240 of FIG. 2 using a series of modules working in concert as described in FIG. 2) may analyze the place-to-stay listing data 102 to determine which recipients 114 may receive notification data 112 within a threshold radial distance 119 (e.g., set by the user 106 and/or auto calculated based on a type of real estate listing). The radial distribution module 140 (e.g., that applies the radial algorithm 240 of FIG. 2 using a series of modules working in concert as described in FIG. 2) may use a variety of parameters, including information associated with the place-to-stay listing data 102 (e.g. real estate type, a lot size, a square footage, a photograph, a video, a bedroom count, a room size, a description, a cost per month, a rental price, a leasing rate, a number of stories, and/or a location, etc.) to determine the threshold radial distance 119.

The radial distribution module 140 (e.g., that applies the radial algorithm 240 of FIG. 2 using a series of modules working in concert as described in FIG. 2) may also determine which verified addresses associated with recipients 114 having verified user profiles are located within the threshold radial distance 119. The radial distribution module 140 (e.g., that applies the radial algorithm 240 of FIG. 2 using a series of modules working in concert as described in FIG. 2) may then broadcast the notification data 112 to the profiles and/or mobile devices of the verified users having verified addresses within the threshold radial distance 119.

The radial distribution module 140 (e.g., that applies the radial algorithm 240 of FIG. 2 using a series of modules working in concert as described in FIG. 2) may therefore simulate traditional radio broadcasting (e.g. from a radio station transmission tower) over the IP network. Thus, the radial distribution module 140 (e.g., that applies the radial algorithm 240 of FIG. 2 using a series of modules working in concert as described in FIG. 2) may allow the broadcast to include information and data that traditional radio broadcasts may not be able to convey, for example geospatial coordinates 103 and/or real-time bi-directional communications. Additionally, the radial distribution module 140 (e.g., that applies the radial algorithm 240 of FIG. 2 using a series of modules working in concert as described in FIG. 2) may allow individual users low-entry broadcast capability without resort to expensive equipment and/or licensing by the Federal Communications Commission (FCC).

Another advantage of this broadcast via the radial distribution module 140 (e.g., that applies the radial algorithm 240 of FIG. 2 using a series of modules working in concert as described in FIG. 2) may be that it may bypass obstructions that traditionally disrupt radio waves such as mountains and/or atmospheric disturbances. Yet another advantage of the radial distribution module 140 (e.g., that applies the radial algorithm 240 of FIG. 2 using a series of modules working in concert as described in FIG. 2) may be that it may expand the physical distance of broadcast capability without resort to the expense ordinarily associated with generating powerful carrier signals. In yet another advantage, the radial distribution module 140 (e.g., that applies the radial algorithm 240 of FIG. 2 using a series of modules working in concert as described in FIG. 2) may allow for almost unlimited channels and/or stations as compared to traditional radio where only a narrow band of electromagnetic radiation has been appropriated for use among a small number of entities by government regulators (e.g. the FCC).

The user 106 may be an individual who operates the device 104 (e.g., a mobile device 504) to generate the place-to-stay listing data 102. It will be understood by those skilled in the art that the verified nature of the user may be an optional characteristic in an alternate embodiment. This means that in an alternate embodiment, any user (whether verified or not) may generate the place-to-stay listing data 102 through the device 104 (e.g., a mobile device 504). In another alternative embodiment, the user 106 may be an electronic sensor, such as a detection sensor device (e.g., a sensory detection sensor device such as a motion detector, a chemical detection device, etc.), and/or an appliance (e.g., such as a refrigerator, a home security network, and/or a motion detector). It should also be noted that the 'mobile' nature of the device 104 may be optional in yet another alternative embodiment. In such an alternate embodiment, any computing device, whether mobile/portable or fixed in location may generate the place-to-stay listing data 102.

The cellular network 108 may be associated with a telephone carrier (e.g., such as AT&T, Sprint, etc.) that provides an infrastructure through which communications are generated between the short-term listing server 100 and the interested parties 109 using the radial algorithm 240. For example, the cellular network 108 may provide a communication infrastructure through which the place-to-stay listing data 102 may be communicated as voice and/or text messages through telephones (e.g., standard telephones and/or smart phones) operated by at least some of the interested parties 109 of FIG. 1. It should be understood that in one embodiment, the interested parties 109 are paid subscribers/customers of the geospatially constrained social network 142 in a manner such that each of the interested parties 109 may pay a fee per received place-to-stay listing data 102, and/or each completed real estate transaction, to the geospatially constrained social network 142. The interested parties 109 may pay extra to be permitted access to receive the place-to-stay listing data 102 even when they do not have a transitory and/or non-transitory connection to a neighborhood if they service that neighborhood area though operating their business outside of it. For this reason, FIG. 1 visually illustrates that the interested parties 109 may be located (e.g., principal business address) outside the threshold radial distance 119.

The cellular network 108 (e.g., a mobile network) may be a wireless network distributed over land areas called cells, each served by at least one fixed-location transceiver, known as a cell site or base station through which the place-to-stay listing data 102 is distributed from the short-term listing server 100 to telephones of the interested parties 109 using the radial distribution module 140 (e.g., that applies the radial algorithm 240 of FIG. 2 using a series of modules working in concert as described in FIG. 2), according to one embodiment. The cellular network 108 may use a set of frequencies from neighboring cells, to avoid interference and provide guaranteed bandwidth within each cell, in one embodiment.

When joined together these cells of the cellular network 108 may provide radio coverage over a wide geographic area through the cellular network 108 in a manner that ensures that the place-to-stay listing data 102 may be simultaneously communicated via both IP networks (e.g., to the recipients 114) and/or to the interested parties 109 through the cellular network 108. It will be appreciated that the radial distribution module 140 (e.g., that applies the radial algorithm 240 of FIG. 2 using a series of modules working in concert as described in FIG. 2) in effect permits simultaneous updates to claimed user pages, unclaimed (preseeded) user pages in a geospatially constrained social network 142 (e.g., neighborhood social network) based on a geospatial location of the device 104 (e.g., a mobile device 504) in a manner that simulates a radio (RF) based network separately from the concepts described in conjunction with the cellular network 108. However, it will be understood that the radial distribution module 140 (e.g., that applies the radial algorithm 240 of FIG. 2 using a series of modules working in concert as described in FIG. 2) may be not restricted to such topology and can multimodally communicate through different networks, such as through the cellular network 108 described in FIG. 1.

The interested parties 109 may be locations, devices, and/or mobile phones associated with individuals and/or organizations for hire. The interested parties 109 may be notified when a real estate listing in an area that they care about including a non-transitory location (e.g., around where they live and/or work, regardless of where they currently are) and a transitory location (e.g., where they currently are) is posted using the device 104 (e.g., a mobile device 504) as the place-to-stay listing data 102.

Figure 3:
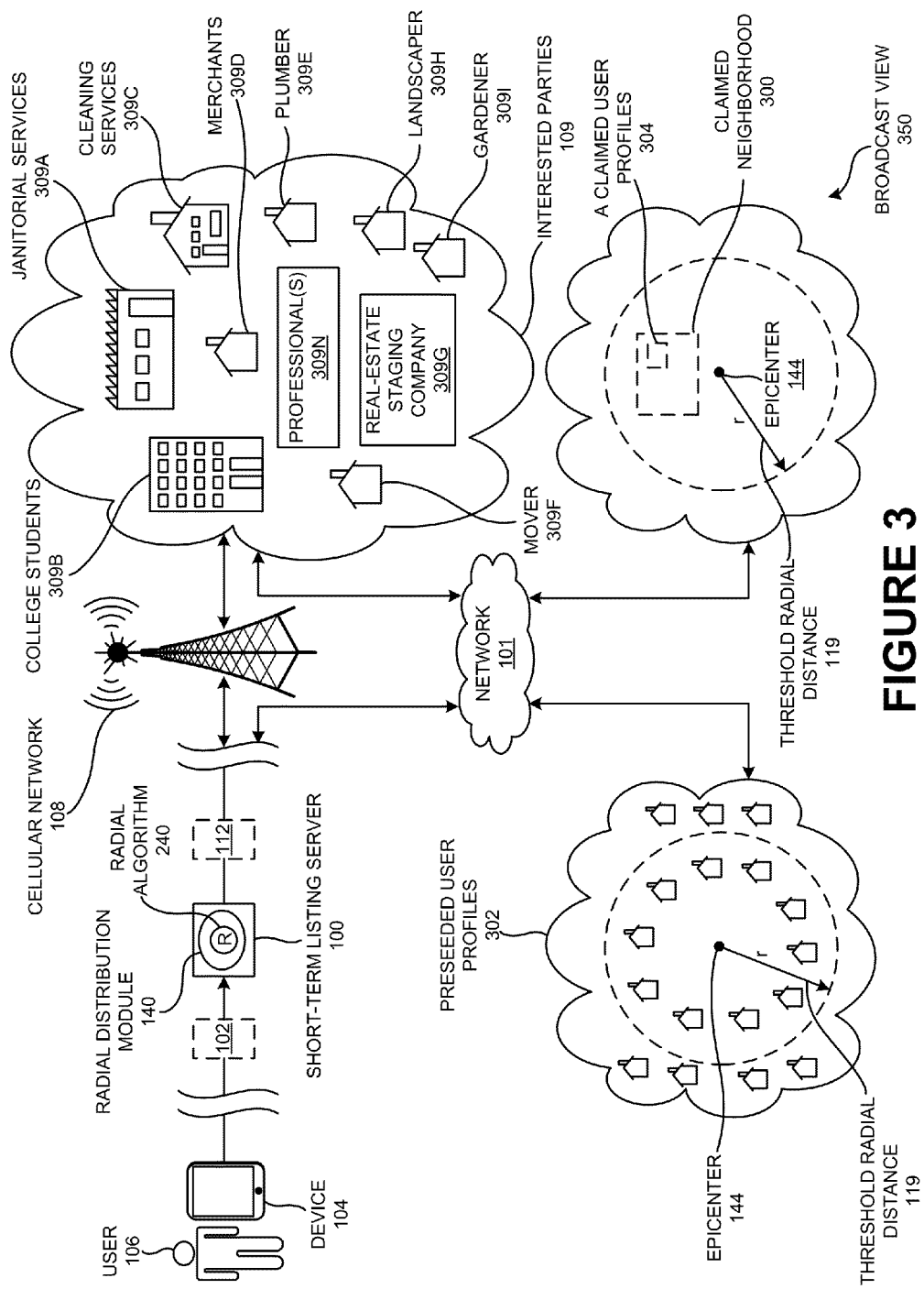
FIG. 3 is a broadcast view 350 that demonstrates how the radial distribution module 140 of FIG. 1 is used to communicate a place-to-stay listing data 102 to claimed user profiles, pre-seeded user profiles, and to telephone devices through a heterogeneous network formed through the internet protocol network of FIG. 1 and through a cellular network, according to one embodiment.

The interested parties 109 are illustrated in FIG. 3 as including a janitorial services 309A, a college students 309B, a cleaning services 309C, a merchants 309D, an plumber 309E, a mover 309F, a real estate staging company 309G, a landscaper 309H, a gardener 309I, and professional(s) 309N.

Figure 2:
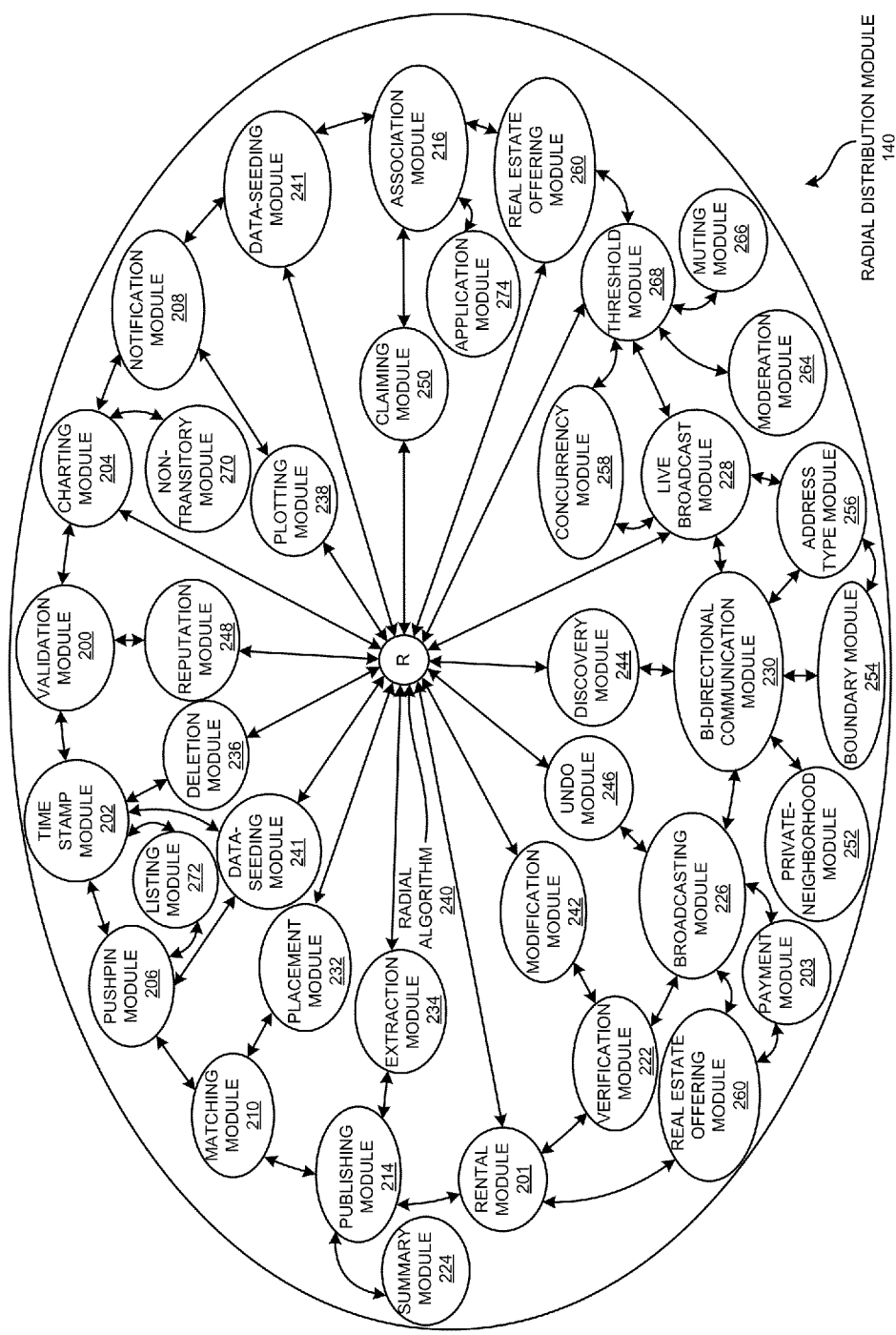
FIG. 2 is an exploded view of the radial distribution module 140 of FIG. 1 that applies the radial algorithm 240, according to one embodiment.

In this manner, mobile devices and/or desktop computers operated by the interested parties 109 may be alerted whenever the place-to-stay listing data 102 is posted in and/or around their neighborhood through a push notification (e.g., an alert popping up on their phone), through an email, a telephone call, and/or a voice message delivered to the particular mobile device operated by each of the interested parties 109 using the radial distribution module 140 (e.g., that applies the radial algorithm 240 of FIG. 2 using a series of modules working in concert as described in FIG. 2).

The place-to-stay listing data 102 may be delivered as notification data 112 from the short-term listing server 100 to the recipients 114 and/or to the interested parties 109 using the radial distribution module 140 (e.g., that applies the radial algorithm 240 of FIG. 2 using a series of modules working in concert as described in FIG. 2) of the short-term listing server 100.

The recipients 114 may be individuals that have claimed a profile (e.g., verified their profile through a postcard, a telephone lookup, a utility bill) associated with a particular non-transitory address (e.g., a home address, a work address) through a geospatial social network (e.g., a geospatially constrained social network 142 (e.g., a neighborhood social network such as Fatdoor.com, Nextdoor.com)) through which the short-term listing server 100 operates. The recipients 114 may be in a geo-fenced area, in that an epicenter 144 of a broadcast message from the device 104 (e.g., a mobile device 504) may be a center through which a radial distance is calculated based on a characteristic of the place-to-stay listing data 102. For example, a room for rent within a building where the owner resides (e.g., a house, apartment, etc.) may be delivered only to an immediate 0.1 mile radius so that the owner has the ability to restrict the recipients 114 of the place-to-stay listing data 102 to a group of people that the owner may wish to live with, whereas a house for rent may be automatically delivered to a broader 0.6 mile radius either automatically and/or through a user defined preference (e.g., set by the user 106).

It should be appreciated that individuals in an area outside the threshold radial distance 115 may not receive the place-to-stay listing data 102 because their geospatial address may be outside a radial boundary surrounding an epicenter 144 in which the place-to-stay listing data 102 originates. Additionally, the threshold radial distance 119 may be confined on its edges by a geospatial polygon at a juncture between area defined by recipients 114 and the area outside the threshold radial distance 115, according to one embodiment.

FIG. 2 is an exploded view of the radial distribution module 140 of FIG. 1 that applies the radial algorithm 240, according to one embodiment.

Particularly, FIG. 2 illustrates an exploded view of the radial distribution module 140, according to one embodiment. A variety of software instruction sets and/or hardware components form the radial distribution module 140, according to one embodiment. Select ones of these software instruction sets and/or hardware components utilize the radial algorithm 240 to perform functions related to radially distributing information to pre-seeded user profiles, user profiles, and telephone devices (e.g., land based phones, circuit switched phones).

A validation module 200 may determine that a place-to-stay listing data 102 generated through a device 104 (e.g., a mobile device 504) may be associated with a verified user (e.g., the user 106 of FIG. 1 as described as the verified user 706 in FIG. 7) of the short-term listing server 100) using a processor 120 and/or a memory 124. In addition, the validation module 200 may determine that the broadcast data (e.g., the place-to-stay listing data 102) is generated by the validated user (e.g., the user 106 of FIG. 1 as described as the verified user 706 in FIG. 7) of the neighborhood broadcast system (e.g., of the geospatially constrained social network 142) when analyzing that the broadcast data (e.g., the place-to-stay listing data 102) is associated with the device 104 (e.g., a mobile device 504). The validation module 200 may apply the radial algorithm 240 to determine if the verified user 706 may be in a validated geospatial location based on previous history of the verified user 706, according to one embodiment.

The place-to-stay listing data 102 is associated with a room for rent in a private residential home, in a preferred embodiment. In this preferred embodiment, the r In addition, the validation module 200 may ensure that a set of geospatial coordinates 103 associated with the place-to-stay listing data 102 generated through the device 104 (e.g., a mobile device 504) are trusted based on a claimed geospatial location (e.g., any of the claimed geospatial locations 700 as described in FIG. 7) of the verified user (e.g., the user 106 of FIG. 1 as described as the verified user 706 in FIG. 7) of the short-term listing server 100.

Figure 7:
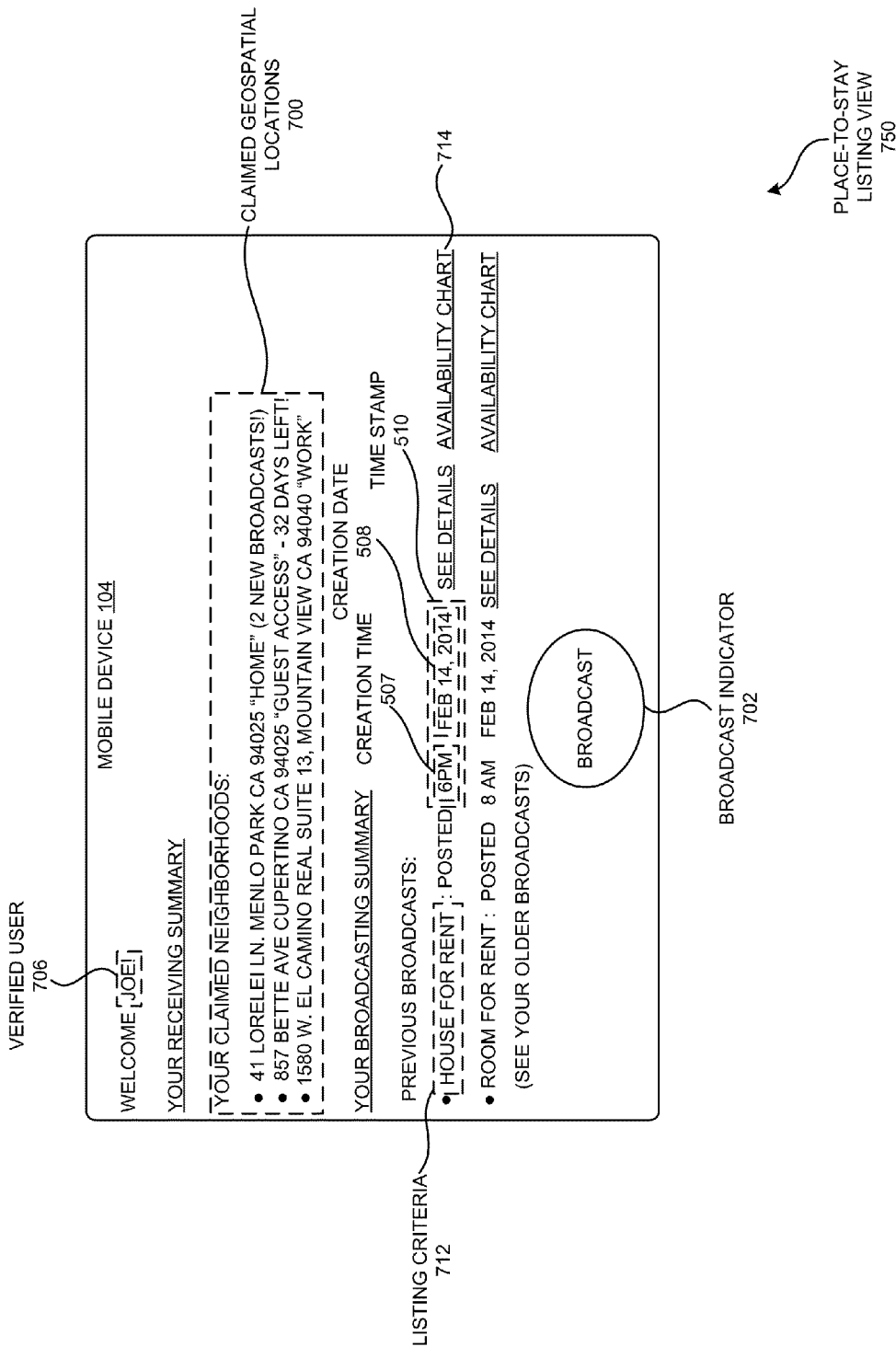
FIG. 7 is a place-to-stay listing view 750 that shows how a broadcasting user creates a broadcast of a real estate listing, according to one embodiment.

A verification module 222 may ensure that a set of geospatial coordinates 103 associated with the place-to-stay listing data 102 generated through the device 104 (e.g., the mobile device 504) are trusted based on a claimed geospatial location (e.g., any of the claimed geospatial locations 700 as described in FIG. 7) of the verified user (e.g., the user 106 of FIG. 1 as described as the verified user 706 in FIG. 7) of the short-term listing server 100. A rental module 201 may enable the user 106 to view and/or rent the place to stay.

A time stamp module 202 may determine that a time stamp 510 associated with a creation date 508 and/or a creation time 507 of the place-to-stay listing data 102 generated through the device 104 (e.g., the mobile device 504) may be trusted based on the claimed geospatial location (e.g., any of the claimed geospatial locations 700 as described in FIG. 7) of the verified user (e.g., the user 106 of FIG. 1 as described as the verified user 706 in FIG. 7) of the short-term listing server 100.

A broadcasting module 226 may automatically publish the place-to-stay listing data 102 on a set of user profiles (e.g., preseeded user profiles 302 and/or claimed user profiles 304 as described in FIG. 3 having associated verified addresses in the threshold radial distance 119 from the set of geospatial coordinates 103 associated with the place-to-stay listing data 102 generated through the device 104 (e.g., the mobile device 504) of the verified user (e.g., the user 106 of FIG. 1 as described as the verified user 706 in FIG. 7) of the short-term listing server 100) using the radial algorithm 240.

A listing module 272 may determine a listing criteria 712 associated with the place-to-stay listing data 102 including a real estate type, a lot size, a square footage, a photograph, a video, a bedroom count, a room size, a description, a cost per month, a rental price, a leasing rate, a number of stories, and/or a location of a real estate opportunity offered through the place-to-stay listing data 102, wherein the real estate listing opportunity may be an opportunity to rent, lease, and/or sublease a house, apartment, commercial space, and/or other building.

A charting module 204 may populate an availability chart 714 when a real estate listing associated with the listing criteria 712 is posted, wherein the availability chart includes at least one of a front door key delivery availability timing of the verified user, an on-home lockbox access key, and/or an occupancy availability of the real estate listing. An application module 274 may communicate the broadcast data (e.g., the place-to-stay listing data 102) to the neighborhood broadcasting system when the broadcast data (e.g., the place-to-stay listing data 102) may be processed, and/or to associate the verified user (e.g., the user 106 of FIG. 1 as described as the verified user 706 in FIG. 7) with a verified user (e.g., the user 106 of FIG. 1 as described as the verified user 706 in FIG. 7) profile in the neighborhood broadcasting system through the application on the device 104 (e.g., the mobile device 504).

A pushpin module 206 may present the place-to-stay listing data 102 generated through the device 104 (e.g., the mobile device 504) as a real estate pushpin of the real estate broadcast in a geospatial map surrounding pre-populated residential and/or business listings in a surrounding vicinity, such that the real estate pushpin of the real estate broadcast may be automatically presented on the geospatial map in addition to being presented on the set of user profiles (e.g., preseeded user profiles 302 and/or claimed user profiles 304 as described in FIG. 3 having associated verified addresses in the threshold radial distance 119 from the set of geospatial coordinates 103 associated with the place-to-stay listing data 102 generated through the device 104 (e.g., the mobile device 504) of the verified user (e.g., the user 106 of FIG. 1 as described as the verified user 706 in FIG. 7) of the short-term listing server 100).

A radial distribution module 140 may radially distribute the place-to-stay listing data 102 generated through the device 104 (e.g., the mobile device 504) through an on-page posting, an electronic communication, and/or a push notification delivered to desktop and/or device 104s (e.g., the mobile device 504s) associated with users and/or their user profiles (e.g., preseeded user profiles 302 and/or claimed user profiles 304 as described in FIG. 3) around an epicenter 144 defined at the set of geospatial coordinates 103 associated with the place-to-stay listing data 102 generated through the device 104 (e.g., the mobile device 504) to all subscribed user profiles (e.g., preseeded user profiles 302 and/or claimed user profiles 304 as described in FIG. 3) in a circular geo-fenced area defined by the threshold distance from the set of geospatial coordinates 103 associated with the place-to-stay listing data 102 generated through the device 104 (e.g., the mobile device 504) through the radial algorithm 240 of a neighborhood broadcasting system that measures a distance away of each address associated with each user profile from the current geospatial location at the epicenter 144. A placement module 232 may enable the verified user (e.g., the user 106 of FIG. 1 as described as the verified user 706 in FIG. 7) to drag and/or drop the real estate pushpin on any location on the geospatial map, and/or automatically determine a latitude and/or a longitude associated a placed location.

A real estate offering module 260 may generate a for-rent view of the real estate associated with the real estate listing in which the verified user (e.g., the user 106 of FIG. 1 as described as the verified user 706 in FIG. 7 of the short-term listing server 100) offers the real estate for rent through the short-term listing server 100 to other users in the threshold radial distance 119 from the set of geospatial coordinates 103 associated with the place-to-stay listing data 102 of the verified user (e.g., the user 106 of FIG. 1 as described as the verified user 706 in FIG. 7) of the short-term listing server 100.

A notification module 208 may automatically notify a janitorial services 309A, a college students 309B, a cleaning services 309C, a merchants 309D, an plumber 309E, a mover 309F, a real estate staging company 309G, a landscaper 309H, a gardener 309I, and/or professional(s) 309N in a surrounding geospatial area to the set of geospatial coordinates 103 associated with the place-to-stay listing data 102 generated through the device 104 (e.g., the mobile device 504).

An extraction module 234 may separate the geospatial coordinates 103 from a metadata associated with the place-to-stay listing data 102 generated through the device 104 (e.g., the mobile device 504) when verifying that the set of geospatial coordinates 103 associated with the place-to-stay listing data 102 generated through the device 104 (e.g., the mobile device 504) are trusted based on the claimed geospatial location (e.g., any of the claimed geospatial locations 700 as described in FIG. 7 of the verified user (e.g., the user 106 of FIG. 1 as described as the verified user 706 in FIG. 7) of the short-term listing server 100).

A matching module 210 may determine a relative match between a persistent clock associated with the short-term listing server 100 and/or a digital clock of the device 104 (e.g., the mobile device 504) to determine that the time stamp 510 associated with the creation date 508 and/or time of the place-to-stay listing data 102 generated through the device 104 (e.g., the mobile device 504) may be accurate and/or therefore trusted.

A deletion module 236 may automatically remove a publishing of the place-to-stay listing data 102 generated through the device 104 (e.g., the mobile device 504) on a set of user profiles (e.g., preseeded user profiles 302 and/or claimed user profiles 304 as described in FIG. 3 having associated verified addresses in the threshold radial distance 119 from the set of geospatial coordinates 103 associated with the place-to-stay listing data 102 generated through the device 104 (e.g., the mobile device 504) of the verified user (e.g., the user 106 of FIG. 1 as described as the verified user 706 in FIG. 7) of the short-term listing server 100) based on a job alert expiration time. A plotting module 238 may geocode a set of residential addresses each associated with a resident name in a neighborhood surrounding the device 104 (e.g., the mobile device 504).

A data-seeding module 241 may prepopulate the set of residential addresses each associated with the resident name as the set of user profiles (e.g., preseeded user profiles 302 and/or claimed user profiles 304 as described in FIG. 3 in the threshold radial distance 119 from the claimed geospatial location (e.g., any of the claimed geospatial locations 700 as described in FIG. 7 of the verified user (e.g., the user 106 of FIG. 1 as described as the verified user 706 in FIG. 7) of the short-term listing server 100) in a neighborhood curation system (e.g., part of the geospatially constrained social network 142) communicatively coupled with the short-term listing server 100.

A modification module 242 may alter content in each of the set of user profiles (e.g., preseeded user profiles 302 and/or claimed user profiles 304 as described in FIG. 3). A discovery module 244 may track the submitted reviews through the neighborhood curation system (e.g., part of the geospatially constrained social network 142). An undo module 246 may generate a reversible history journal associated with each of the set of user profiles (e.g., preseeded user profiles 302 and/or claimed user profiles 304 as described in FIG. 3 such that a reviews of the verified user (e.g., the user 106 of FIG. 1 as described as the verified user 706 in FIG. 7) can be undone on a modified user profile page. A reputation module 248 may determine an reviewing credibility of the verified user (e.g., the user 106 of FIG. 1 as described as the verified user 706 in FIG. 7) based on an review history of the verified user (e.g., the user 106 of FIG. 1 as described as the verified user 706 in FIG. 7) and/or a community contribution validation of the verified user (e.g., the user 106 of FIG. 1 as described as the verified user 706 in FIG. 7) by other users of the neighborhood curation system (e.g., part of the geospatially constrained social network 142).

A publishing module 214 may automatically communicate the place-to-stay listing data 102 generated through the device 104 (e.g., the mobile device 504) to a set of user profiles (e.g., preseeded user profiles 302 and/or claimed user profiles 304 as described in FIG. 3 having associated verified addresses in a threshold radial distance 119 from the claimed geospatial location (e.g., any of the claimed geospatial locations 700 as described in FIG. 7 of the verified user (e.g., the user 106 of FIG. 1 as described as the verified user 706 in FIG. 7) of the short-term listing server 100) using the radial algorithm 240. A claiming module 250 may process a claim request of the verified user (e.g., the user 106 of FIG. 1 as described as the verified user 706 in FIG. 7) generating the place-to-stay listing data 102 generated through the device 104 (e.g., the mobile device 504) to be associated with an address of the neighborhood curation system (e.g., part of the geospatially constrained social network 142). A private-neighborhood module 252 may determine if the claimable neighborhood in the neighborhood curation system (e.g., part of the geo spatially constrained social network 142) may be associated with a private neighborhood community in the claimable neighborhood of the neighborhood curation system (e.g., part of the geospatially constrained social network 142).

An association module 216 may associate the verified user (e.g., the user 106 of FIG. 1 as described as the verified user 706 in FIG. 7) with the private neighborhood community in the claimable neighborhood of the neighborhood curation system (e.g., part of the geospatially constrained social network 142) if the private neighborhood community has been activated by the verified user (e.g., the user 106 of FIG. 1 as described as the verified user 706 in FIG. 7) and/or a different verified user (e.g., the user 106 of FIG. 1 as described as the verified user 706 in FIG. 7). A boundary module 254 may permit the verified user (e.g., the user 106 of FIG. 1 as described as the verified user 706 in FIG. 7) to draw a set of boundary lines in a form of a geospatial polygon such that the claimable neighborhood in a geospatial region surrounding the claim request creates the private neighborhood community in the neighborhood curation system (e.g., part of the geo spatially constrained social network 142) if the private neighborhood community may be inactive. An address type module 256 may verify the claim request of the verified user (e.g., the user 106 of FIG. 1 as described as the verified user 706 in FIG. 7) generating the place-to-stay listing data 102 generated through the device 104 (e.g., the mobile device 504) to be associated with a neighborhood address of the neighborhood curation system (e.g., part of the geospatially constrained social network 142) when the address may be determined to be associated with a work address and/or a residential address of the verified user (e.g., the user 106 of FIG. 1 as described as the verified user 706 in FIG. 7).

A concurrency module 258 may simultaneously publish the place-to-stay listing data 102 generated through the device 104 (e.g., the mobile device 504) on the private neighborhood community associated with the verified user (e.g., the user 106 of FIG. 1 as described as the verified user 706 in FIG. 7) generating the place-to-stay listing data 102 generated through the device 104 (e.g., the mobile device 504) in the threshold radial distance 119 from the address associated with the claim request of the verified user (e.g., the user 106 of FIG. 1 as described as the verified user 706 in FIG. 7) of the neighborhood curation system (e.g., part of the geo spatially constrained social network 142) when automatically publishing the place-to-stay listing data 102 generated through the device 104 (e.g., the mobile device 504) on a set of user profiles (e.g., preseeded user profiles 302 and/or claimed user profiles 304 as described in FIG. 3 having associated verified addresses in a threshold radial distance 119 from the claimed geospatial location (e.g., any of the claimed geospatial locations 700 as described in FIG. 7 of the verified user (e.g., the user 106 of FIG. 1 as described as the verified user 706 in FIG. 7) of the short-term listing server 100) based on a set of preferences of the verified user (e.g., the user 106 of FIG. 1 as described as the verified user 706 in FIG. 7) using the radial algorithm 240.

A summary module 224 may provide a summary data to the verified user (e.g., the user 106 of FIG. 1 as described as the verified user 706 in FIG. 7 of the short-term listing server 100) generated through the device 104 (e.g., the mobile device 504) of how many user profile pages were updated with an alert of the place-to-stay listing data 102 when publishing the place-to-stay listing data 102 in at least one of the private neighborhood community and/or the set of user profiles having associated verified addresses in the threshold radial distance 119 from the claimed geospatial location 103 of the verified user of the short-term listing server 100 based on the set of preferences of the verified user (e.g., the user 106 of FIG. 1 as described as the verified user 706 in FIG. 7).

A live broadcast module 228 may live broadcast the place-to-stay listing data 102 generated through the device 104 (e.g., the mobile device 504) to the different verified user (e.g., the user 106 of FIG. 1 as described as the verified user 706 in FIG. 7) and/or other verified user (e.g., the user 106 of FIG. 1 as described as the verified user 706 in FIG. 7) in the private neighborhood community and/or currently within the threshold radial distance 119 from the current geospatial location through the short-term listing server 100 through a multicast algorithm such that a live broadcast multicasts to a plurality of data processing systems associated with each of the different user and/or the other verified user (e.g., the user 106 of FIG. 1 as described as the verified user 706 in FIG. 7) simultaneously when the device 104 (e.g., the mobile device 504) of the verified user (e.g., the user 106 of FIG. 1 as described as the verified user 706 in FIG. 7) generating the live-broadcast enables broadcasting of the place-to-stay listing data 102 generated through the device 104 (e.g., the mobile device 504) to any one of a geospatial vicinity around the device 104 (e.g., the mobile device 504) of the verified user (e.g., the user 106 of FIG. 1 as described as the verified user 706 in FIG. 7) generating the broadcast and/or in any private neighborhood community in which the verified user (e.g., the user 106 of FIG. 1 as described as the verified user 706 in FIG. 7) has a non-transitory connection.

A bi-directional communication module 230 may permit the different verified user (e.g., the user 106 of FIG. 1 as described as the verified user 706 in FIG. 7) and/or other verified user (e.g., the user 106 of FIG. 1 as described as the verified user 706 in FIG. 7) in the private neighborhood community to bi-directionally communicate with the verified user (e.g., the user 106 of FIG. 1 as described as the verified user 706 in FIG. 7) generating the broadcast through the short-term listing server 100. A moderation module 264 may apply a crowdsourced moderation algorithm in which multiple neighbors to a geospatial area determine what content contributed to the short-term listing server 100 persists and/or which may be deleted. A muting module 266 may permit users to mute messages of specific verified user (e.g., the user 106 of FIG. 1 as described as the verified user 706 in FIG. 7) to prevent misuse of the short-term listing server 100 and/or for other purposes (e.g., to filter out undesired content, to filter out irrelevant content, etc.).

A threshold module 268 may automatically set the threshold distance between 0.2 and/or 0.4 miles from the set of geospatial coordinates 103 associated with the place-to-stay listing data 102 generated through the device 104 (e.g., the mobile device 504) to optimize a relevancy of the live-broadcast. A non-transitory module 270 may determine any private neighborhood community in which the verified user (e.g., the user 106 of FIG. 1 as described as the verified user 706 in FIG. 7) has a non-transitory connection may be a residential address of the verified user (e.g., the user 106 of FIG. 1 as described as the verified user 706 in FIG. 7) and/or a work address of the verified user (e.g., the user 106 of FIG. 1 as described as the verified user 706 in FIG. 7) that has been confirmed by the short-term listing server 100 as being associated with the verified user (e.g., the user 106 of FIG. 1 as described as the verified user 706 in FIG. 7).

FIG. 3 is a broadcast view 350 that demonstrates how the radial distribution module 140 of FIG. 1 is used to communicate a real estate opportunity broadcast data to claimed user profiles, pre-seeded user profiles, and to telephone devices through a heterogeneous network formed through the internet protocol network of FIG. 1 and through a cellular network, according to one embodiment.

Particularly, FIG. 3 illustrates a broadcast view 350, according to one embodiment. FIG. 3 introduces a claimed neighborhood 300, a set of preseeded user profiles 302, and a claimed user profile 304, and their relationships with elements previously described in FIG. 1. In addition, FIG. 3 explains the set of interested parties 109 of FIG. 1 to include a janitorial services 309A, a college students 309B, a cleaning services 309C, a merchants 309D, an plumber 309E, a mover 309F, a real estate staging company 309G, a landscaper 309H, a gardener 309I, and professional(s) 309N.

In FIG. 3, the claimed neighborhood 300 may refer to a region that may be claimed by the user 106 as being associated with a non-transitory location (e.g., a work address, a home address) of the user 106. The preseeded user profiles 302 may refer to address information from people and/or business directories that has been prepopulated in the geospatial social map and/or may be associated with manually placed pushpins on the geospatial map in the geospatially constrained social network 142 of FIG. 1. The claimed user profile 304 may refer to the verified user 706 associated with a verified address in the geospatial social map and/or may be associated with a claimed pushpin (e.g., a previously pre-seeded residential and/or business profile) on the geospatial map in the geospatially constrained social network 142 of FIG. 1.

The janitorial services 309A, a college students 309B, a cleaning services 309C, a merchants 309D, an plumber 309E, a mover 309F, a real estate staging company 309G, a landscaper 309H, a gardener 309I, and professional(s) 309N may receive the place-to-stay listing data 102 through their mobile devices, desktop devices, and/or through their cellular telephones. The janitorial services 309A, the college students 309B, the cleaning services 309C, the merchants 309D, the plumber 309E, the mover 309F, the real estate staging company 309G, the landscaper 309H, the gardener 309I, and the professional(s) 309N may receive the place-to-stay listing data 102 and may bi-directionally interact with the interested parties 109 through either cellular and/or through the network 101 (e.g., an internet protocol network). When a real estate opportunity is filled by the user 106 interacting with any one of the recipients based on the bi-directional communication, the user 106 may be able to hire, manage, and pay any one or more of the janitorial services 309A, the college students 309B, the cleaning services 309C, the merchants 309D, the plumber 309E, the mover 309F, the real estate staging company 309G, the landscaper 309H, the gardener 309I, and the professional(s) 309N, that may receive the place-to-stay listing data 102 through the short-term listing server 100.

The notification data 112 may be communicated through the network 101 to the preseeded user profiles 302 within a threshold radial distance 119 of the epicenter 144. Alternately, the notification data 112 may be communicated through the network 101 to different ones of the claimed user profile 304 within the claimed neighborhood 300 that are located within the threshold radial distance 119 from the epicenter 144. Additionally, as described in FIG. 4, it will be understood that the claimed neighborhood 300 may be situated partially within the threshold radial distance 119 and partially outside the threshold radial distance 119, yet the notification data 112 received by any of the recipients 114 (e.g., having a claimed user profile) may be propagated to other claimed user profiles within the claimed neighborhood 300 even though they are outside the threshold radial distance 119.

The notification data 112 may also be communicated through the cellular network 108 or through the network 101 to the set of interested parties 109. For example, the college students 309B may use the short-term listing network 150 to monitor real estate listings in a neighborhood and publish these real estate listings to residents around a geospatial area of the neighborhood. In addition, the janitorial services 309A may attract day laborers from different parts of a city who may wish to receive notification of real estate listings in a region around the hardware store because they desire work in the region around the hardware store. The cleaning services 309C, the merchants 309D, the plumber 309E, the mover 309F, the real estate staging company 309G, the landscaper 309H, the gardener 309I, and the professional(s) 309N may service a particular neighborhood and may be alerted of a new opportunity based on a subscription they pay to access broadcasts from areas that they service.

Additionally, it should be understood that other types of businesses may receive the notification data 112. For example, additional service providers such as retail shops, construction sub-contractors (such as painters, plumbers, electricians, etc.), and other parties or entities that may provide services needed in connection with a real estate transaction may receive notification data 112. Service providers may also be individual users who are offer services that may be needed in connection with real estate transactions around their home or office.

Figure 4:
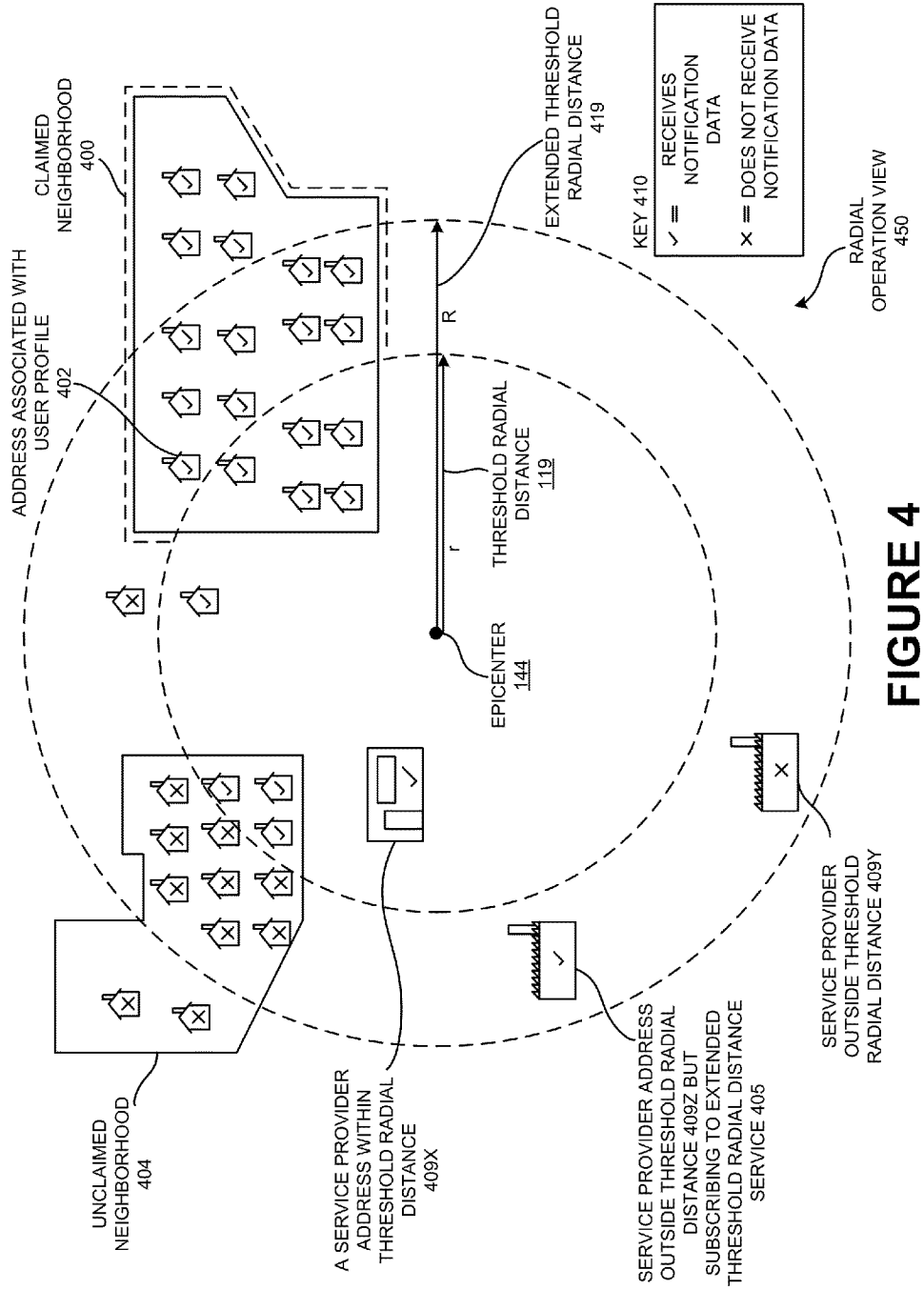
FIG. 4 is a radial operation view 450 that illustrates an expansion of a threshold radial distance 119 based on a claimed neighborhood 400 at a radial boundary surrounding the epicenter 144 formed by geospatial coordinates 103 of the device 104 of FIG. 1, according to one embodiment.

FIG. 4 is a radial operation view 450 that illustrates an expansion of a threshold radial distance 119 based on a claimed neighborhood 400 at a radial boundary surrounding the epicenter 144 formed by geospatial coordinates 103 of the device 104 of FIG. 1, according to one embodiment. FIG. 4 illustrates a claimed neighborhood 400, an address associated with a user profile 402, an unclaimed neighborhood 404, a service provider address outside the threshold radial distance 119 as described in operation 409Z but subscribing to extend the threshold radial distance 119 as described in operation 405, a service provider address within the threshold radial distance 119 as described in operation 409X, a service provider outside the threshold radial distance 119 in operation 409Y, and a key 410. The key 410 describes that a 'checkmark' inside a home in either the claimed neighborhood 400 and/or the unclaimed neighborhood 404 indicates that the place-to-stay listing data 102 reaches a user associated with that address at a radial geospatial distance away. In contrast, the key 410 describes that an 'X mark' inside a home in either the claimed neighborhood 400 and/or the unclaimed neighborhood 404 indicates that the place-to-stay listing data 102 does not reach a user associated with that address at a radial geospatial distance away.

Particularly, in FIG. 4, an address associated with each user profile 402 is illustrated, according to one embodiment. In FIG. 4, because the claimed neighborhood 400 is partially within the threshold radial distance 119 'r', every verified user in the claimed neighborhood 400 receives the place-to-stay listing data 102, according to one embodiment. Thereby, the radial broadcast distance 'r' is extended to a' as illustrated in FIG. 4 (e.g., the extended threshold radial distance 419 of FIG. 4). It should be understood that in an alternate embodiment, the radial broadcast of the place-to-stay listing data 102 may not extend to the entire group of users of the claimed neighborhood 400. However, to promote neighborhood communication and cooperation, the place-to-stay listing data 102 is illustrated as being extended to the claimed neighborhood 400 in the embodiment of FIG. 4.

It should be also noted that in some embodiments, the "preseeded user profiles" may be users that have previously signed up for the geospatially constrained social network 142, as opposed to users that have been preseeded there in a social network. For example, in one alternate embodiment, each of the claimed neighborhood 400 may serve as an approximate to actual radial distribution, in that broadcast messages are solely sent to claimed neighborhoods (e.g., private claimed neighborhoods) of actual users in a vicinity of a broadcast (rather than to public profiles).

FIG. 4 also illustrates an unclaimed neighborhood 404. The unclaimed neighborhood 404 may be preseeded based on public data, according to one embodiment. The unclaimed neighborhood has within it a series of addresses (e.g., associated with non-transitory homes and/or business locations), according to one embodiment as illustrated in FIG. 4. Those addresses in the unclaimed neighborhood 404 to whom the place-to-stay listing data 102 is delivered have a 'checkmark', according to one embodiment. In contrast, those addresses in the unclaimed neighborhood 404 to whom the place-to-stay listing data 102 is not delivered have an 'X mark', as illustrated in FIG. 4. Particularly, addresses in the radial boundary 'r' have a check mark, whereas addresses that extend from the radial boundary 'r' (e.g., and therefore outside the threshold radial distance 119) are marked with the 'X mark'. In this example embodiment of FIG. 4 showing the unclaimed neighborhood 404, the addresses within the threshold radial distance 119 are the addresses that receive the place-to-stay listing data 102.

Also illustrated in FIG. 4 is the concept of the service provider address within the threshold radial distance 119 as shown in operation 409X, the service provider address outside the threshold radial distance 119 but subscribing to extend threshold radial distance 119 service as shown in operation 405, and the service provider outside the threshold radial distance 119 as illustrated in operation 409Y. Each of these different operations will be compared and contrasted.

The service provider address in operation 409X may receive the place-to-stay listing data 102 because the service provider in this example embodiment of FIG. 4 is within the threshold radial distance 119, according to one embodiment. The service provider address in operation 405 may receive the place-to-stay listing data 102 because they provide a consideration (e.g., pay a monthly subscription, annual fee, and/or pay per access/use fee) to the geospatially constrained social network 142, even though the service provider in operation 405 does not have a physical address within the threshold radial distance 119. The geospatially constrained social network 142 (e.g., or short-term listing server 100) may verify, confirm, and/or ask for an assurance that the service provider actually provides services to homes/businesses in the threshold radial distance 119. The geospatially constrained social network 142 (and other the short-term listing server 100) may request feedback, reviews, and comments from homes/businesses in the geospatially constrained social network 142 for the service providers in operation 405 and operation 409X to ensure that they continue to be recommended and/or are permitted to participate in the threshold radial distance 119 around the epicenter 144 (e.g., where the broadcast originates) in the geospatially constrained social network 142. Operation 409Y indicates that a service provider outside the threshold radial distance 119 does not receive the place-to-stay listing data 102, and therefore cannot participate bi-directionally in the geospatially constrained social network 142.

Figure 5:
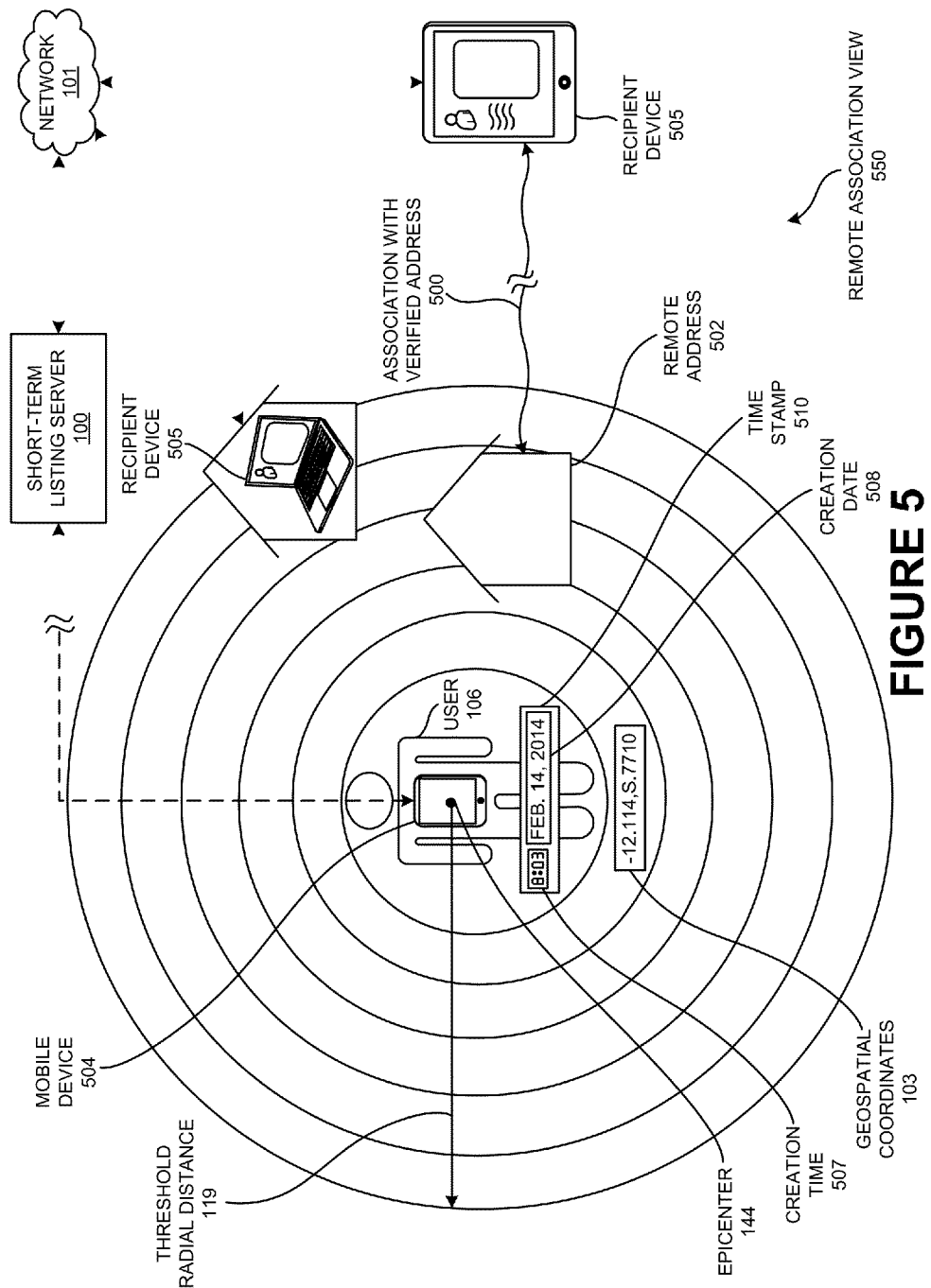
FIG. 5 illustrates a remote association view 550 in which a mobile device 505 (e.g., the recipient device) of a recipient 114 receives the place-to-stay listing data 102 of FIG. 3 based on a non-transitory claimed address associated with a profile of the recipient 114 even when the recipient 114's mobile device is outside a threshold radial distance 119 of a broadcast, according to one embodiment.

FIG. 5 illustrates a remote association view 550 in which a mobile device 505 (e.g., the recipient device 505) of a recipient 114 receives the place-to-stay listing data 102 of FIG. 3 based on a non-transitory claimed address associated with a profile of the employer even when the recipient 114's mobile device is outside a threshold radial distance 119 of a broadcast, according to one embodiment.

Particularly, FIG. 5 illustrates an operation 500 which illustrates the recipient device 505 can be associated to a remote address 502, and a time stamp 510 associated with a creation time 507, a creation date 508, and a set of geospatial coordinates 103. The remote address 502 may be a non-transitory location such as a home and/or a work address of the recipient 114 (e.g., the user 106 generating the place-to-stay listing data 102), according to one embodiment. The non-transitory location may be a place of domicile (e.g., a home) and/or a place of situs (e.g., a physical location and/or a principle place of business) of a property (e.g., a work address) and/or business associated with the user 106), according to one embodiment.

The concept illustrates that the recipient 114 may be located at a physical location outside the threshold radial distance 119 and still get the place-to-stay listing data 102 if the recipient device (e.g., the recipient device 505) has verified an address at a location that they care about and/or are associated with (e.g., a location in which they live, work, and/or have guest access) that is within the threshold radial distance 119. In other words, the user 106 may receive broadcast (e.g., the place-to-stay listing data 102 which may be live streamed and/or through after the event notifications) related to a radial distance from their home and/or work even when physically at a location outside their claimed non-transitory location.

Figure 6:
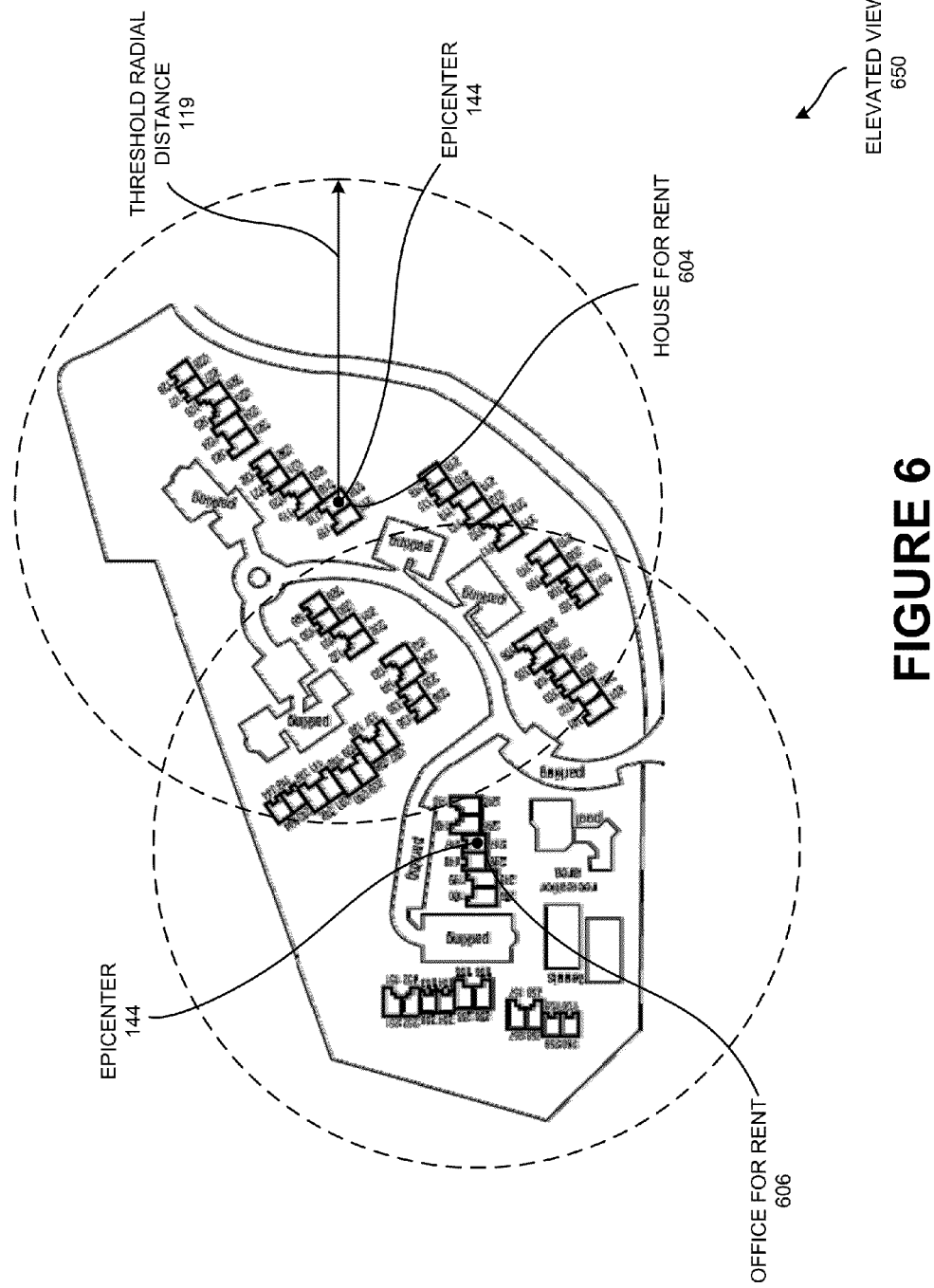
FIG. 6 is an elevated view 650 that illustrates the concept of the short-term listing network 150 of FIG. 1, according to one embodiment.

FIG. 6 is an elevated view 650 that illustrates the concept of the short-term listing network 150 of FIG. 1, according to one embodiment. Particularly, FIG. 6 illustrates a house for rent 604, and an office for rent 606, within which one or more users (e.g., the user 106) (not shown) at an epicenter 144 may use a radial broadcast to send a place-to-stay listing data 102 a threshold radial distance 119 and an extended threshold radial distance 419 from a set of geospatial coordinates 103 associated with the place-to-stay listing data 102 using a radial algorithm 240, according to one or more embodiments. According to the embodiment of FIG. 6, the place-to-stay listing data 102 may be automatically published on a set of user profiles having associated verified addresses in a radial boundary 'r' within a threshold radial distance 119 from a set of geospatial coordinates 103 associated with the place-to-stay listing data 102 using a radial algorithm 240. The place-to-stay listing data 102 may not be automatically published on a set of user profiles having associated verified addresses outside of the radial boundary 'r' (e.g., the verified addresses are outside of the threshold radial distance 119, the verified addresses are not within a claimed neighborhood, etc.). In addition, a set of user profiles having associated verified addresses within the threshold radial distance 119 of more than one radial broadcast may receive automatic publishing of the place-to-stay listing data 102 from more than one radial broadcast, according to one embodiment.

FIG. 7 is a place-to-stay listing view 750 that explains how a broadcasting user (e.g., a verified user 706) creates a broadcast of a real estate listing and manages notifications in neighborhoods that they have claimed, according to one embodiment. Particularly, FIG. 7 describes claimed geospatial locations 700 of a verified user 706 ('Joe'), and associated information with a real estate listing broadcast generated by Joe using a broadcast indicator 702. The associated information includes a listing criteria 712, a creation time 507, a creation date 508, a time stamp 510, and an availability chart 714. The listing criteria 712 may include information about what type of real estate listing (e.g., 'Room for Rent') Joe is making through the short-term listing server 100. The creation time 507 and creation date 508 (grouped as the time stamp 510) may indicate when the listing criteria 712 was created. The availability chart 714 may indicate a front door key delivery availability timing of the verified user 706, an on-home lockbox access key, and/or an occupancy availability of the real estate listing.

Figure 8:
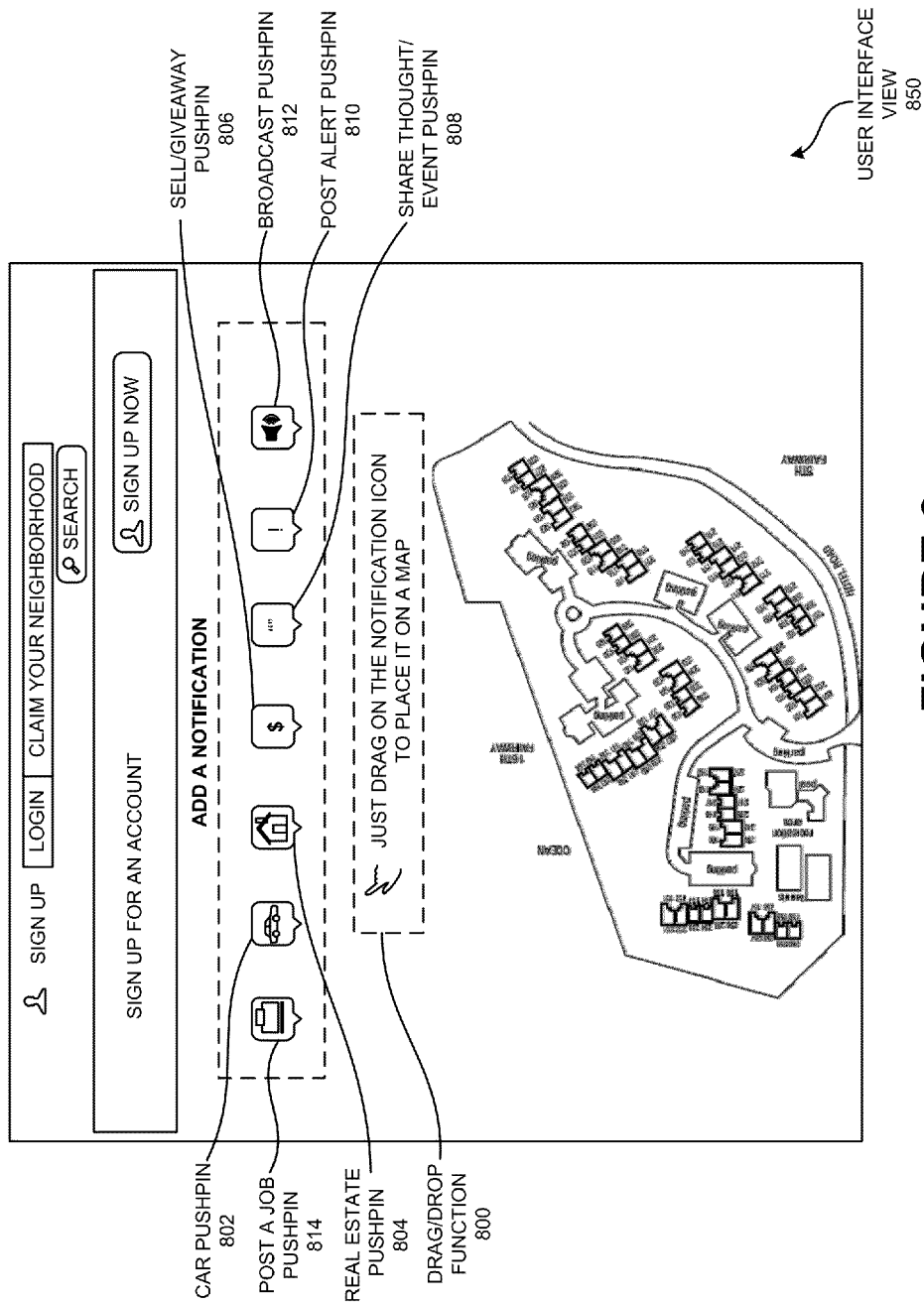
FIG. 8 is a user interface view 850 that explains how a user drags pushpins to a map including a broadcast pushpin, which is different than other pushpins in that a time and a location of the broadcast pushpin is fixed based on a set of geospatial coordinates 103 associated with a device 104 of the broadcasting user of FIG. 7, according to one embodiment.

FIG. 8 is a user interface view 850 that explains how a user drags pushpins to a map including a broadcast pushpin, which is different than other pushpins in that a time and a location of the broadcast pushpin is fixed based on a set of geospatial coordinates 103 associated with a device 104 of the broadcasting user of FIG. 7, according to one embodiment. Particularly, FIG. 8 illustrates a drag/drop function 800 associated with a car pushpin 802, a real estate pushpin 804, a sell/giveaway pushpin 806, a share thought/event pushpin 808, a post alert pushpin 810, a broadcast pushpin 812, and a post a job pushpin 814, according to one embodiment.

In FIG. 8, the broadcast pushpin 812 (e.g., that may generate the place-to-stay listing data 102) may be unique in that it can only be placed through a device (e.g., the device 104) that has a geo-spatial chip and which can verify a geo-spatial location of a device making the broadcast. In this way, the broadcast pushpin 812 is fixed in time and place, whereas the other pushpins can be manually dragged to the map through the drag/drop function 800.

Figure 9:
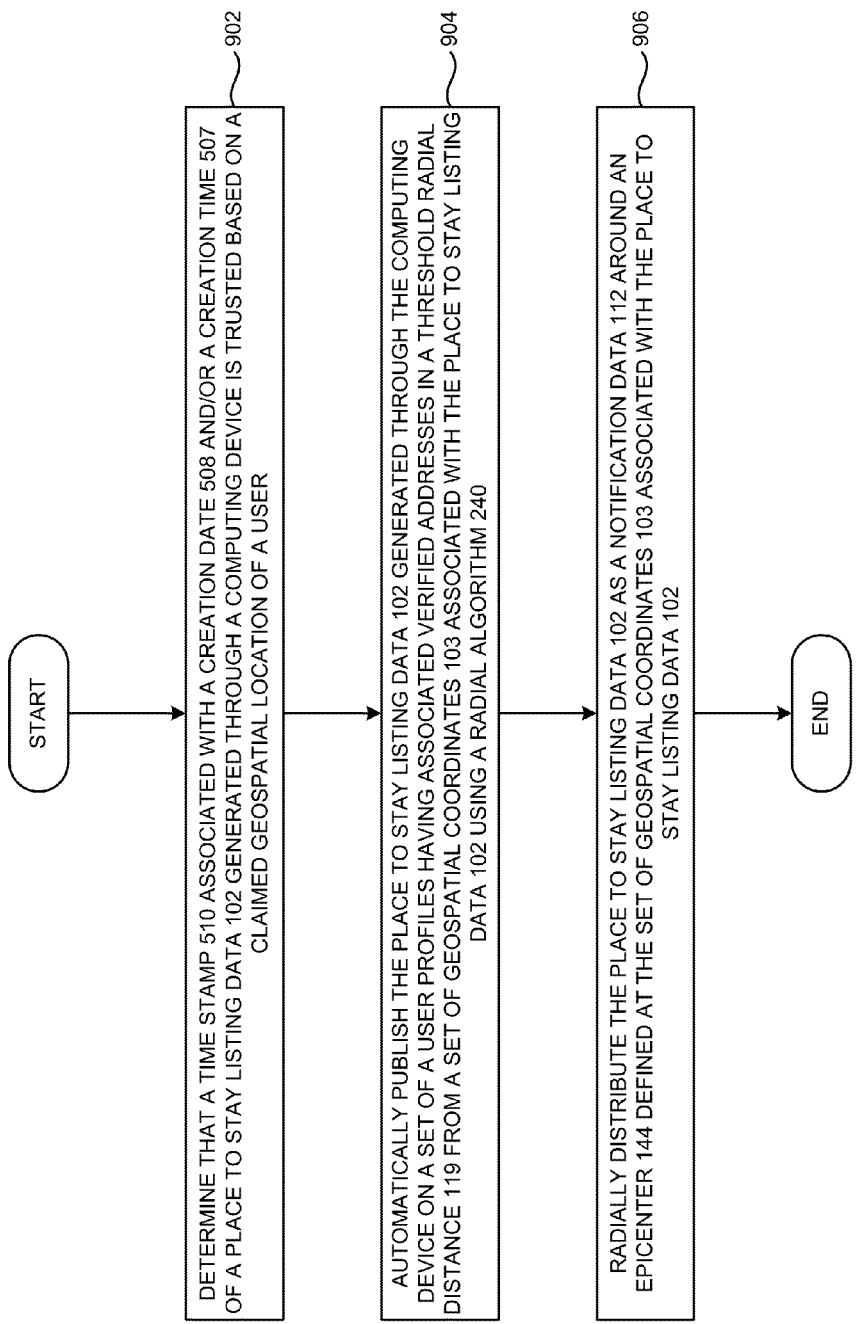
FIG. 9 is a process flow of radially distributing the place-to-stay listing data 102 of FIG. 3 as a notification data 112 around an epicenter 144 defined at the set of geospatial coordinates 103 of FIG. 8 associated with the place-to-stay listing data 102, according to one embodiment.

FIG. 9 is a process flow of radially distributing the place-to-stay listing data 102 of FIG. 3 as a notification data 112 around an epicenter 144 defined at the set of geospatial coordinates 103 of FIG. 8 associated with the place-to-stay listing data 102, according to one embodiment. Particularly, in FIG. 9, operation 902 may determine that a time stamp 510 associated with a creation date 508 and/or a creation time 507 of the place-to-stay listing data 102 generated through a computing device (e.g., the device 104) is trusted based on a claimed geospatial location of a user (e.g., the user 106), according to one embodiment. Then, in operation 904, the place-to-stay listing data 102 generated through the computing device may be automatically published on a set of user profiles having associated verified addresses in a threshold radial distance 119 from a set of geospatial coordinates 103 associated with the place-to-stay listing data 102 using a radial algorithm 240. Next, in operation 906, the place-to-stay listing data 102 may be radially distributed as the notification data 112 around an epicenter 144 defined at the set of geospatial coordinates 103 associated with the place-to-stay listing data 102.

Figure 10:
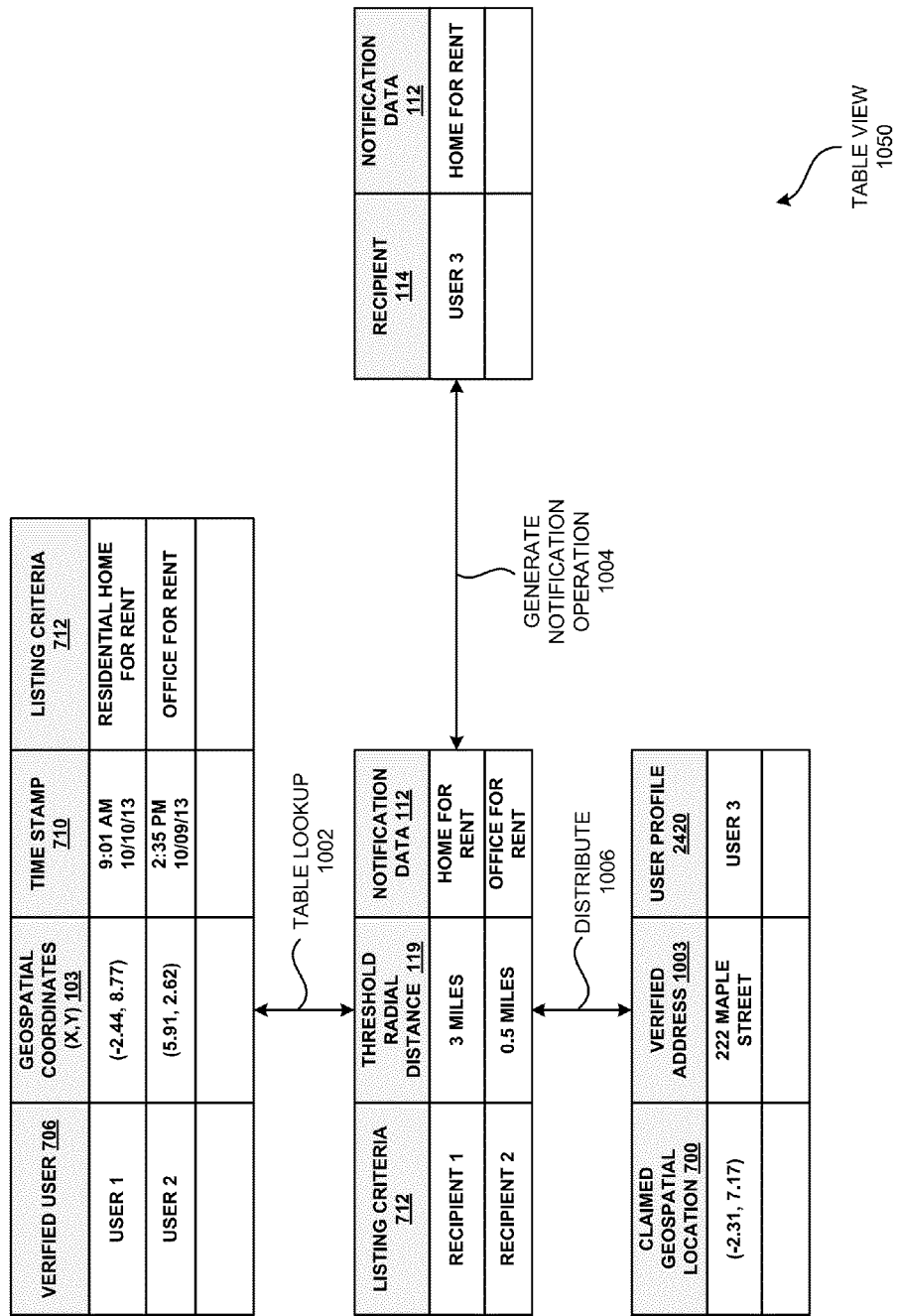
FIG. 10 is a table view 1050 illustrating data relationships between users, locations, and with a set of notification types needed to generate a broadcast, according to one embodiment.

FIG. 10 is a table view 1050 illustrating data relationships between users, locations, and with a set of notification types needed to generate a broadcast, according to one embodiment. In FIG. 10, a table lookup 1002 may be performed in which a listing criteria 712 (e.g., a real estate listing type (e.g., house for rent, room for rent, apartment for rent, office space for rent, etc.), number of bedrooms, square footage, lot size, number of bathrooms, etc.) is matched with a threshold radial distance 119 and a notification data 112. Then, a notification may be generated using the generate notification operation 1004 from the recipient, and distributed to the verified address (e.g., the verified address 1003) in the threshold radial distance 119 using the distribute operation 1006, according to one embodiment.

Figure 11:
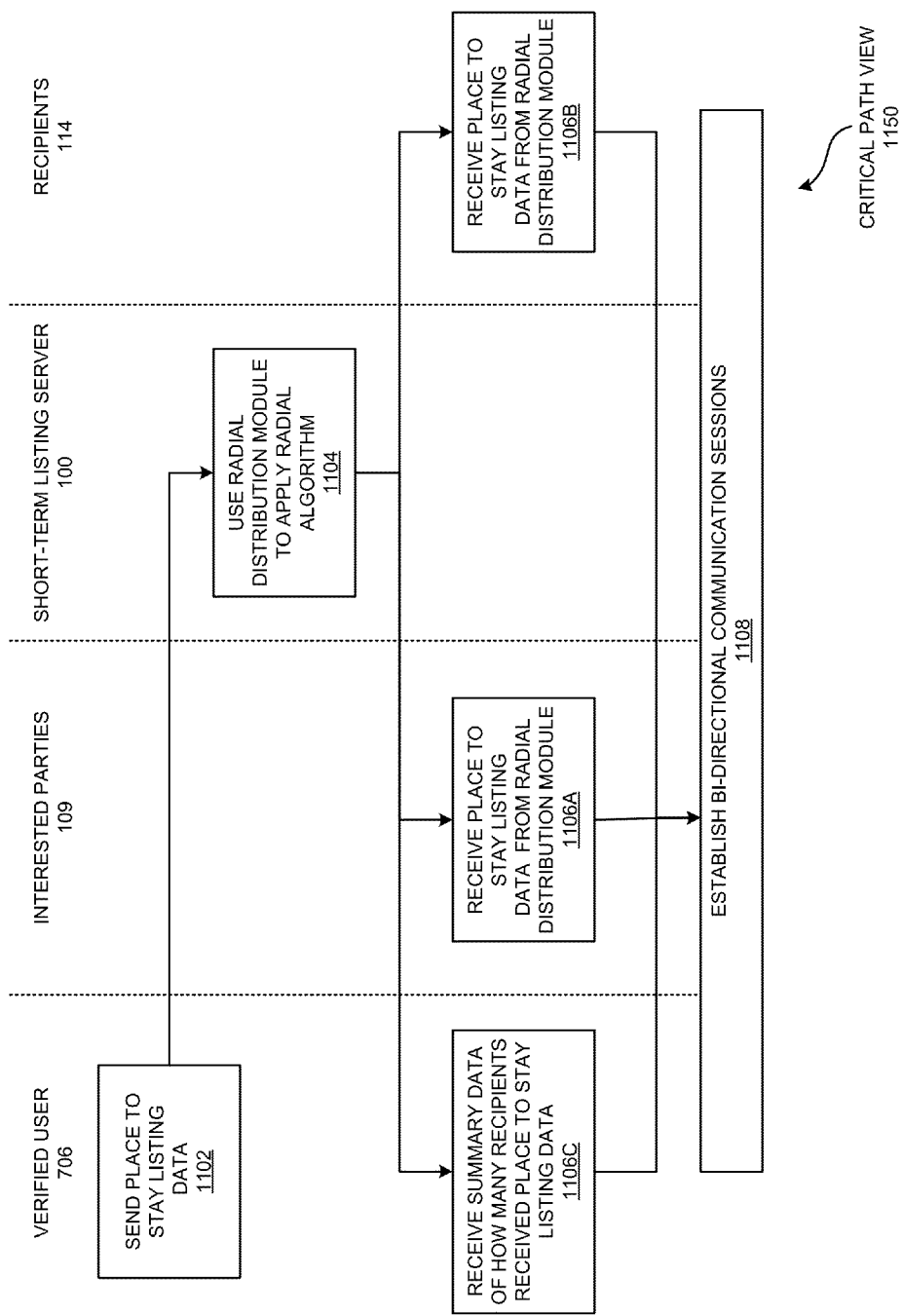
FIG. 11 is a critical path view 1150 illustrating a flow based on time in which critical operations in establishing a bi-directional session between a verified user and those individuals receiving the place-to-stay listing data 102 of FIG. 3 is established, according to one embodiment.

FIG. 11 is a critical path view 1150 illustrating a flow based on time in which critical operations in establishing a bi-directional session between a verified user and those individuals receiving the place-to-stay listing data 102 of FIG. 3 is established, according to one embodiment. In FIG. 11, a verified user 706 sends a place-to-stay listing data 102 to the short-term listing server 100 in operation 1102. Then, in operation 1104, the short-term listing server 100 uses the radial distribution module 140 to apply the radial algorithm 240 to broadcast the place-to-stay listing data 102 to interested parties 109. In operation 1106A, interested parties 109 receive the place-to-stay listing data 102 from the radial distribution module 140 of the short-term listing server 100, according to one embodiment. Similarly, the recipients 114 receive the place-to-stay listing data 102 from the radial distribution module 140 of the short-term listing server 100 in operation 1106B, according to one embodiment. Based on operation 1106A and 1106B, the verified user 706 may automatically receive a summary of how many recipients received the place-to-stay listing data 102 in operation 1106C. Next, bi-directional communication sessions may be established between the verified user 706 and the service provider and/or the recipients 114 in operation 1108.

It should be noted that there are a number of different 'user' roles described in the various embodiments described herein. The user roles include a 'user', a 'claimed user', and a 'verified user'. The user is someone that has signed up for and/or accessed the short-term listing server 100 through the geospatially constrained social network 142. The user can 'claim' an existing profile (e.g., prepopulated and/or created by another user through a wiki like creation process), and/or 'claim' an address with a new location, thereby transforming the user to the 'claimed user'. The claimed user can verify that they actually live at a particular home address and/or work at a particular business address (e.g., thereby showing their affiliation with a non-transitory location) by submitting a response to a verification code on a postcard, submitting a utility bill, and/or being invited by and/or getting vouched for by an existing verified user. This can transform the claimed user to a 'verified user', in one embodiment. It will be understood by those with skill in the art that the user 106 may refer to either a user that has not yet claimed, the claimed user, and/or the verified user.

Disclosed are a method, a device and a system of place-to-stay listing data 102 publication through a short-term listing server 100 using a radial algorithm 240 to automatically distribute the place-to-stay listing data 102 in a threshold radial distance 119 from a set of geospatial coordinates 103 associated with a device 104.

In one aspect, a method includes validating that a place-to-stay listing data 102 is associated with a verified user (e.g., a user 106) of the short-term listing server 100 using a processor 120 and/or a memory 124. The method includes verifying that a set of geospatial coordinates 103 associated with the place-to-stay listing data 102 are trusted based on a claimed geospatial location of the verified user (e.g., the user 106 of FIG. 1 as described as the verified user 706 in FIG. 7) of the short-term listing server 100. In addition, the method includes determining that a time stamp associated with a creation date and/or a creation time of the place-to-stay listing data 102 is trusted based the claimed geospatial location of the verified user (e.g., the user 106 of FIG. 1 as described as the verified user 706 in FIG. 7) of the short-term listing server 100. Furthermore, the method includes automatically publishing the place-to-stay listing data 102 on a set of user profiles having associated verified addresses in a threshold radial distance 119 from the set of geospatial coordinates 103 associated with the place-to-stay listing data 102 of the verified user (e.g., the user 106 of FIG. 1 as described as the verified user 706 in FIG. 7) of the short-term listing server 100 using a radial algorithm 240.

The method may process a listing criteria 712 including at least one of a real estate type, a lot size, a square footage, a photograph, a video, a bedroom count, a room size, a description, a cost per month, a rental price, a leasing rate, a number of stories, and/or a location. The method may also populate an availability chart when a real estate listing associated with the listing criteria 712 is posted, wherein the availability chart includes at least one of a front door key delivery availability timing of the verified user (e.g., the user 106 of FIG. 1 as described as the verified user 706 in FIG. 7), an on-home lockbox access key, and/or an occupancy availability of the real estate listing.

In addition, the method may present the place-to-stay listing data 102 as a real estate pushpin (e.g., a real estate pushpin 804 as described in FIG. 8) of the real estate listing in a geospatial map surrounding pre-populated residential and/or business listings in a surrounding vicinity, such that the real estate pushpin of the real estate listing is automatically presented on the geospatial map in addition to being presented on the set of user profiles having associated verified addresses in the threshold radial distance 119 from the set of geospatial coordinates 103 associated with the place-to-stay listing data 102 of the verified user (e.g., the user 106 of FIG. 1 as described as the verified user 706 in FIG. 7) of the short-term listing server 100. The place-to-stay listing data 102 may be radially distributed through at least one of an on-page posting, an electronic communication, and/or a push notification delivered to desktop and/or mobile devices (e.g., the device 104) associated with users (e.g., the user 106) and/or their user profiles around an epicenter 144 defined at the set of geospatial coordinates 103 associated with the place-to-stay listing data 102 to all subscribed user profiles in a circular geo-fenced area defined by the threshold distance from the set of geospatial coordinates 103 associated with the place-to-stay listing data 102 through the radial algorithm 240 of a neighborhood broadcasting system that measures a distance away of each address associated with each user profile from the current geospatial location at the epicenter 144.

Furthermore, the method may permit the verified user (e.g., the user 106 of FIG. 1 as described as the verified user 706 in FIG. 7) to drag and/or drop the real estate pushpin (e.g., a real estate pushpin 804 as described in FIG. 8) on any location on the geospatial map, and/or automatically determining a latitude and/or a longitude associated with a placed location. In addition, the method may permit the verified user (e.g., the user 106 of FIG. 1 as described as the verified user 706 in FIG. 7) to generate a for-rent view of the real estate in which the verified user (e.g., the user 106 of FIG. 1 as described as the verified user 706 in FIG. 7) offers the real estate for rent through the short-term listing server 100 to other users in the threshold radial distance 119 from the set of geospatial coordinates 103 associated with the place-to-stay listing data 102 of the verified user (e.g., the user 106 of FIG. 1 as described as the verified user 706 in FIG. 7) of the short-term listing server 100.

In addition, the method may include extracting the geospatial coordinates 103 from a metadata associated with the place-to-stay listing data 102 when verifying that the set of geospatial coordinates 103 associated with the place-to-stay listing data 102 are trusted based on the claimed geospatial location of the verified user (e.g., the user 106 of FIG. 1 as described as the verified user 706 in FIG. 7) of the short-term listing server 100.

Furthermore, the method may include determining a relative match between a persistent clock associated with the short-term listing server 100 and/or a digital clock of a data processing system (e.g., a device 104) to determine that the time stamp associated with the creation date and/or time of the place-to-stay listing data 102 is accurate and/or therefore trusted. In addition, the method may include automatically deleting a publishing of the place-to-stay listing data 102 on a set of user profiles having associated verified addresses in the threshold radial distance 119 from the set of geospatial coordinates 103 associated with the place-to-stay listing data 102 of the verified user (e.g., the user 106 of FIG. 1 as described as the verified user 706 in FIG. 7) of the short-term listing server 100 based on a listing expiration time.

Furthermore, the method may include geocoding a set of residential addresses each associated with a resident name in a neighborhood surrounding the data processing system (e.g., the device 104). In addition, the method may include pre-populating the set of residential addresses each associated with the resident name as the set of user profiles in the threshold radial distance 119 from the claimed geospatial location of the verified user (e.g., the user 106 of FIG. 1 as described as the verified user 706 in FIG. 7) of the short-term listing server 100 in a neighborhood curation system communicatively coupled with the short-term listing server 100.

The method may permit the verified user (e.g., the user 106 of FIG. 1 as described as the verified user 706 in FIG. 7) to submit reviews in each of the set of user profiles. In addition, the method may permit tracking the submitted reviews through the neighborhood curation system. The method may also generate a reversible history journal associated with each of the set of user profiles such that a reviews of the verified user (e.g., the user 106 of FIG. 1 as described as the verified user 706 in FIG. 7) can be undone on a modified user profile page. The method may additionally allow determining an reviewing credibility of the verified user (e.g., the user 106 of FIG. 1 as described as the verified user 706 in FIG. 7) based on an review history of the verified user (e.g., the user 106 of FIG. 1 as described as the verified user 706 in FIG. 7) and/or a community contribution validation of the verified user (e.g., the user 106 of FIG. 1 as described as the verified user 706 in FIG. 7) by other users of the neighborhood curation system.

Furthermore, the method may allow automatically publishing the place-to-stay listing data 102 to a set of user profiles having associated verified addresses in a threshold radial distance 119 from the claimed geospatial location of the verified user (e.g., the user 106 of FIG. 1 as described as the verified user 706 in FIG. 7) of the short-term listing server 100 using the radial algorithm 240.

Furthermore, the method may process a claim request of the verified user (e.g., the user 106 of FIG. 1 as described as the verified user 706 in FIG. 7) generating the place-to-stay listing data 102 through the data processing system (e.g., the device 104) to be associated with an address of the neighborhood curation system. The method may also determine if the claimable neighborhood in the neighborhood curation system is associated with a private neighborhood community in the claimable neighborhood of the neighborhood curation system. In addition, the method may associate the verified user (e.g., the user 106 of FIG. 1 as described as the verified user 706 in FIG. 7) with the private neighborhood community in the claimable neighborhood of the neighborhood curation system if the private neighborhood community has been activated by at least one of the verified user (e.g., the user 106 of FIG. 1 as described as the verified user 706 in FIG. 7) and/or a different verified user (e.g., the user 106 of FIG. 1 as described as the verified user 706 in FIG. 7).

The method may also permit the verified user (e.g., the user 106 of FIG. 1 as described as the verified user 706 in FIG. 7) to draw a set of boundary lines in a form of a geospatial polygon such that the claimable neighborhood in a geospatial region surrounding the claim request creates the private neighborhood community in the neighborhood curation system if the private neighborhood community is inactive. Additionally, the method may verify the claim request of the verified user (e.g., the user 106 of FIG. 1 as described as the verified user 706 in FIG. 7) generating the place-to-stay listing data 102 through the data processing system (e.g., the device 104) to be associated with a neighborhood address of the neighborhood curation system when the address is determined to be associated with at least one of a work address and/or a residential address of the verified user (e.g., the user 106 of FIG. 1 as described as the verified user 706 in FIG. 7). The method may also simultaneously publish the place-to-stay listing data 102 on the private neighborhood community associated with the verified user (e.g., the user 106 of FIG. 1 as described as the verified user 706 in FIG. 7) generating the place-to-stay listing data 102 through the data processing system (e.g., the device 104) in the threshold radial distance 119 from the address associated with the claim request of the verified user (e.g., the user 106 of FIG. 1 as described as the verified user 706 in FIG. 7) of the neighborhood curation system when automatically publishing the place-to-stay listing data 102 on a set of user profiles having associated verified addresses in a threshold radial distance 119 from the claimed geospatial location of the verified user (e.g., the user 106 of FIG. 1 as described as the verified user 706 in FIG. 7) of the short-term listing server 100 based on a set of preferences of the verified user (e.g., the user 106 of FIG. 1 as described as the verified user 706 in FIG. 7) using the radial algorithm 240.

In addition, the method may provide a summary data to the verified user (e.g., the user 106 of FIG. 1 as described as the verified user 706 in FIG. 7) generating the place-to-stay listing data 102 through the data processing system (e.g., the device 104) of how many user profile pages were updated with an alert of the place-to-stay listing data 102 when publishing the place-to-stay listing data 102 in at least one of the private neighborhood community and/or the set of user profiles having associated verified addresses in the threshold radial distance 119 from the claimed geospatial location of the verified user (e.g., the user 106 of FIG. 1 as described as the verified user 706 in FIG. 7) of the short-term listing server 100 based on the set of preferences of the verified user (e.g., the user 106 of FIG. 1 as described as the verified user 706 in FIG. 7).

Furthermore, the method may include live broadcasting the place-to-stay listing data 102 to the different verified user (e.g., the user 106 of FIG. 1 as described as the verified user 706 in FIG. 7) and/or other verified users (e.g., the user 106 of FIG. 1 as described as the verified user 706 in FIG. 7) in at least one of the private neighborhood community and/or currently within the threshold radial distance 119 from the current geospatial location through the short-term listing server 100 using a multicast algorithm such that a live broadcast multicasts to a plurality of data processing systems (e.g., the device 104s) associated with each of the different user and/or the other verified users (e.g., the user 106 of FIG. 1 as described as the verified user 706 in FIG. 7) simultaneously when the data processing system (e.g., the device 104) of the verified user (e.g., the user 106 of FIG. 1 as described as the verified user 706 in FIG. 7) generating the live-broadcast enables broadcasting of the place-to-stay listing data 102 to any one of a geospatial vicinity around the data processing system (e.g., the device 104) of the verified user (e.g., the user 106 of FIG. 1 as described as the verified user 706 in FIG. 7) generating the broadcast and/or in any private neighborhood community in which the verified user (e.g., the user 106 of FIG. 1 as described as the verified user 706 in FIG. 7) has a non-transitory connection.

Also, the method may permit the different verified user (e.g., the user 106 of FIG. 1 as described as the verified user 706 in FIG. 7) and/or other verified users (e.g., the user 106 of FIG. 1 as described as the verified user 706 in FIG. 7) in at least one of the private neighborhood community to bi-directionally communicate with the verified user (e.g., the user 106 of FIG. 1 as described as the verified user 706 in FIG. 7) generating the broadcast through the short-term listing server 100. Any private neighborhood community in which the verified user (e.g., the user 106 of FIG. 1 as described as the verified user 706 in FIG. 7) has the non-transitory connection may be at least one of a residential address of the verified user (e.g., the user 106 of FIG. 1 as described as the verified user 706 in FIG. 7) and/or a work address of the verified user (e.g., the user 106 of FIG. 1 as described as the verified user 706 in FIG. 7) that has been confirmed by the short-term listing server 100 as being associated with the verified user (e.g., the user 106 of FIG. 1 as described as the verified user 706 in FIG. 7). The threshold distance may be between 0.2 and 0.4 miles from the set of geospatial coordinates 103 associated with the place-to-stay listing data 102 to optimize a relevancy of the live-broadcast. The short-term listing server 100 may include a crowdsourced moderation algorithm in which multiple neighbors to a geospatial area determine what content contributed to the short-term listing server 100 persists and/or which is deleted. The short-term listing server 100 may permit users to mute messages of specific verified users (e.g., the user 106 of FIG. 1 as described as the verified user 706 in FIG. 7) to prevent misuse of the short-term listing server 100 or otherwise filter out messages from the short-term listing server.

In another aspect, the method determines that a time stamp associated with a creation date and/or a creation time of a place-to-stay listing data 102 is trusted based on a claimed geospatial location of a user of the short-term listing server 100. The method automatically publishes the place-to-stay listing data 102 on a set of user profiles having associated verified addresses in a threshold radial distance 119 from a set of geospatial coordinates 103 associated with the place-to-stay listing data 102 of the user 104 of the short-term listing server 100 using a radial algorithm 240. In addition, the method radially distributes the place-to-stay listing data 102 as a notification data 112 through an on-page posting, an electronic communication, and/or a push notification delivered to: (1) a set of recipients through an internet protocol (IP) based network associated with users and/or their user profiles around an epicenter 144 defined at the set of geospatial coordinates 103 associated with the place-to-stay listing data 102 generated through the device 104; and/or (2) a set of service providers accessible by the short-term listing server 100 through a cellular network 108 using the radial algorithm 240 in addition to the set of recipients 114 through the IP based network associated with users and/or their user profiles.

The method may also validate that the place-to-stay listing data 102 is associated with the user 104 of the short-term listing server 100 using a processor 120 and/or a memory 124. The method may additionally verify that the set of geospatial coordinates 103 associated with the place-to-stay listing data 102 are trusted based on the claimed geospatial location of the user of the short-term listing server 100. In addition, the method may process at least one of a listing criteria 712 including at least one of a real estate type, a lot size, a square footage, a photograph, a video, a bedroom count, a room size, a description, a cost per month, a rental price, a leasing rate, a number of stories, and/or a location.

Furthermore, the method may populate an availability chart when a real estate listing associated with the listing criteria 712 is posted, wherein the availability chart includes at least one of a front door key delivery availability timing of the user 106, an on-home lockbox access key, and/or an occupancy availability of the real estate listing. The method may also present the place-to-stay listing data 102 as a real estate pushpin (e.g., a real estate pushpin 804) of the real estate listing in a geospatial map surrounding pre-populated residential and/or business listings in a surrounding vicinity, such that the real estate pushpin (e.g., the real estate pushpin 804) of the real estate listing is automatically presented on the geospatial map in addition to being presented on the set of user profiles having associated verified addresses in the threshold radial distance 119 from the set of geospatial coordinates 103 associated with the place-to-stay listing data 102 of the user of the short-term listing server 100.

In addition, the method may permit the user to drag and/or drop the real estate pushpin (e.g., the real estate pushpin 804) on any location on the geospatial map, and/or automatically determine a latitude and/or a longitude associated with a placed location. The method may also generate a for-rent view of the real estate in which the user offers the real estate for rent through the short-term listing server 100 to other users in the threshold radial distance 119 from the set of geospatial coordinates 103 associated with the place-to-stay listing data 102 of the user of the short-term listing server 100.

In yet another aspect, a system includes a short-term listing server 100 to automatically publish the place-to-stay listing data 102 on a set of user profiles having associated verified addresses in a threshold radial distance 119 from the set of geospatial coordinates 103 associated with the place-to-stay listing data 102 of the verified user (e.g., the user 106 of FIG. 1 as described as the verified user 706 in FIG. 7) of the short-term listing server 100 using a radial algorithm 240. The system also includes a mobile device communicatively coupled with the short-term listing server 100 through the network 101 to generate the place-to-stay listing data 102 using at least one of a camera, a microphone, and/or a sensory capability of the mobile device to generate a captured data that is appended with a present geospatial location and/or a time stamp associated with a creation date and/or a creating time of the captured data in generating the place-to-stay listing data 102.

A validation module may determine that a place-to-stay listing data 102 is associated with a verified user (e.g., the user 106 of FIG. 1 as described as the verified user 706 in FIG. 7) of the short-term listing server 100 using a processor 120 and/or a memory 124. A verification module may ensure that a set of geospatial coordinates 103 associated with the place-to-stay listing data 102 are trusted based on a claimed geospatial location of the verified user (e.g., the user 106 of FIG. 1 as described as the verified user 706 in FIG. 7) of the short-term listing server 100. A time stamp module may determine that a time stamp associated with a creation date and/or a creation time of the place-to-stay listing data 102 is trusted based the claimed geospatial location of the verified user (e.g., the user 106 of FIG. 1 as described as the verified user 706 in FIG. 7) of the short-term listing server 100.

In addition, a broadcasting module may automatically publish the place-to-stay listing data 102 on a set of user profiles having associated verified addresses in a threshold radial distance 119 from the set of geospatial coordinates 103 associated with the place-to-stay listing data 102 of the verified user (e.g., the user 106 of FIG. 1 as described as the verified user 706 in FIG. 7) of the short-term listing server 100 using a radial algorithm 240. A listing module may process at least one of a listing criteria 712 including at least one of a real estate type, a lot size, a square footage, a photograph, a video, a bedroom count, a room size, a description, a cost per month, a rental price, a leasing rate, a number of stories, and/or a location. A listing criteria 712 satisfaction module may populate an availability chart when a real estate listing associated with the listing criteria 712 is posted, wherein the availability chart includes at least one of a front door key delivery availability timing of the verified user (e.g., the user 106 of FIG. 1 as described as the verified user 706 in FIG. 7), an on-home lockbox access key, and/or an occupancy availability of the real estate listing.

A pushpin module may present the place-to-stay listing data 102 as a real estate pushpin (e.g., the real estate pushpin 804) of the real estate listing in a geospatial map surrounding pre-populated residential and/or business listings in a surrounding vicinity, such that the real estate pushpin (e.g., the real estate pushpin 804) of the real estate listing is automatically presented on the geospatial map in addition to being presented on the set of user profiles having associated verified addresses in the threshold radial distance 119 from the set of geospatial coordinates 103 associated with the place-to-stay listing data 102 of the verified user (e.g., the user 106 of FIG. 1 as described as the verified user 706 in FIG. 7) of the short-term listing server 100.

A notification module may radially distribute the place-to-stay listing data 102 through at least one of an on-page posting, an electronic communication, and/or a push notification delivered to desktop and/or mobile devices associated with users and/or their user profiles around an epicenter 144 defined at the set of geospatial coordinates 103 associated with the place-to-stay listing data 102 to all subscribed user profiles in a circular geo-fenced area defined by the threshold distance from the set of geospatial coordinates 103 associated with the place-to-stay listing data 102 through the radial algorithm 240 of a neighborhood broadcasting system that measures a distance away of each address associated with each user profile from the current geospatial location at the epicenter 144.

In addition, a placement module may permit the verified user (e.g., the user 106 of FIG. 1 as described as the verified user 706 in FIG. 7) to drag and/or drop the real estate pushpin (e.g., the real estate pushpin 804) on any location on the geospatial map, and/or automatically determine a latitude and/or a longitude associated with a placed location. A real estate offering module may generate a for-rent view of the real estate in which the verified user (e.g., the user 106 of FIG. 1 as described as the verified user 706 in FIG. 7) offers the real estate for rent through the short-term listing server 100 to other users in the threshold radial distance 119 from the set of geospatial coordinates 103 associated with the place-to-stay listing data 102 of the verified user (e.g., the user 106 of FIG. 1 as described as the verified user 706 in FIG. 7) of the short-term listing server 100.

In addition, an extraction module may extract the geospatial coordinates 103 from a metadata associated with the place-to-stay listing data 102 when verifying that the set of geospatial coordinates 103 associated with the place-to-stay listing data 102 are trusted based on the claimed geospatial location of the verified user (e.g., the user 106 of FIG. 1 as described as the verified user 706 in FIG. 7) of the short-term listing server 100.

Furthermore, a matching module may determine a relative match between a persistent clock associated with the short-term listing server 100 and/or a digital clock of a data processing system (e.g., a device 104) to determine that the time stamp associated with the creation date and/or time of the place-to-stay listing data 102 is accurate and/or therefore trusted. In addition, a deletion module may automatically delete the place-to-stay listing data 102 on a set of user profiles having associated verified addresses in the threshold radial distance 119 from the set of geospatial coordinates 103 associated with the place-to-stay listing data 102 of the verified user (e.g., the user 106 of FIG. 1 as described as the verified user 706 in FIG. 7) of the short-term listing server 100 based on a listing expiration time.

Furthermore, a plotting module may geocode a set of residential addresses each associated with a resident name in a neighborhood surrounding the data processing system (e.g., the device 104). A data-seeding module may prepopulate the set of residential addresses each associated with the resident name as the set of user profiles in the threshold radial distance 119 from the claimed geospatial location of the verified user (e.g., the user 106 of FIG. 1 as described as the verified user 706 in FIG. 7) of the short-term listing server 100 in a neighborhood curation system communicatively coupled with the short-term listing server 100.

A modification module may permit the verified user (e.g., the user 106 of FIG. 1 as described as the verified user 706 in FIG. 7) to submit reviews in each of the set of user profiles. A discovery module may track the submitted reviews through the neighborhood curation system. An undo module may generate a reversible history journal associated with each of the set of user profiles such that a reviews of the verified user (e.g., the user 106 of FIG. 1 as described as the verified user 706 in FIG. 7) can be undone on a modified user profile page.

In addition, a reputation module may determine an reviewing credibility of the verified user (e.g., the user 106 of FIG. 1 as described as the verified user 706 in FIG. 7) based on an review history of the verified user (e.g., the user 106 of FIG. 1 as described as the verified user 706 in FIG. 7) and a community contribution validation of the verified user (e.g., the user 106 of FIG. 1 as described as the verified user 706 in FIG. 7) by other users of the neighborhood curation system. A publishing module may automatically communicate the place-to-stay listing data 102 to a set of user profiles having associated verified addresses in a threshold radial distance 119 from the claimed geospatial location of the verified user (e.g., the user 106 of FIG. 1 as described as the verified user 706 in FIG. 7) of the short-term listing server 100 using the radial algorithm 240.

A claiming module may process a claim request of the verified user (e.g., the user 106 of FIG. 1 as described as the verified user 706 in FIG. 7) generating the place-to-stay listing data 102 through the data processing system (e.g., a device 104) to be associated with an address of the neighborhood curation system. A private-neighborhood module may determine if the claimable neighborhood in the neighborhood curation system is associated with a private neighborhood community in the claimable neighborhood of the neighborhood curation system.

In addition, an association module may associate the verified user (e.g., the user 106 of FIG. 1 as described as the verified user 706 in FIG. 7) with the private neighborhood community in the claimable neighborhood of the neighborhood curation system if the private neighborhood community has been activated by at least one of the verified user (e.g., the user 106 of FIG. 1 as described as the verified user 706 in FIG. 7) and/or a different verified user (e.g., the user 106 of FIG. 1 as described as the verified user 706 in FIG. 7). A boundary module may permit the verified user (e.g., the user 106 of FIG. 1 as described as the verified user 706 in FIG. 7) to draw a set of boundary lines in a form of a geospatial polygon such that the claimable neighborhood in a geospatial region surrounding the claim request creates the private neighborhood community in the neighborhood curation system if the private neighborhood community is inactive.

An address type module may verify the claim request of the verified user (e.g., the user 106 of FIG. 1 as described as the verified user 706 in FIG. 7) generating the place-to-stay listing data 102 through the data processing system (e.g., a device 104) to be associated with a neighborhood address of the neighborhood curation system when the address is determined to be associated with at least one of a work address and/or a residential address of the verified user (e.g., the user 106 of FIG. 1 as described as the verified user 706 in FIG. 7).

A concurrency module may simultaneously publish the place-to-stay listing data 102 on the private neighborhood community associated with the verified user (e.g., the user 106 of FIG. 1 as described as the verified user 706 in FIG. 7) generating the place-to-stay listing data 102 through the data processing system (e.g., the device 104) in the threshold radial distance 119 from the address associated with the claim request of the verified user (e.g., the user 106 of FIG. 1 as described as the verified user 706 in FIG. 7) of the neighborhood curation system when automatically publishing the place-to-stay listing data 102 on a set of user profiles having associated verified addresses in a threshold radial distance 119 from the claimed geospatial location of the verified user (e.g., the user 106 of FIG. 1 as described as the verified user 706 in FIG. 7) of the short-term listing server 100 based on a set of preferences of the verified user (e.g., the user 106 of FIG. 1 as described as the verified user 706 in FIG. 7) using the radial algorithm 240.

A summary module may provide a summary data to the verified user (e.g., the user 106 of FIG. 1 as described as the verified user 706 in FIG. 7) generating the place-to-stay listing data 102 through the data processing system (e.g., the device 104) of how many user profile pages were updated with an alert of the place-to-stay listing data 102 when publishing the place-to-stay listing data 102 in at least one of the private neighborhood community and/or the set of user profiles having associated verified addresses in the threshold radial distance 119 from the claimed geospatial location of the verified user (e.g., the user 106 of FIG. 1 as described as the verified user 706 in FIG. 7) of the short-term listing server 100 based on the set of preferences of the verified user (e.g., the user 106 of FIG. 1 as described as the verified user 706 in FIG. 7).

In addition, a live broadcast module may live broadcast the place-to-stay listing data 102 to the different verified user (e.g., the user 106 of FIG. 1 as described as the verified user 706 in FIG. 7) and/or other verified users (e.g., the user 106 of FIG. 1 as described as the verified user 706 in FIG. 7) in at least one of the private neighborhood community and/or currently within the threshold radial distance 119 from the current geospatial location through the short-term listing server 100 using a multicast algorithm such that a live broadcast multicasts to a plurality of data processing systems (e.g., the device 104s) associated with each of the different user and/or the other verified users (e.g., the user 106 of FIG. 1 as described as the verified user 706 in FIG. 7) simultaneously when the data processing system (e.g., the device 104) of the verified user (e.g., the user 106 of FIG. 1 as described as the verified user 706 in FIG. 7) generating the live-broadcast enables broadcasting of the place-to-stay listing data 102 to any one of a geospatial vicinity around the data processing system (e.g., the device 104) of the verified user (e.g., the user 106 of FIG. 1 as described as the verified user 706 in FIG. 7) generating the broadcast and/or in any private neighborhood community in which the verified user (e.g., the user 106 of FIG. 1 as described as the verified user 706 in FIG. 7) has a non-transitory connection.

Furthermore, a bi-directional communication module may permit the different verified users (e.g., the user 106 of FIG. 1 as described as the verified user 706 in FIG. 7) and/or other verified user (e.g., the user 106 of FIG. 1 as described as the verified user 706 in FIG. 7) in at least one of the private neighborhood community to bi-directionally communicate with the verified user (e.g., the user 106 of FIG. 1 as described as the verified user 706 in FIG. 7) generating the broadcast through the short-term listing server 100. A non-transitory module may determine any private neighborhood community in which the verified user (e.g., the user 106 of FIG. 1 as described as the verified user 706 in FIG. 7) has a non-transitory connection is at least one of a residential address of the verified user (e.g., the user 106 of FIG. 1 as described as the verified user 706 in FIG. 7) and/or a work address of the verified user (e.g., the user 106 of FIG. 1 as described as the verified user 706 in FIG. 7) that has been confirmed by the short-term listing server 100 as being associated with the verified user (e.g., the user 106 of FIG. 1 as described as the verified user 706 in FIG. 7). A threshold module may automatically set the threshold distance between 0.2 and/or 0.4 miles from the set of geospatial coordinates 103 associated with the place-to-stay listing data 102 to optimize a relevancy of the live-broadcast.

A moderation module may apply a crowdsourced moderation algorithm in which multiple neighbors to a geospatial area determine what content contributed to the short-term listing server 100 persists and/or which is deleted. A muting module may allow users to mute messages of specific verified users (e.g., the user 106 of FIG. 1 as described as the verified user 706 in FIG. 7) to prevent misuse of the short-term listing server 100 and/or for other purposes (e.g., to filter out undesired content, to filter out irrelevant content, etc.).

Figure 12:
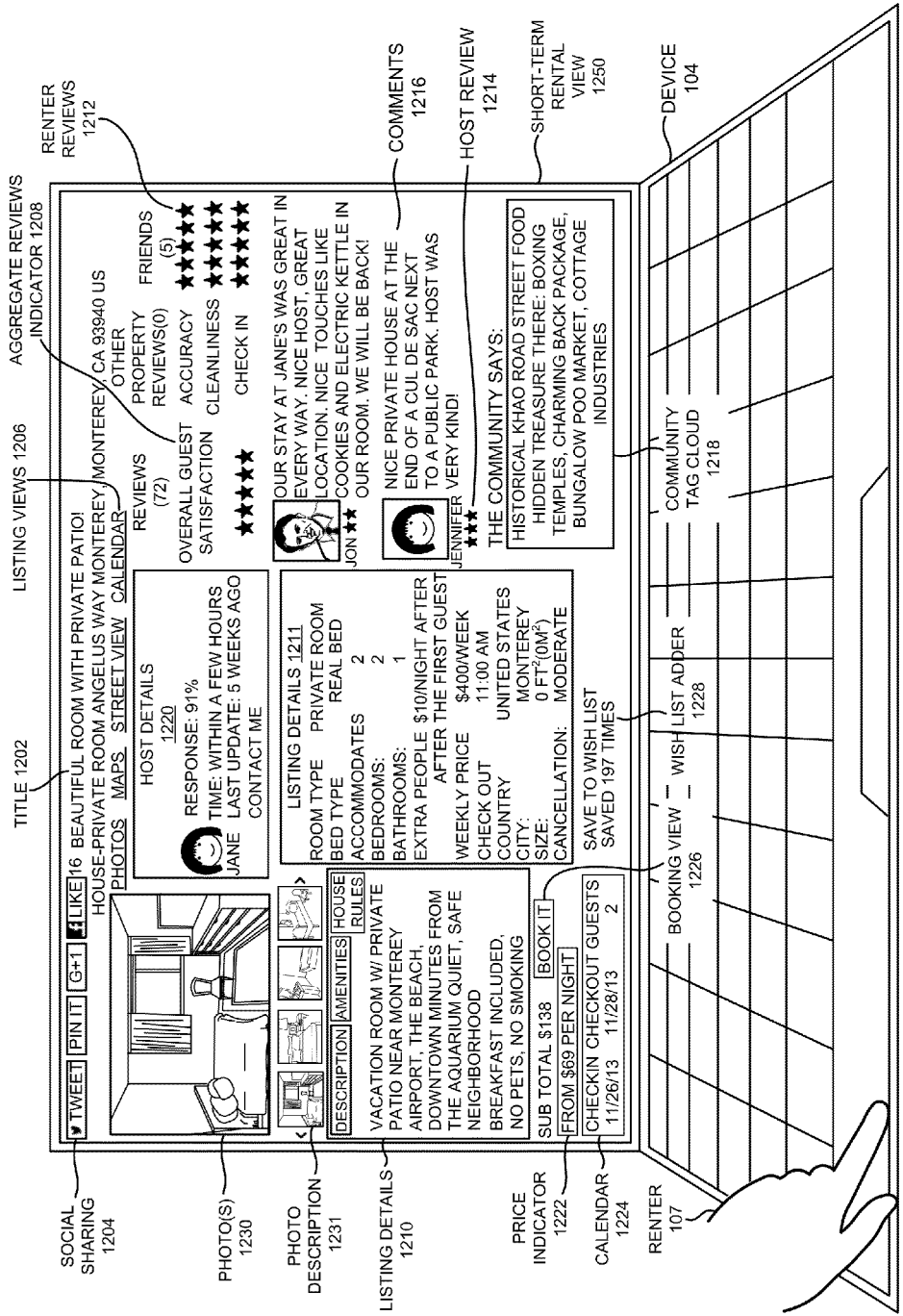
FIG. 12 is a short-term rental view 1250 illustrating various aspects of a short term residential rental, according to one embodiment.

FIG. 12 is a short-term rental view 1250 illustrating various aspects of a short term residential rental, according to one embodiment.

FIG. 12 is a short-term rental view 1250 illustrating various aspects of a short term residential rental, a title 1202, a social sharing 1204, a set of listing views 1206, an aggregate reviews indicator 1208, a set of listing details 1210, a set of reviewer reviews 1212, a host review 1214, a comments 1216, a community tag cloud 1218, a set of host details 1220, a price indicator 1222, a calendar 1224, a booking view 1226, a wish list adder 1228, a photo(s) 1230, and a photo description 1231, according to one embodiment. In one embodiment, a user (e.g., a host 106) may create a short-term listing profile on the short-term listing server 100. The host 106 may create a title for the listing. In one embodiment, the title may advertise aspects of the listing such as access to a private patio, pool, yard, etc. In one or more embodiments, the short-term rental view may enable users to utilize the social sharing 1204 to share the listing on one or more social networks (e.g., Twitter, Google+, Facebook). Users may be able to see listing views 1206 of the short-term rental listing. The listing views 1206 may include photos, maps, street views, and/or a calendar, according to one embodiment.

In another embodiment, the short-term rental view 1250 may display the aggregate reviews indicator 1208 which may allow visitors to the short-term rental view 1250 to view the number of reviews other users have submitted about the short-term rental listing and/or an aggregate rating of the listing based on the reviews and/or top reviews that the most users found helpful. The listing details 1210 may be a summary of the listed short-term rental and/or may include details regarding location, proximity to local attractions, a description of the rental (e.g., house, room, floor), and/or a description of the neighborhood, according to one embodiment. The renter reviews 1212 may be an aggregate rating of the short-term property by users (e.g., previous renters), according to one embodiment. In one or more embodiments, the renter reviews 1212 may be marked by a number of stars and/or other indicators and/or may be separated into categories (e.g., overall guest satisfaction, accuracy, cleanliness, check-in, communication, location, and/or values). The host review 1214 may be a review (e.g., rating, comment, etc.) of the user (e.g., past renter) by the host 106, according to one embodiment. The comments 1216 may be comments (e.g., reviews, posts, advise to other users) submitted by users (e.g., previous renters of the short-term rental), according to one embodiment. The comments 1216 may be rated (e.g., on accuracy) by other users (e.g., other previous renters of the short-term rental), according to one embodiment. The community tag cloud 1218 may be a short description (e.g., a list of key words) of the short-term rental and/or host and/or neighborhood (e.g., town, city, street, block, neighborhood, zip code, postal code), according to one embodiment. The community tag cloud may enable users (e.g., the host 106, previous short-term renters of the short-term rental and/or host and/or neighborhood, residents of the neighborhood) to submit tags to the tag cloud, according to one or more embodiments. A selection (e.g., mouse over, click) of a tag in the community tag cloud 1218 may enable the user to view other short-term rentals and/or hosts and/or neighborhoods that also match the description (e.g., tag). The host details 1220 may be information about the host 106 (e.g., a picture, number of previous renters, transaction history, ratings, location, name, age, gender, interests, an abbreviated profile), according to one embodiment. The selection of the host details 1220 (e.g., mouse over, click) may allow the user to view the host's 106 full profile, according to one embodiment.

The price indicator 1222 may show a price of the short-term rental (e.g., per night), according to one embodiment. According to one or more embodiments, the calendar 1224 may allow users (e.g., renters) to view the short-term rental's availability, select a check-in date and/or time, a check-out date and/or time, and/or enter a number of guests (e.g., renters). The booking view 1226 may allow the user to view a subtotal of their reservation and/or "book" the reservation, according to one embodiment. The wish list adder 1228 may allow users to add (e.g., save) the short-term rental to a wish list, according to one embodiment. In one or more embodiments, adding the short-term rental to the wish list may enable the user to more easily view the short-term rental and/or "follow" the short-term rental in order to receive updates about the short-term rental and/or host and/or neighborhood. The photo(s) 1230 may be pictures (e.g., photographs, drawings, representations, digital pictures) of the short-term rental (e.g., interior pictures, exterior pictures, pictures of the yard) and/or of the host and/or the associated neighborhood. The photo description 1231 may be additional photos of the short-term rental (e.g., the room, the house, the apartment, the yard, the street, the neighborhood).

Figure 13:
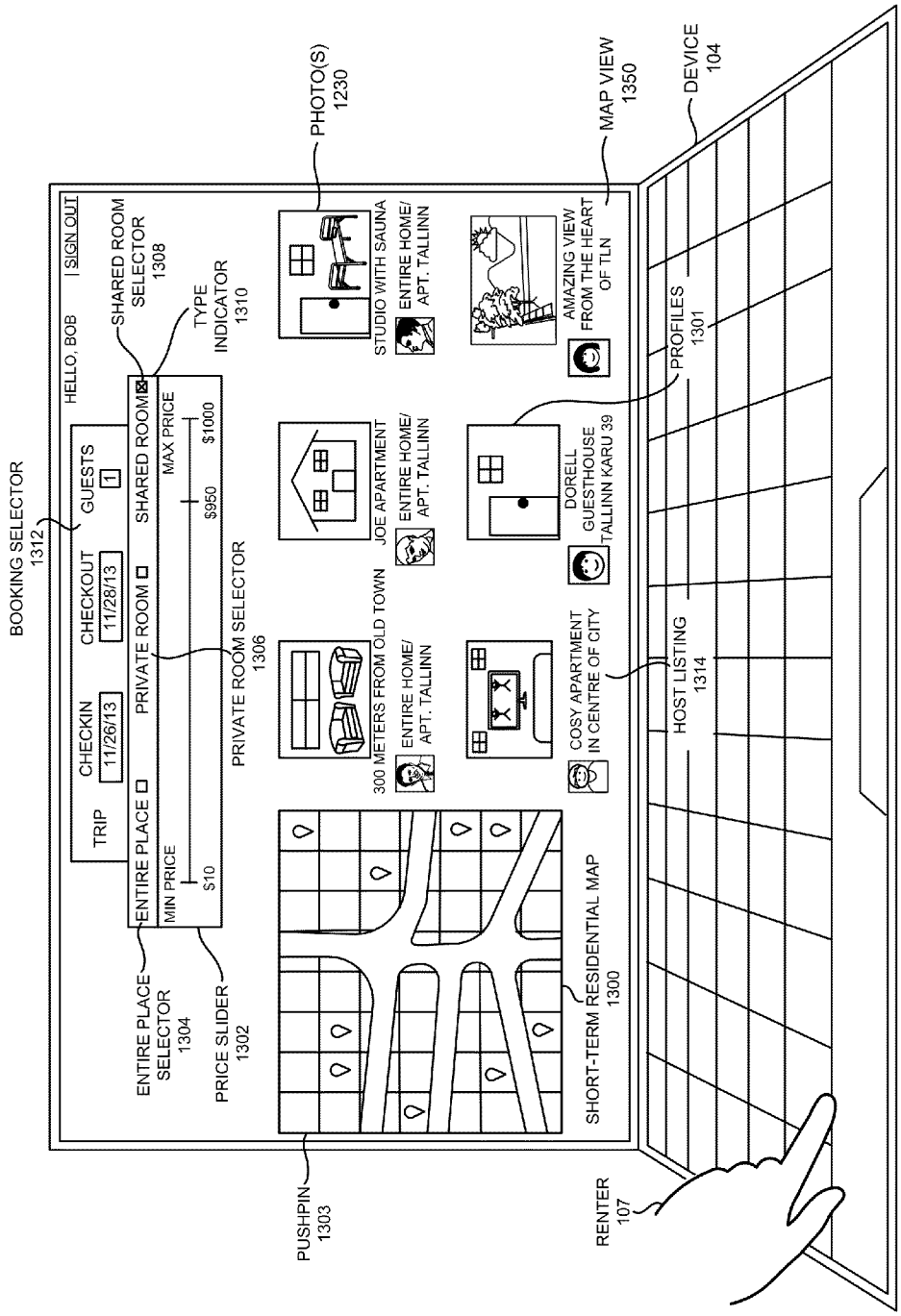
FIG. 13 is a map view 1350 illustrating a short-term residential map 1300 and a set of profiles 1301, according to one embodiment.

FIG. 13 is a map view 1350 illustrating a short-term residential map 1300 and a set of profiles 1301, according to one embodiment.

FIG. 13 is a map view 1350 illustrating a short-term residential map 1300, a set of profiles 1301, a price slider 1302, an entire place selector 1304, a private room selector 1306, a shared room selector 1308, a type indicator 1310, a booking selector 1312, and a host listing 1314, according to one embodiment. The short-term residential map 1300 may be a map (e.g., satellite, cartoon) of the neighborhood selected by the user (e.g., the neighborhood selected by the user and/or the neighborhood associated with the short-term rental selected by the user) and/or may show the geographic location of at least one of the short-term rental(s) associated with the neighborhood (e.g., zip code, postal code, block, street, town, city, neighborhood), according to one embodiment. The short-term residential map 1300 may indicate the geographic location of one or more short-term rental(s) via a pushpin that may, upon selection (e.g., mouse over, click), display information (e.g., details about the short-term rental, the host, the neighborhood, etc.). The profiles 1301 may be profiles of the short-term rentals (e.g., short-term rental view 1250) and/or may be links to full profiles of the short-term rentals (e.g., short-term rental view 1250) and/or may be abbreviated profiles of the short-term rentals, according to one embodiment. The price slider 1302 may allow users (e.g., renter) to select a minimum and/or maximum price of a short-term rental (e.g., per night), according to one embodiment.

In one embodiment, the price slider 1302 may enable the user to narrow a search for a short-term rental to only listings that satisfy the set minimum and/or maximum price. The type indicator 1310 may allow users to indicate the type of short-term rental they wish to view and/or book, according to one embodiment. According to one or more embodiments, the type indicator 1310 may comprise the entire place selector 1304, which may allow users to indicate they wish to view and/or book an entire residence (e.g., house, apartment), the private room selector 1306, which may allow users to indicate they wish to view and/or book a private (e.g., unshared) room, and/or the shared room selector 1308, which may allow users to indicate that they wish to view and/or book a shared room. The booking selector 1312 may enable the user to select a check-in date and/or time, a check-out date and/or time, and/or a number of guests, according to one or more embodiments. The host listing 1314 may be a description (e.g., brief summary, abbreviated profile) of the host and/or the short-term rental, according to one or more embodiments. The host listing 1314 may include a hyperlink to the full profile (e.g., the full profile of the host and/or the full profile of the short-term residence (e.g., the short-term rental view 1250)) and/or may show an abbreviated profile and/or description of the host and/or short-term rental upon selection (e.g., mouse over, click), according to one embodiment FIG. 14 is a system view of a global neighborhood environment 1408 communicating with the neighborhood(s) through a network, according to one embodiment.

Figure 14:
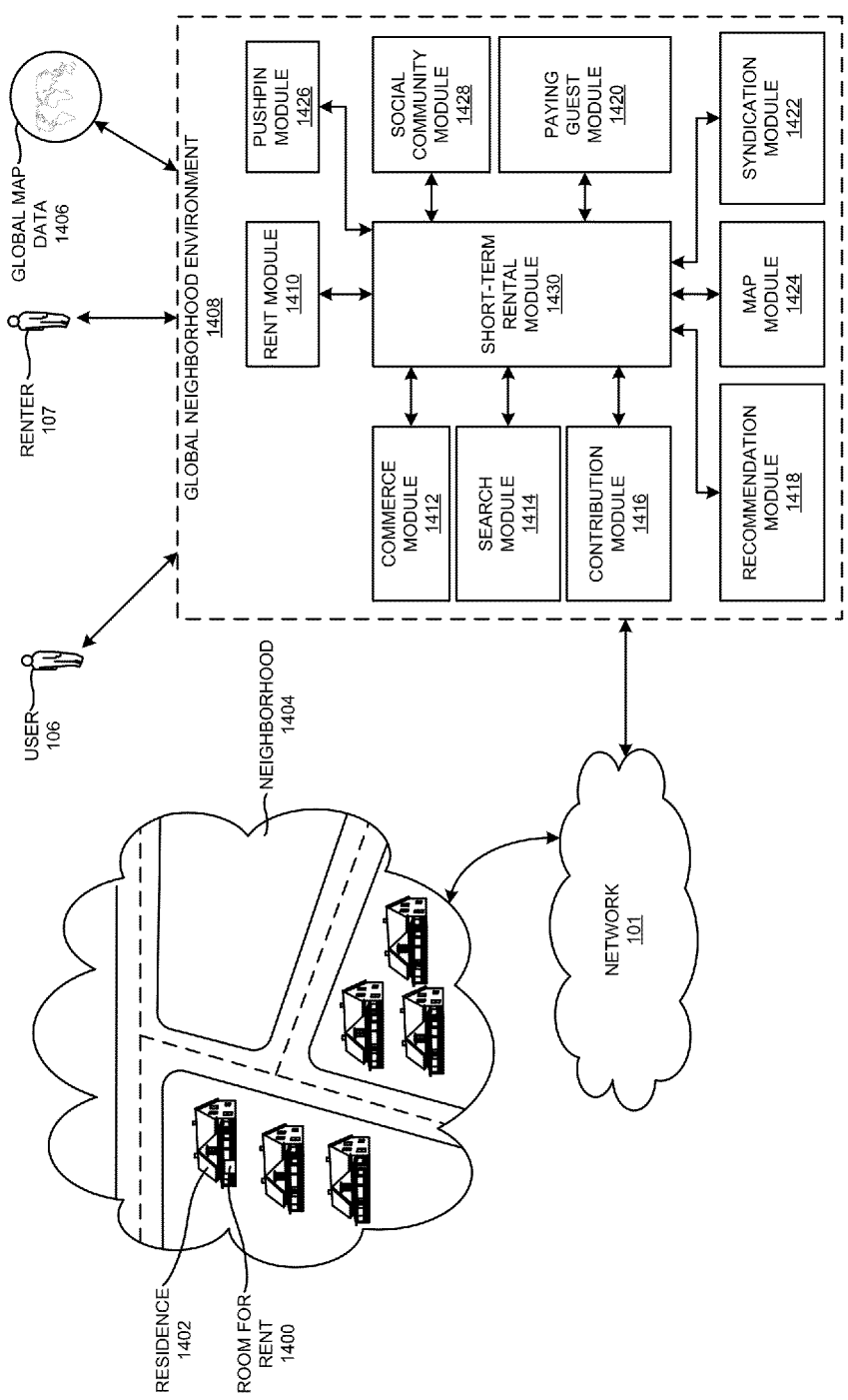
FIG. 14 is a system view of a global neighborhood environment communicating with the neighborhood(s) through a network, according to one embodiment.

FIG. 14 is a system view of a global neighborhood environment 1408 (e.g., the short-term listing server 100) communicating with neighborhood 1404 through a network 104 (e.g., network 101), a global map data 1406, a host 106, and a renter 107, according to one embodiment. Particularly FIG. 14 illustrates the global neighborhood environment 1408 1408, the neighborhood 1404, the network 101, the global map data 1406, the host 106, and the renter 107, according to one embodiment.

The global neighborhood environment 1408 may contain a short-term rental module 1430, search module 1414, a rent module 1410, a pushpin module 1426, a paying guest module 1420, a syndication module 1422, a social community module 1428, a map module 1424, a contribution module 1416, and a recommendation module 1418, according to one embodiment. The neighborhood 1404 may include a residence 1402 and/or a room for rent 1400, according to one embodiment.

The global neighborhood environment 1408 may include set of instructions that may facilitate the registered and/or unregistered user of the global neighborhood environment 1408 to communicate information (e.g., the information associated in renting, listing, etc.) associated with a real property in the geo-spatial environment. The neighborhood(s) 1404 may be a geographically localized community associated with the real property in a geospatial environment. The neighborhood(s) 1404 may contain registered and unregistered users of the global neighborhood environment 1408 associated with the real property of the global neighborhood environment 1408. The network 101 may facilitate the global neighborhood environment 1408 to communicate the information associated with the neighborhood(s) 1404.

The search module 1414 may enable a search (e.g., a people search, a business search, a category search, etc.) of any data in the global neighborhood environment 1408 and/or may enable embedding of any content (e.g., in search engines, blogs, social networks, professional networks, professional networks, etc.) in the global neighborhood environment 1408.

The rent module 1410 may modify the availability status to a for rent status. In addition, the rent module 1410 may apply the metadata (e.g., indicating the price, the physical characteristic, etc.) and/or the condition of the real property to the real property. The renter 107 may be the registered and/or unregistered users who may be interested to rent the real property in the geo-spatial environment. The residence 1402 may be a real estate existing in the neighborhood(s) 1404.

The global map data 1406 may contain details/maps of any area, region and/or neighborhood (e.g., the neighborhood 1404 of FIG. 14) of the real property in the geo-spatial environment. The pushpin module 1426 may automatically set a new latitude and longitude location when the user relocates a pointer in the geo-spatial environment indicating the physical location of the real property in the geo-spatial environment. The pushpin module 1426 may set the latitude and longitude location based on a relocation of a pushpin indicator of the real property in the geo-spatial environment.

The paying guest module 1420 may enable the user (e.g., renter 107, host 106, etc.) to book the real property in the global neighborhood environment 1408 on selecting the social networking profile of the another user (e.g., the host 106) who may have requested the real property as rental. The paying guest module 1420 may enable another user (e.g., host 106, renter 107) to process a payment on confirmation of a booking of the real property by another user on a particular time.

The syndication module 140 may publish the real property across a multiple listing service database when requested by the user. The multiple listing module 142 may update the listing in a multiple listing services in the geo-spatial environment concurrently with the unclaimed pages and/or the real property claimed by the user.

The recommendation module 1418 may create a community of a real estate transaction, verification, and inspection parties to submit recommendations. The recommendation module 1418 may provide recommendations through a recommendation interface in the geo-spatial environment to the selected neighbors of the users in the global neighborhood environment 1408. The home for rent 1400 may be any real property in the neighborhood(s) 1404 of the global neighborhood environment 1408 offered for rent by the user (e.g., host 106) of the global neighborhood environment 1408.

In example embodiment illustrated in FIG. 14, the global neighborhood environment 1408 may communicate with the neighborhood 1404 through the network 101. The global neighborhood environment 1408 as illustrated in example embodiment of FIG. 14 may communicate the data with the global map data 1406, the renter 107, and/or the host 106. In the example embodiment illustrated in FIG. 14, the short-term rental module 1430 of the global neighborhood environment 1408 may communicate with search module 1414, a rent module 1410, a pushpin module 1426, a paying guest module 1420, a syndication module 1422, a social community module 1428, a map module 1424, a contribution module 1416, and a recommendation module 1418.

For example, the user (e.g., the renter 107, the host 106, etc.) may be associated with the real property (e.g., immovable property such as homes, offices, commercial places, etc.) in the geo-spatial environment when the user claims the real property. A profile of the user and the real property may be concurrently displayed in the geo-spatial environment in a map. Furthermore, unclaimed profiles associated with different real properties (e.g., generated through the social community module 1428 of FIG. 14) may be simultaneously generated in the map surrounding the real property claimed by the user (e.g., the renter 107, the host 106, etc.). Also, a status of the real property claimed by the user may be marked in the geo-spatial environment as being available through an indicator expressing an availability status of the real property (e.g., the indicator may indicate an availability as the for-rent-by owner, property for rent, etc.).

In addition, the availability status may be modified to the for-rent-by-owner status (e.g., through the rent module 1410 of FIG. 14). Also, the meta-data may be applied to the real property indicating the price, the duration, the physical characteristic, and/or the condition of the real property.

Also, the availability status may be modified to the for rent status (e.g., the rent status may be modified through rent module 1410 of FIG. 14). The meta-data indicating the price, a term, the duration, the physical characteristic, and/or the condition of the real property may be applied to the real property (e.g., home, office, restaurants, etc.). Furthermore, a prospective renter of the real property in a particular window of time in the geo-spatial environment may be booked when the user selects a user who has requested the real property as a rental. A payment of another user may be processed when another user (e.g., the prospective renter) confirms a booking of the real property on a particular day.

The prospective renters who may wish to acquire any one of the tenancy and renter interest in the real property may be pre-qualified (e.g., using the recommendation module 1418 of FIG. 14). Also, an optimal one of the prospective renters may be invited to transact the real property with the user.

In addition, a representation of properties listed in the multiple listing services may be concurrently generated directly in the geo-spatial environment along with the unclaimed pages and the real property claimed by the user. Furthermore, a system includes any number of neighborhoods 1404 having the registered users and/or unregistered users of a global neighborhood environment 1408. The system also includes a social community module 1428 of the global neighborhood environment 1408 to enable the registered users of a social network overlying a global mapping infrastructure to geo-spatially mark properties that they have claimed as being available in the open market to the potentially interested parties (e.g., the host, the renter etc.), according to one embodiment.

In addition, the system includes the social community module 1428 of the global neighborhood environment 1408 to enable the registered users to create the social network page of themselves, and/or to edit information associated with the unregistered users identifiable through a viewing of the physical properties in which the unregistered users reside when the registered users have knowledge of characteristics associated with the unregistered users so that the potentially interested parties have an ability to view a consensus social characteristic of neighbors (e.g., the host 106 of FIG. 14) surrounding a property marked as transact able.

The system may further include a search module 1414 of the global neighborhood environment 1408 to enable the people search, the short-term rental search, business search, and/or the category search of any data in the short-term rental module 1430 and/or to enable embedding of any content in the global neighborhood environment 1408 in other search engines, blogs, social networks, professional networks and/or static websites. Also, the system may include the rent module 1410 of the global neighborhood environment 1408 to modify the availability status to the for-rent-by-owner status (e.g., a summary view 1510 of FIG. 15), to apply the meta-data indicating the price, the duration, the physical characteristic, and/or the condition of the real property being marketed to the real property.

Moreover, the system may also include the pushpin module 1426 to automatically set the new latitude and longitude location based on the relocation of the pushpin indicator of the real property when the user relocates the pointer in the geo-spatial environment indicating the physical location of the real property (e.g., pushpin 1303 of FIG. 13). Also, the system may include the syndication module 1422 of the global neighborhood environment 1408 to publish the real property across the multiple listing service database upon request of the user (e.g., the renter, the host, etc.). In addition, the system may include the rent module 1410 of the global neighborhood environment 1408 to modify the availability status to the for rent status and/or to apply the meta-data indicating the price, the term, the duration, the physical characteristic, and/or the condition of the real property to the real property.

The system may further include a paying guest module 1420 of the global neighborhood environment 1408 to book the prospective resident (e.g., the renter 107 FIG. 14) of the real property in the global neighborhood environment 1408 in the particular window of time when the user selects the social networking profile of another user who has requested the real property as the rental, and/or to process the payment of the another user (e.g., the host etc.) when the another user confirms the booking of the real property on the particular day.

The system may include the recommendation module 1418 of the global neighborhood environment 1408 to pre-qualify prospective renters (e.g., the potential renters) who wish to acquire the tenancy and/or the rentership interest in the real property, and/or to invite an optimal one of the prospective renters to transact the real property with the user. Moreover, the system may include the recommendation module 1418 of the global neighborhood environment 1408 to build the community of real estate transaction, verification, and/or inspection parties, and/or to provide the recommendation to the chosen few of the real estate transaction (e.g., the selected users of the global neighborhood environment 1408 may be recommended), verification, and/or inspection parties to neighbors (e.g., the hosts of FIG. 14) of the user through the recommendation interface in the geo-spatial environment.

A global neighborhood environment 1408 includes a first instruction set to visualize real property tenancy and/or for rent availability and/or to reside above the map data, in which the social network underlies the visualization network in that each prospective lister and/or renter of the real property may be expressible to one and other in the geo-spatial environment. Furthermore, the global neighborhood environment 1408 includes a second instruction set integrated with the first instruction set to enable users of the social network to mark owned ones of their properties as being available as rental properties and which provides a positive and negative user generated content of rentors and/or hosts surrounding the claimed ones of the properties being available as the rental properties (e.g., the availability status of the real property may be displayed through the profile view as illustrated in FIG. 15).

In addition, the global neighborhood environment 1408 includes a third instruction set to provide a free form of expression of the users sharing information about any entities and/or people renting and/or hosting in any geographical location identifiable in the satellite map data, and/or to provide a technique of each of the users to claim the geographic location to control content in their respective claimed geographic locations. Also, the global neighborhood environment 1408 includes a fourth instruction set integrated with the first instruction set and the second instruction set to enable global exploration of properties being marketed in the geo-spatial environment by indexing each of the data shared by the users of any of the people and/or entities residing in any geographic location.

Figure 15:
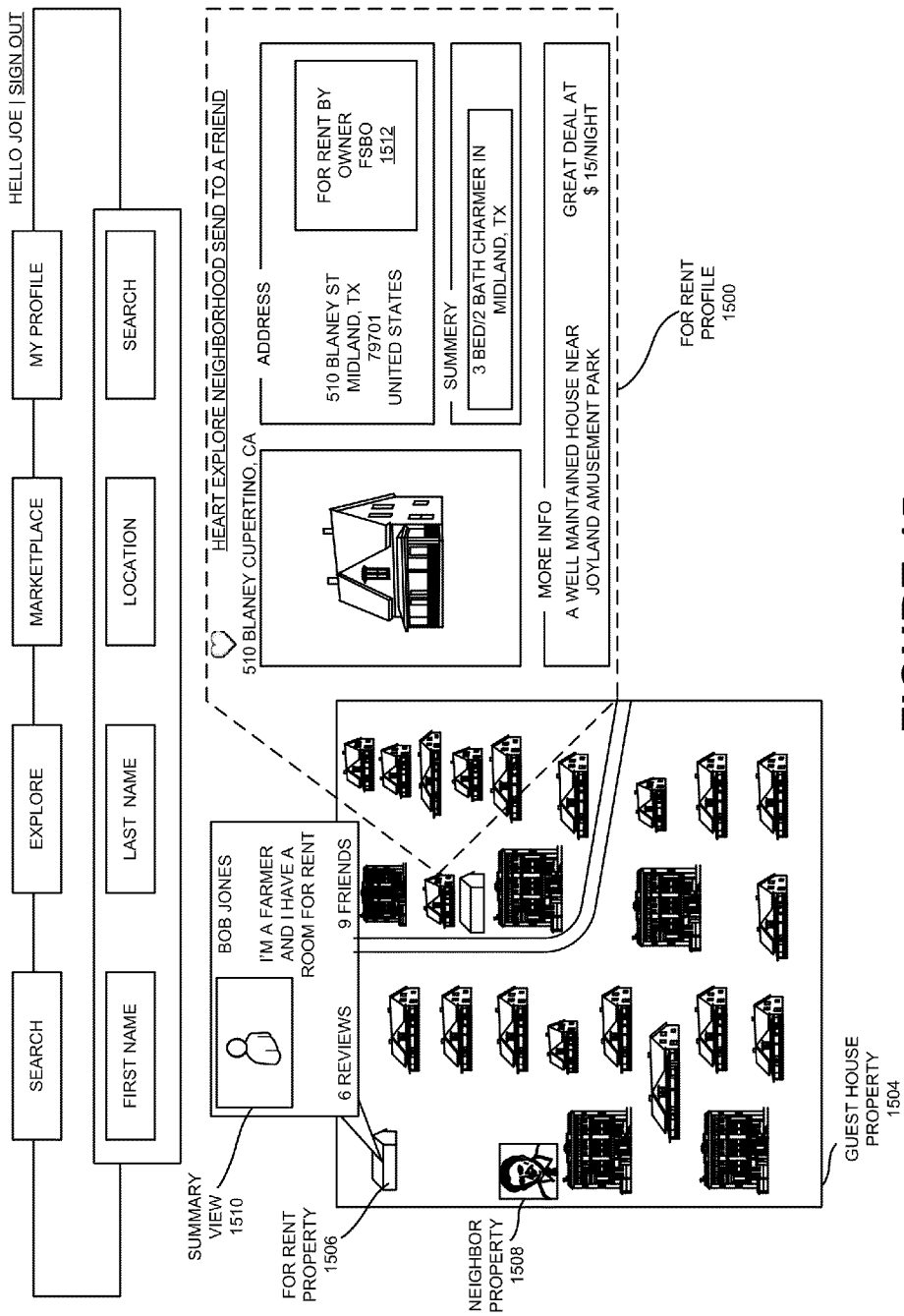
FIG. 15 is a user interface view of for-rent profile of a real property in a geo-spatial environment, according to one embodiment.

FIG. 15 is a user interface view of for-rent profile of a real property in a geo-spatial environment, according to one embodiment.

FIG. 15 is a user interface view of for-rent profile of a real property in a geo-spatial environment, according to one embodiment. Particularly FIG. 15 illustrates the for-rent profile 1500, a for-rent property 1506, a guest house property 1504, a neighbor property 1508, a summary view 1510, and a FRBO 1512, according to one embodiment.

The for-rent profile 1500 may be the profile of the real property of the global neighborhood environment 1408 of FIG. 14 requested by the user. The for-rent profile 1500 may display information associated with the real property (e.g., address, status of availability, price of the real property, facilities, neighborhood features, etc.) in the geo-spatial environment claimed by the user. The for-rent property 1506 may be the real property in the geo-spatial environment displayed in the aerial map window listed by the another user (e.g., the host, etc.) for rent.

The guest house property 1504 may display location of the guest house property in the aerial map that may facilitate the user to book the prospective resident of the real property in the global neighborhood environment 1408. The for-rent property 1506 may display the real property requested by the user of the global neighborhood environment 1408 as rental on the aerial map. The neighbor property 1508 may display the location and/or the information associated with the neighbor's property of the user who may wish to acquire any one of the tenancy interest and renter interest in the real property in the surrounding area of the neighbor's property. The summary view 1510 may display the information associated with the registered user and/or unregistered user of the global neighborhood environment 1408 in the map and/or may allow to edit the profile of the user associated with the real property in the geo-spatial environment. The summary view 1510 may enable the potentially interested parties to view the consensus social characteristic of neighbors (e.g., hosts) surrounding the real property marked as transact able through the pushpin indicator.

The FRBO 1512 may display the availability status of the real property as for-rent-by owner and/or may also enable the user (e.g., the renter, etc.) to access the information associated with the real property which the user (e.g., renter etc.) wishes to acquire any one of the tenancy interest and rentership interest. The FRBO 1512 may offer information that may contain the price, the physical characteristic, condition of the real property, etc.

In example embodiment illustrated in FIG. 15, the user interface view displays the profile of the real property in the geospatial environment in the aerial map requested by the user who wishes to acquire any one of the tenant interest and renter interest in the real property and that may contain the information such as address of the real property, the availability status of the real property, the facilities in the real property, the price of the real property, etc.

The user interface view as illustrated in example embodiment of FIG. 15 may also display the information associated with the physical location of the real property in geo-spatial environment the such as guest houses, properties for rent, neighbor's properties, etc. located by the user (e.g., the renter, the host etc.) through the pointer in the geo-spatial environment. The interface view illustrated in FIG. 15 may also display the summary view of the occupants when the user of the global neighborhood environment 1408 locates the pointer on the aerial map to view details (e.g., details of Bob Jones illustrated in FIG. 15) of the occupants associated with the real property in the geo-spatial environment. The interface view of FIG. 15 may enable the user of the global neighborhood environment 1408 of FIG. 14 to locate the physical location of the real property through the pushpin 1303.

For example, the user profiles associated with the different real properties surrounding the real property may be previewed in response to a mouse having both positive and/or negative data. Furthermore, the new latitude and longitude location may be automatically set based on the relocation of the pushpin indicator of the real property when the user relocates the pointer in the geo-spatial environment indicating the physical location of the real property.

It should be noted that physical mailers may be distributed to users based on any interest of a registered user. For example, the geospatial environment may be pre-seeded with postal address data. Even when an address is not associated with a registered user, any user (e.g., such as a user renting their home) may be able to communicate with any neighbor and/or person having a physical address in the geo-spatial environment. For example, any registered user can send a message to an entire neighborhood. Those who are registered users may receive an email, while those who are not registered users may receive a physical postcard or mailer (e.g., such as a coupon book).

Users may be able to customize a look and feel of the physical mailer. In addition, users may be able to pre-purchase electronic 'postage stamps', and/or create a debit/credit account that they can use to pay for physical mail pieces. A service fee may be assessed (e.g., 20% of postage amount) on the physical mail pieces sent through the geospatial environment. Likewise, each mail piece (e.g., a postcard, a home for rent an envelope, a coupon book, a greeting card, a holiday card, a wedding announcement, a block party invite) may include a logo of the geospatial provider (e.g., a Fatdoor.com logo), to increase brand awareness. Users may receive a rebate for their mailing costs if they allow one or more targeted text or display ads to be put on the cover or envelope of the mail piece. As such, users in the geospatial environment can communicate with each other through both physical (e.g., postal) and through electronic (e.g., email, instant message, SMS, etc.) means simultaneously.

Figure 16:
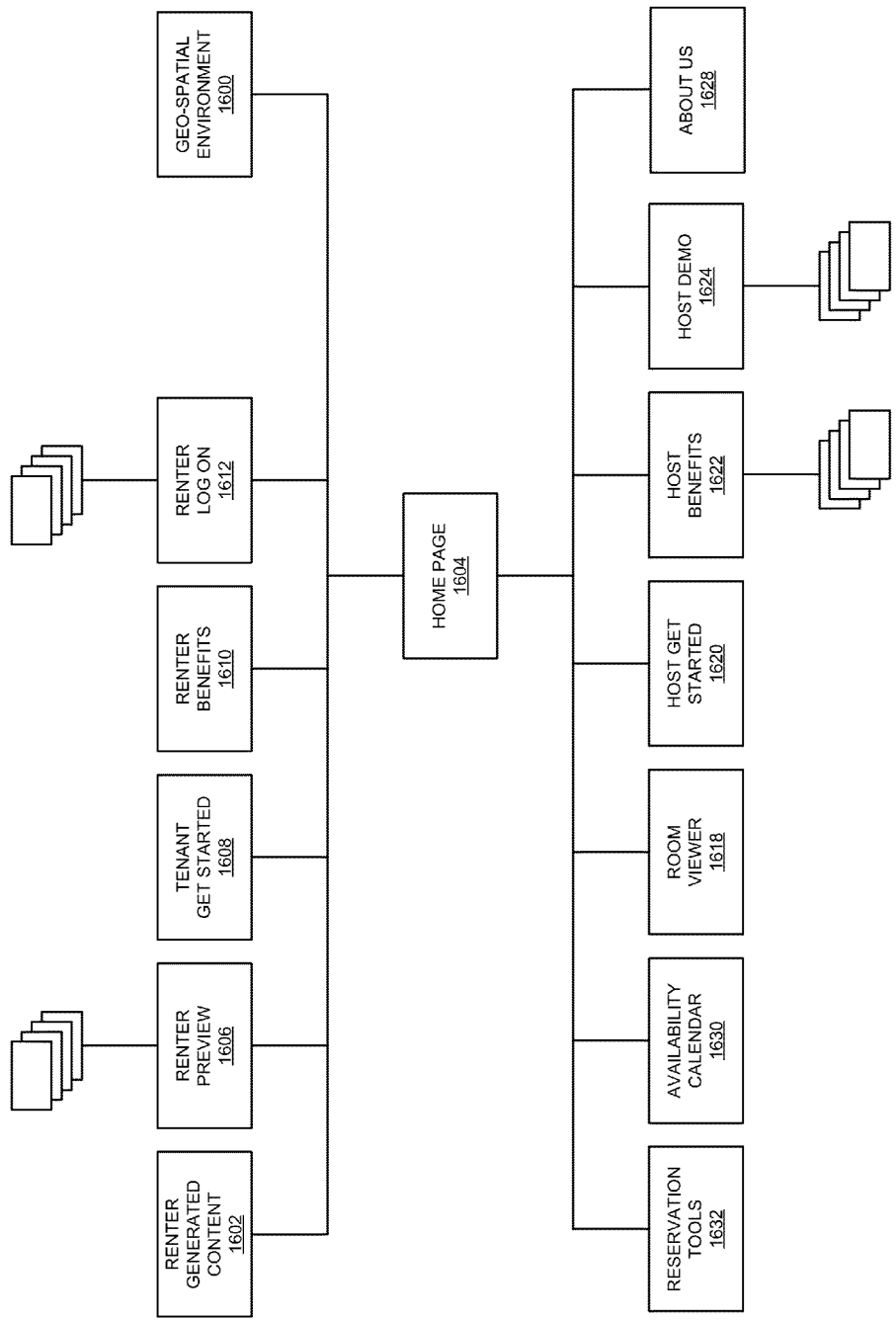
FIG. 16 is tree diagram of top level of a website for renting and listing the real property in the geo-spatial environment, according to one embodiment.

FIG. 16 is tree diagram of top level of a website for renting and listing the real property in the geo-spatial environment, according to one embodiment.

FIG. 16 is tree diagram of top level of a website for renting and/or listing the real property in the geo-spatial environment, according to one embodiment. Particularly FIG. 16 illustrates the geo-spatial environment 1600 (e.g., the global neighborhood environment 1408, the short-term listing server 100), a renter generated content 1602, a home page 1604, a renter preview 1606, a tenant get started 1608, a renter benefits 1610, a renter log on 1612, a reservation tools 1632, an availability calendar 1630, a room viewer 1618, a host get started 1620, a host benefits 1622, a host demo 1624, and an about us 1628, according to one embodiment.

The geo-spatial environment 1600 may provide and/or display virtual map of the geographical location in the neighborhood 1404 of the real property. The renter generated content 1602 may be the content (e.g., the content generated may be positive and/or negative) associated with the user located in the geographical localized community. The renter generated content 1602 may be generated through the set of instructions contained in the global neighborhood environment 1408. The home page 1604 may be start page, front page and/or main web page of the website of the entity associated with real property transaction (e.g., Fatdoor.com).

In addition, the home page 1604 may usually include hyperlinks to other web pages of the website of the real property transactions in the geo-spatial environment. The renter preview 1606 may enable the prospective renter to rent and/or bid the real property associated with neighborhood 1404 through a demo (e.g., a picture slide show, a video clip, a power point presentation, etc.). The renter preview 1606 may allow information displaying the price, the duration, the physical characteristic and/or the condition of the real property on the request of the user (e.g., the prospective renter). The tenant get started 1608 may facilitate the prospective renter (e.g., who may have a wish to acquire any one of the tenant interest in the real property of the neighborhood) to rent online the real property in the geo-spatial environment.

The renter benefits 1610 may offer the benefits associated with the transaction (e.g., renting) of the real property in the geo-spatial environment through the real property online marketplace (e.g., Fatdoor.com). The renter log on 1612 may permit access to privileges and/or facilities to the registered user of the global neighborhood environment 1408 for renting.

The room viewer 1618 may enable the user (e.g., the prospective renter etc.) to rent the real property in the geo-spatial environment and/or facilitate the user to preview the details (e.g., the image of the real property, the information associated with the real property, etc.) the real property in the geo-spatial environment.

The host get started 1620 may allow the user (e.g., the host) to list the real property for rent, etc. in the web page. The host benefits 1622 may allow the user of the global neighborhood environment 1408 (e.g., interested in listing the real property) to know the benefits of listing and renting the real property (e.g., safe, no delays, transactions online, etc.) through the online real property marketplace (e.g., Fatdoor.com). The host demo 1624 may enable the prospective host to rent out the real property associated with the neighborhood 1404 through a demo presentation (e.g., a picture slideshow, a video clip, a power point presentation, etc.). The host demo 1624 may guide a user (e.g., the host) to list the real property on the website (e.g., Fatdoor.com).

The about us 1628 may provide information associated with the entity (e.g., the host, the real property marketplace). The availability calendar 1630 may offer the information associated with renting a real property (e.g., availability dates and/or times) and/or may facilitate the potentially interested parties to book the prospective resident of the real property in the geo-spatial environment. The availability calendar 1630 may also allow the prospective renter to make payment after confirmation of booking of the real property on the particular time. The reservation tools 1632 may facilitate the prospective renter reserve transaction associated with the real estate property for the particular period of time.

In example embodiment FIG. 16 illustrates the home page 1604 through which the user (e.g., the prospective renter, the host etc.) of the global neighborhood environment 1408 may be enabled to choose the facilities and/or the privileges for online transaction of the real property in the geo-spatial environment using the hyperlinks on the webpage.

Figure 17A:
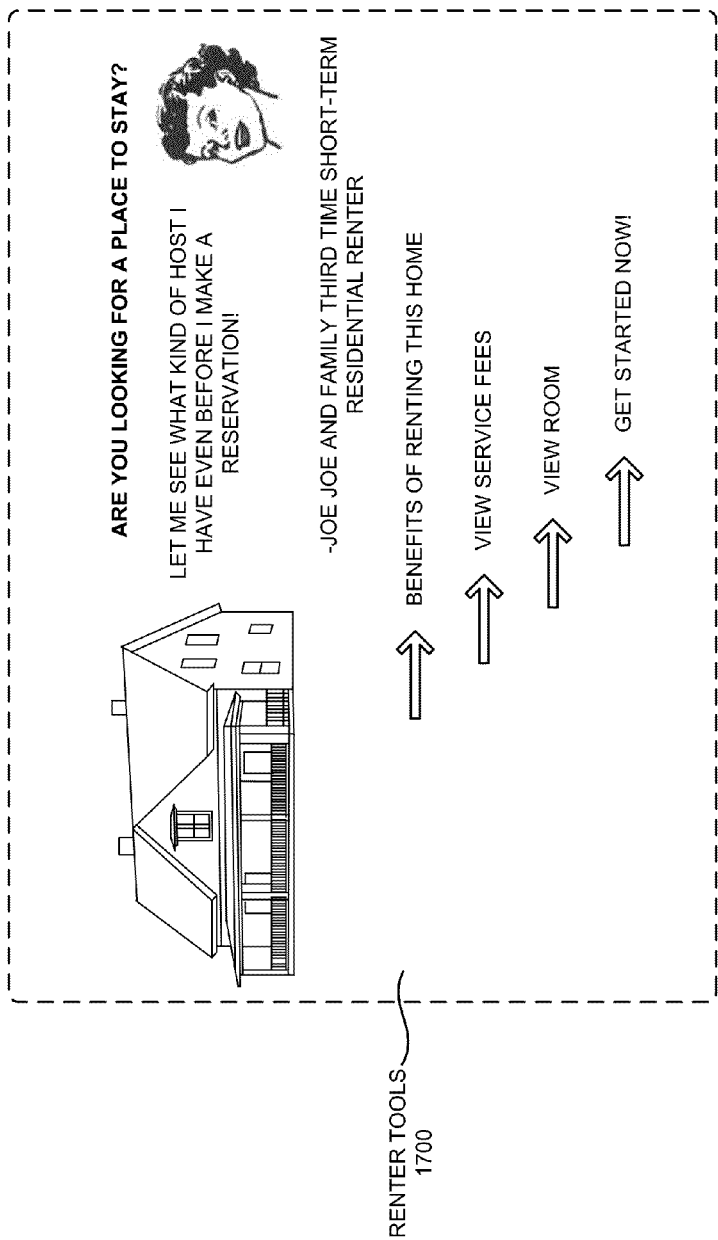
FIG. 17A is a user interface view of a tenant tools, according to one embodiment.

FIG. 17A is a user interface view of a tenant tools, according to one embodiment.

FIG. 17A is a renter view of a renter tools 1700, according to one embodiment. Particularly the FIG. 17A illustrates the renter tools 1700, according to one embodiment. The renter tools 1700 may enable the user (e.g., the renter 107) of the global neighborhood environment 1408 to access the information associated with the real property in the geospatial environment. The renter tools 1700 may offer the real property renter to view the benefits of renting the real property (e.g., room, home) through the real property online marketplace (e.g., Fatdoor.com). The renter tools 1700 may facilitate the user (e.g., prospective renter etc.) to access a demo (e.g., the videos showing the instruction of renting a home through Fatdoor.com).

In addition, the renter tools 1700 may also allow the user of the global neighborhood environment 1408 who wishes to acquire any one of the tenancy interest to rent a room and/or home through online real property marketplace (e.g., Fatdoor.com). Also, the renter tools 1700 may enable user (e.g., the renter) to express their views associated with real property (e.g., views associated with the real property user planning to rent.)

Figure 17B:
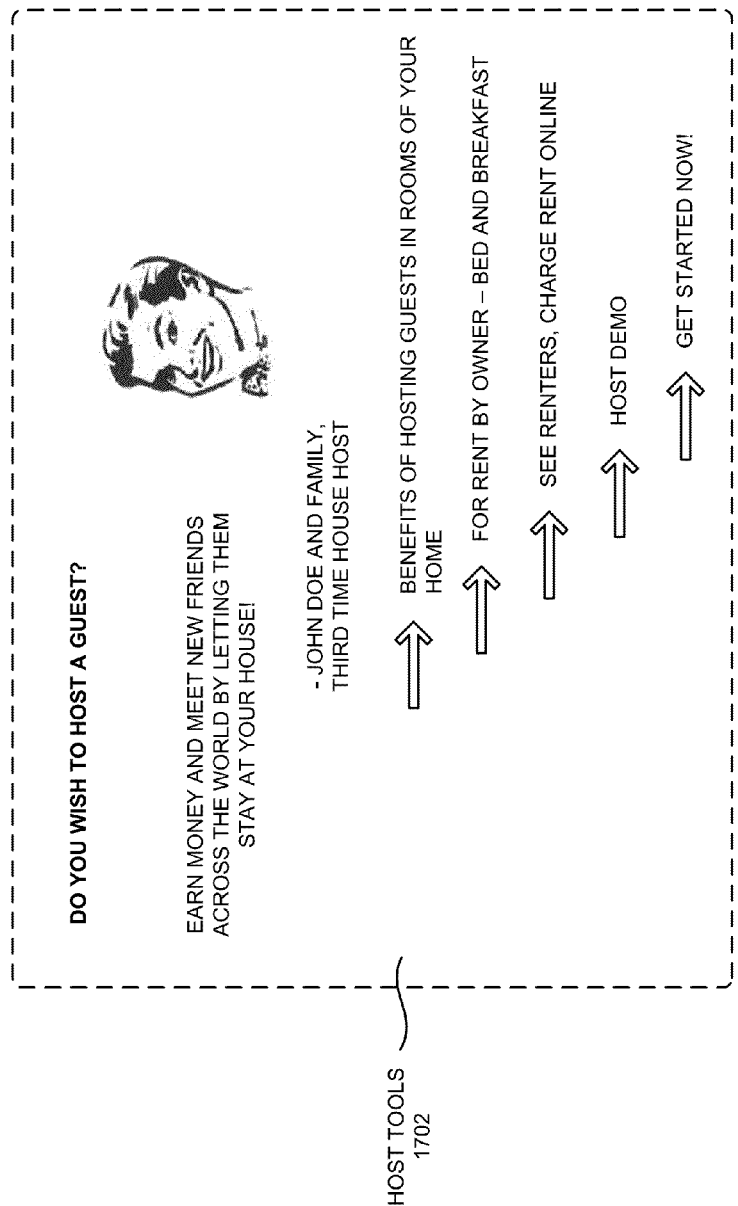
FIG. 17B is a user interface view of a lister tools, according to one embodiment.

FIG. 17B is a user interface view of a host tools, according to one embodiment.

FIG. 17B is a user interface view of the host tools 1702, according to one embodiment. The host tools 1702 may facilitate the user (e.g., the host 106) to express the views associated with the real property the users may wish to acquire. The host tools 1702 may offer the real property host to view the benefits of listing a real property (e.g., room, home) through the real property online marketplace (e.g., Fatdoor.com). The host tools 1702 may also facilitate the user (e.g., prospective renter) to access a host's demo (e.g., the videos showing the instruction of renting a home through Fatdoor.com). In addition, the host tools 1702 may allow the user of the global neighborhood environment 1408 to list a home on online real property marketplace (e.g., Fatdoor.com) through a link get started. The host tools 1702 may enable the user to access other information such as charge rent, commissions, renters information, etc.

Figure 18:
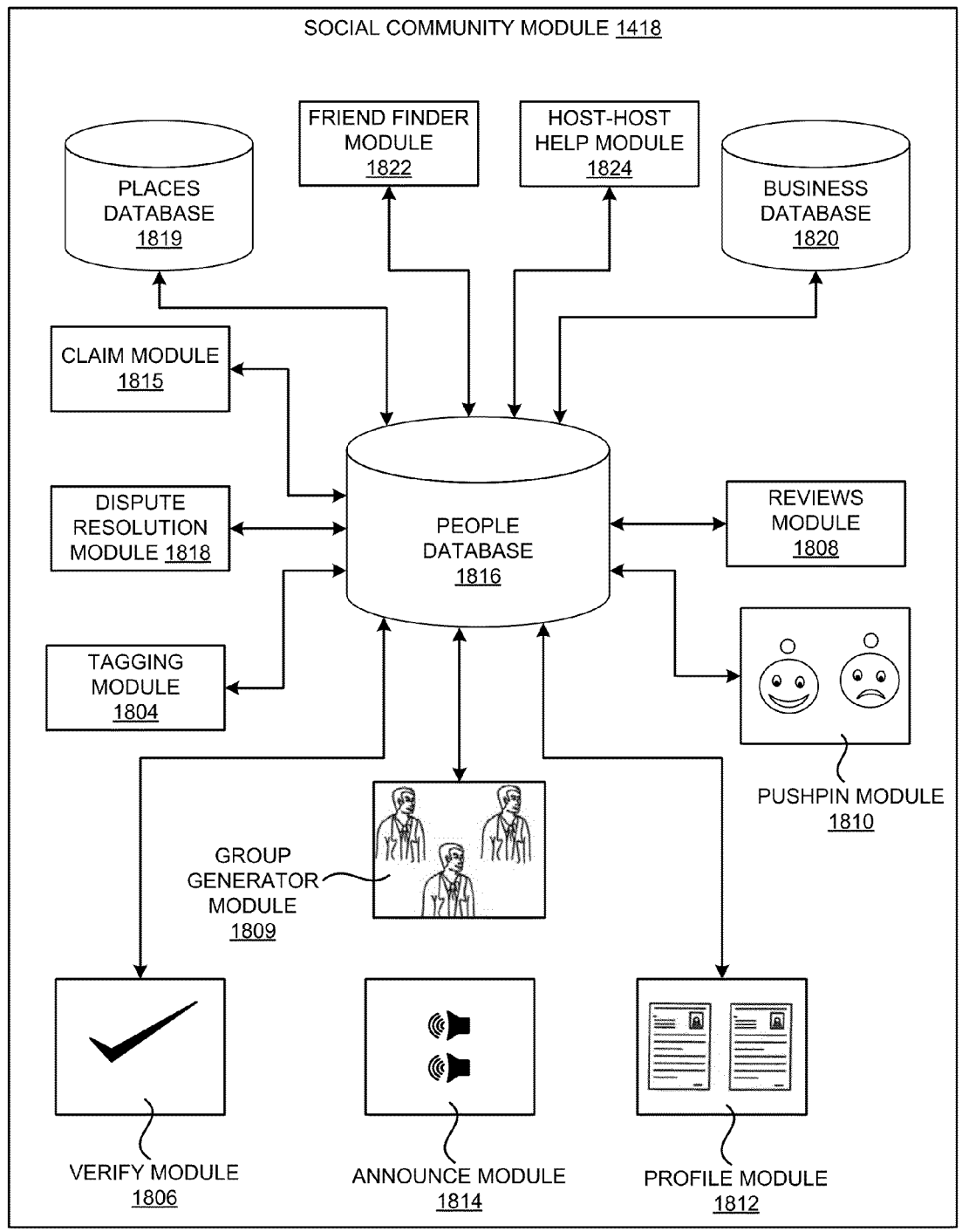
FIG. 18 is an exploded view of a social community module of FIG. 14, according to one embodiment.

FIG. 18 is an exploded view of a social community module of FIG. 14, according to one embodiment.

FIG. 18 is an exploded view of the social community module 1418, according to one embodiment. Particularly FIG. 18 illustrates a tagging module 1804, a verify module 1806, a reviews module 1808, a group generator module 1809, a pushpin module 1810, a profile module 1812, an announce module 1814, a claim module 1815, a dispute resolution module 1818, a places database 1819, a people database 1816, a business database 1820, a friend finder module 1822, and a host-host help module 1824, according to one embodiment.

The tagging module 1804 may enable the user (e.g., the host 106, the renter 107) to leave brief comments on each of the profiles (e.g., the unclaimed profile 2408 of FIG. 24) and social network pages in the global neighborhood environment 1408 (e.g., the global neighborhood environment 1408 of FIG. 14).

The verify module 1806 may validate the data, profiles and/or email addresses received from various registered user(s) before any changes may be included. The groups generator module 1808 may enable the registered users to form groups may be depending on common interest, culture, style, hobbies and/or caste. The pushpin module 1810 may generate customized indicators of different types of users, locations, and interests directly in the map. The profile module 1812 may enable the user to create a set of profiles of the registered users and to submit media content of themselves, identifiable through a map.

The announce module 1814 may distribute a message in a specified range of distance away from the registered users when a registered user purchases a message to communicate to certain ones of the registered users surrounding a geographic vicinity adjacent to the particular registered user originating the message. The people database 1816 may keep records of the visitor/users (e.g., the renter 107, the host 106). The dispute resolution module 1818 may manage the data related to the location of the user (e.g., address of the host and/or the renter). The business database 1820 may manage an extensive list of leading information related to business. The friend finder module 1822 may match the profile of the registered user with common interest and/or help the registered user to get in touch with new friends or acquaintances.

For example, the verify module 1806 of the social community module 1418 may authenticate an email address of a registered user prior to enabling the registered user to edit information associated with the unregistered users through an email response and/or a digital signature technique. The groups generator module 1808 of the social community module (e.g., the social community module 1418) may enable the registered users to form groups with each other surrounding at least one of a common neighborhood (e.g., a neighborhood 1404), political, cultural, educational, professional and/or social interest.

In addition, the tagging module 1804 of the social community module (e.g., the social community module 1418) may enable the registered users and/or the unregistered users to leave brief comments on each of the unclaimed profiles (e.g., a wiki profile, the unclaimed profile 2408 of FIG. 24) and/or social network pages in the global neighborhood environment 1408 (e.g., the global neighborhood environment 1408), in which the brief comments may be simultaneously displayed when a pointing device rolls over a pushpin indicating a physical property associated with any of the registered users and/or the unregistered users. Also, the pushpin module 1810 of the social community module 1418 may be generating customized indicators of different types of users, locations, and/or interests directly in the map.

Further, the announce module 1814 of the social community module 1418 may distribute a message in a specified range of distance away from the registered users when a registered user purchases a message to communicate to certain ones of the registered users surrounding a geographic vicinity adjacent to the particular registered user originating the message, wherein the particular registered user purchases the message through a governmental currency and/or a number of tokens collected by the particular user (e.g., the host 106, the renter 107) through a creation of content in the global neighborhood environment 1408 (e.g., the short-term listing server 100).

Moreover, the profile module 1812 of the social community module 1418 may create a set of profiles of each one of the registered users and to enable each one of the registered users to submit media content of themselves, other registered users, and unregistered users identifiable through the map. The claim module 1815 may enable the registered users of a social network to geo-spatially mark properties which the user has claimed (e.g., the registered user may geo-spatially mark properties as available in an open market to potentially interested parties). The dispute resolution module 1818 may resolve issues that arise when multiple users attempt to claim the same geospatial locations and/or disputes over payment etc. The reviews module 1808 may enable users (e.g., the renter 107) to submit ratings and reviews (e.g., comments) about the host and/or short-term rental and/or experience.

Figure 19:
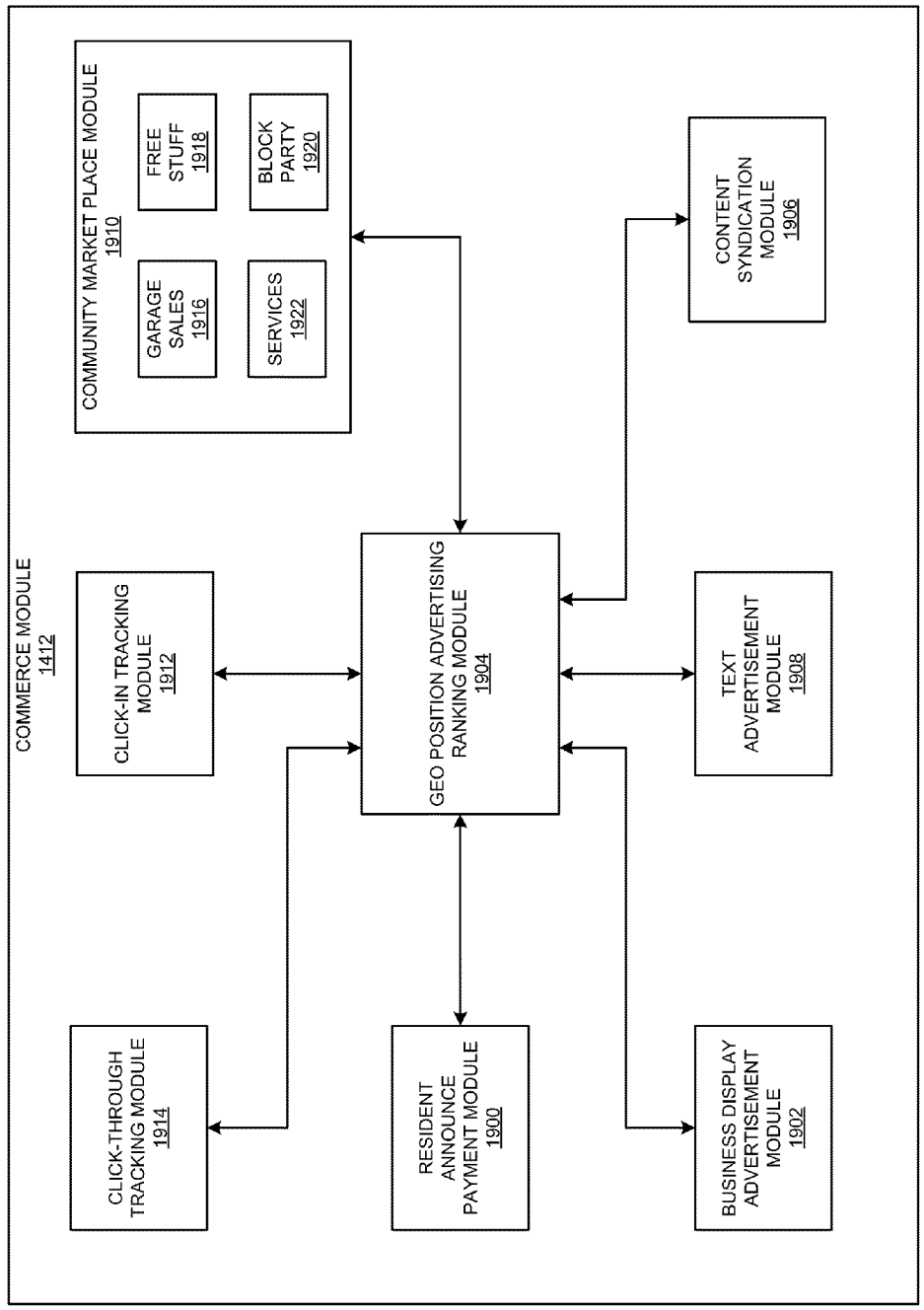
FIG. 19 is an exploded view of a commerce module of FIG. 14, according to one embodiment.

FIG. 19 is an exploded view of a commerce module of FIG. 14, according to one embodiment.

FIG. 19 is an exploded view of the commerce module 1412. Particularly FIG. 19 illustrates a resident announce payment module 1900, a business display advertisement module 1902, a geo position advertising ranking module 1904, a content syndication module 1906, a text advertisement module 1908, a community marketplace module 1910, a click-in tracking module 1912, a click-through tracking module 1914, according to one embodiment.

The community marketplace module 1910 may contain garage sales 1916, a free stuff 1018, a block party 1920 and services 1922, according to one embodiment. The click-through tracking module 1914 may determine a number of click-throughs from the advertisement to a primary website of the business.

A click-in tracking module 1912 may determine a number of user (e.g., the renter 107) who clicked in to the advertisement simultaneously. The community marketplace module 1910 may provide a forum in which the registered users can trade and/or announce messages of trading events with at least each other. The content syndication module 1906 may enable any data in the commerce module (e.g., the commerce module 1412) to be syndicated to other network based trading platforms.

The business display advertisement module 1902 may impart advertisements related to business, public relations, personal selling, and/or sales promotion to promote commercial goods and services. The text advertisement module 1908 may enable visibility of showing advertisements in the form of text in all dynamically created pages in the directory. The resident announce payment module 1900 may take part as component in a broader and complex process, like a purchase, a contract, etc.

The block party 1920 may be a large public celebration in which many members of a single neighborhood (e.g., the neighborhood 1404) congregate to observe a positive event of some importance. The free stuff 1918 may be the free services (e.g., advertisement, links etc.) available on the net. The garage sales 1916 may be services that may be designed to make the process of advertising and/or may find a garage sale more efficient and effective. The services 1922 may be non-material equivalent of a good designed to provide a list of services that may be available for the user (e.g., the host 106, the renter 107).

The geo position advertisement ranking module 1904 may rank geospatial positions based on advertising data and may communicate with the resident announce payment module 1900, the business display advertisement module 1902, the content syndication module 1906, the text advertisement module 1908, the community marketplace module 1910, the click-in tracking module 1912 and the click-through tracking module 1914.

For example, the commerce module 1412 of the global neighborhood environment 1408 (e.g., the global neighborhood environment 1408) may provide an advertisement system to a business which may purchase their location in the global neighborhood environment 1408 (e.g., the global neighborhood environment 1408) in which the advertisement may be viewable concurrently with a map indicating a location of the business, and/or in which revenue may be attributed to the global neighborhood environment 1408 (e.g., the global neighborhood environment 1408) when the registered users and/or the unregistered users click-in on a simultaneously displayed data of the advertisement along with the map indicating a location of the business.

Also, the geo-position advertisement ranking module 1904 of the commerce module 1412 may determine an order of the advertisement in a series of other advertisements provided in the global neighborhood environment 1408 (e.g., the global neighborhood environment 1408) by other advertisers, wherein the advertisement may be a display advertisement, a text advertisement, and/or an employment recruiting portal associated with the business that may be simultaneously displayed with the map indicating the location of the business.

Moreover, the click-through tracking module 1914 of the commerce module 1412 may determine a number of click-throughs from the advertisement to a primary website of the business. In addition, the click in tracking module 1912 of the commerce module 1412 may determine the number of users (e.g., the renter 107) who clicked in to the advertisement simultaneously displayed with the map indicating the location of the business.

The community marketplace module 1910 of the commerce module 1412 may provide a forum in which the registered users may trade and/or announce messages of trading events with certain registered users in geographic proximity from each other. Also, the content syndication module 1906 of the commerce module 1412 of the may enable any data in the commerce module 1412 to be syndicated to other network based trading platforms.

FIG. 20 is a table view of user address details, according to one embodiment.

FIG. 20 is a table view of user address details, according to one embodiment. Particularly the table view 2050 of FIG. 20 illustrates a host 106, a verified field? 2002, a range field 2004, a principal address field 2006, a rental field 2008, a host reviews 2010 and a renter reviews 2012, according to one embodiment. The table 2050 may include the information related to the address verification of the user (e.g., the host 106). The host 106 may include information such as the names of the registered users (e.g., hosts) in a global neighborhood environment 1408 (e.g., a global neighborhood environment 1408).

The verified? field 2002 may indicate the status whether the data, profiles and/or email address received from various registered user are validated or not. The range field 2004 may correspond to the distance of a particular registered user geographical location in the global neighborhood environment 1408 (e.g., the global neighborhood environment 1408).

The principal address field 2006 may display primary address of the registered user (e.g., the host 106) in the global neighborhood environment 1408. The rental field 2008 may further give more accurate details and/or links of the address of the user (e.g., the host 107). The host reviews field 2010 may indicate the number of reviews submitted by the host (e.g., reviews of previous renters). The renter reviews field 2012 may display the number of reviews about the host submitted by other users (e.g., the renter 107). In one or more embodiments, the user may be able to view the reviews indicated in the 2010 and/or 2012 fields upon a selection of the listed reviews (e.g., by clicking on a hyperlink embedded in the 2010 and/or 2012 fields).

The host field 106 displays "Joe" in the first row and "Jane" in the second row of the host 106 column of the table 2050 illustrated in FIG. 20. The verified field? 2002 displays "Yes" in the first row and "No" in the second row of the verified? field 2002 column of the table 2050 illustrated in FIG. 20. The range field 2004 displays "5 miles" in the first row and "Not enabled" in the second row of the range field 2004 column of the table 2050 illustrated in FIG. 20. The principal address field 2006 displays "500 Clifford Cupertino, Calif." in the first row and "500 Johnson Cupertino, Calif." in the second row of the principle address field 2006 column of the table 2050 illustrated in FIG. 20. The rental field 2008 displays "859 Bette, 854 Bette" in the first row and "851 Bette 100 Steven's Road" in the second row of the rental field 2008 column of the table 2050 illustrated in FIG. 20.

The host reviews field 1210 displays "5 reviews" in the first row and "6 reviews, 2 comments" in the second row of the host reviews field 2010 column of the table 2050 illustrated in FIG. 20. The renter reviews field 2012 displays "4 reviews" in the first row and "1 comment" in the second row of the renter reviews field 2012 column of the table 1250 illustrated in FIG. 20.

FIG. 21 is a user interface view of claim view 2150, according to one embodiment.

FIG. 21 is a user interface view of claim view 2150, according to one embodiment. The claim view 2150 may enable the user to claim the geographical location of the registered user. Also, the claim view 2150 may facilitate the user of the global neighborhood environment 1408 (e.g., the global neighborhood environment 1408) to claim the geographical location of property under dispute.

In the example embodiment illustrated in FIG. 21, the operation 2102 may allow the registered user of the global neighborhood environment 1408 (e.g., the global neighborhood environment 1408) to claim the address of the geographic location claimed by the registered user. The operation 2104 illustrated in example embodiment of FIG. 21, may enable the user to de-list the claim of the geographical location. The operation 2106 may offer information associated with the document to be submitted by the registered users of the global neighborhood environment 1408 (e.g., the global neighborhood environment 1408) to claim the geographical location.

Figure 22A:
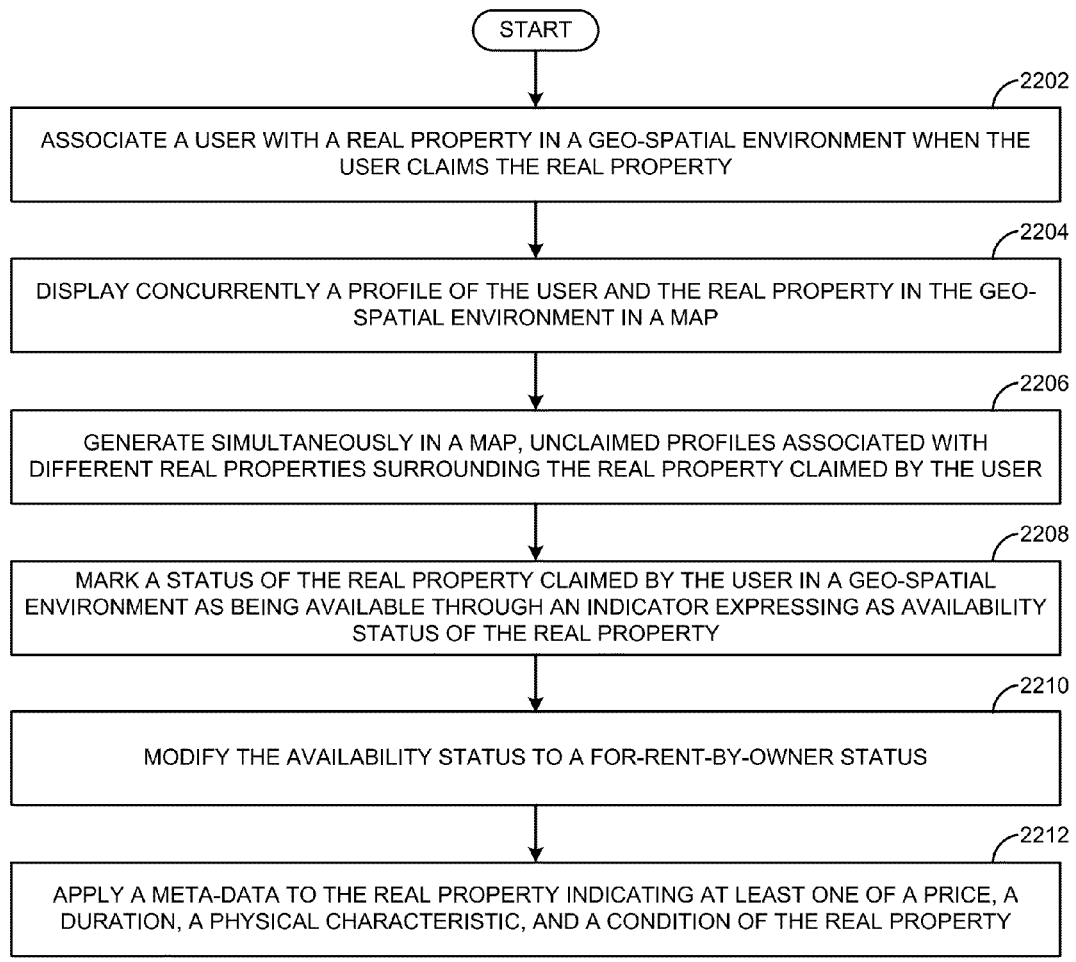
FIG. 22A is a process flow of associating a user with a real property in a geo-spatial environment and marking the status of the real property claimed by the user, according to one embodiment.

FIG. 22A is a process flow of associating a user with a real property in a geo-spatial environment and marking the status of the real property claimed by the user, according to one embodiment.

FIG. 22A is a process flow of searching map based community and neighborhood contribution, according to one embodiment. In operation 2202, a user (e.g., the host 106) may be associated with a real property in a geo-spatial environment when the user claims the real property (e.g., through the claim module 1815). In operation 2204, a profile of the user (e.g., the host 106) may be concurrently displayed with the real property in the geospatial environment in a map.

In operation 2206, a map may be generated concurrently displaying the unclaimed profiles (e.g., the unclaimed profiles 2408 of FIG. 24) associated with different real properties surrounding the real property claimed by the user. In operation, 2208, a status of the real property claimed by the user may be marked in a geospatial environment as being available through an indicator expressing as availability status of the real property.

In operation 2210, the availability status may be modified to a for-rent-by-owner status. In operation 2212, a meta-data may be applied to the real property including at least one of a price, a duration, a physical characteristic, and a condition of the real property.

Figure 22B:
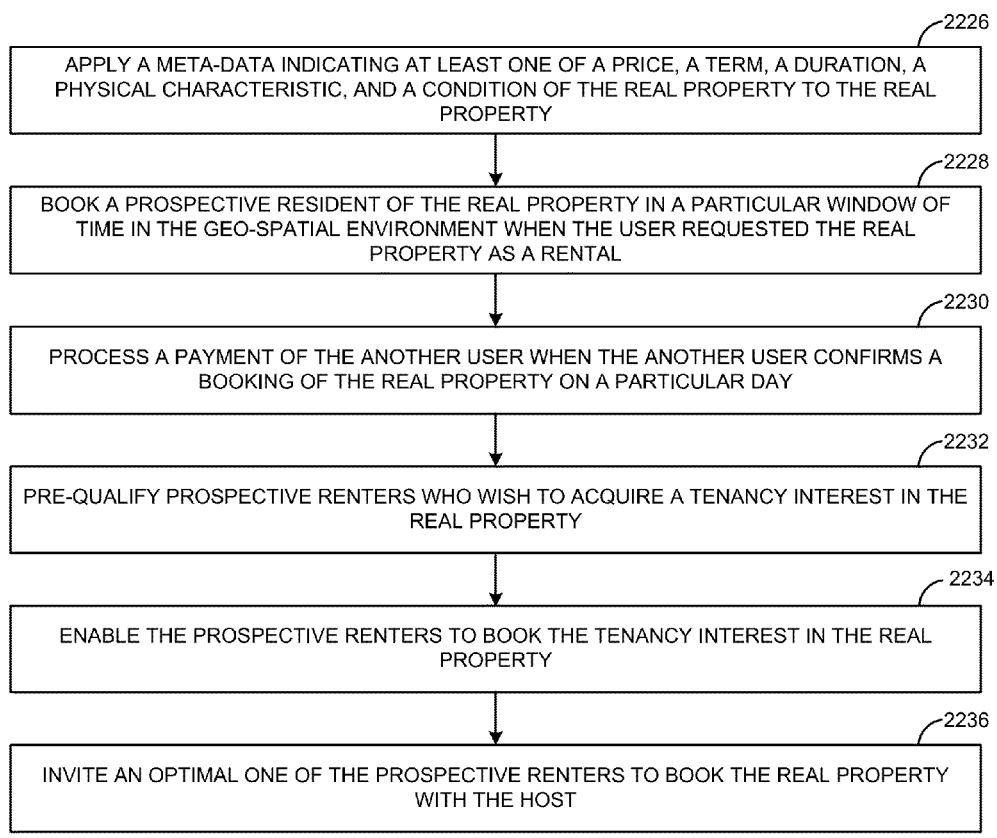
FIG. 22B is a pre-selection, booking, and process payment view of a short-term residential listing, according to one embodiment.

FIG. 22B is a pre-selection, booking, and process payment view of a short-term residential listing, according to one embodiment.

FIG. 22B is a continuation of process flow of FIG. 22A showing additional processes, according to one embodiment. In operation 2226, a meta-data indicating at least one of a price, a term, a duration, a physical characteristic, and a condition of the real property may be applied to the real property. In operation 2228, a prospective resident (e.g., prospective renter) of the real property may be booked in a particular window of time in the geo-spatial environment when the user requested the real property as a rental. In operation 2230, a payment of the another user may be processed when the another user confirms a booking of the real property on a particular day. In operation 2232, prospective renters who wish to acquire a tenancy interest in the real property may be pre-qualified. In operation 2234, the prospective renters may be enabled to book the tenancy interest in the real property. In operation 2236, an optimal one of the prospective renters may be invited to book the real property with the host.

A Bed and Breakfast may be a type of boarding house typically operating out of a large single family residence (e.g., the residence 1402 of FIG. 14). Guests may be accommodated at night in private bedrooms and breakfast may be served in the morning—in any one of the bedroom, a dining room, the host's kitchen.

Bathrooms may be private, shared (e.g. sharing with other guests, sharing with the family in smaller establishments) and/or en-suite (e.g. where the ablutions are directly accessed from the guest's bedroom). The Bed and Breakfast may be operated either as a primary occupation or as a secondary source of income. Staff may often consist of the house's owners and/or members of their family who may live there.

Guests may usually be expected to pay for their stay upon arrival and/or leave before noon or earlier on the day of departure. A big advantage of this type of hosted accommodation may be the local knowledge of the host(s).

Guests may stay more than one night, in some smaller Bed and Breakfasts they may be expected to be away from the Bed and Breakfast during the main part of the day. This arrangement, however, may not be inconvenient since many popular Bed and Breakfasts may be located in beach and mountain areas, (e.g., Hawaii, New England, Colorado) where daytime recreation and/or tourism activities may be popular. One advantage of staying at a Bed and Breakfast may be readier access to popular locations "off the beaten path" which may not be convenient to the city center.

Most Bed and Breakfasts may be small, rarely with room (e.g., the room may have the capacity to accommodate 2-12 guests). It may be advisable for anyone wanting to stay at a bed and breakfast to make reservations well in advance of their travel date. Consultation with a qualified travel agent knowledgeable in this type of accommodation may be helpful. However, many Bed and Breakfasts may belong to associations and/or may have an electronic interface (e.g., may have website of their own). Prices and tariffs may be described in various books and/or travel guides that may often be obsolete by the time they are published.

The Bed and Breakfast arrangement may actually be very old one. Before the modern times, it might have been quite normal for country travelers to spend the night at a private house rather than an inn, and the custom may have persisted in many parts of the world. However, prior to the 19th century, this might have been strictly an informal arrangement constrained by acquaintance and social rank (e.g., a doctor might stay with a doctor or pharmacist, while a nobleman would only stay with the local gentry). The abbreviation of 'B&B' on roadside signs first became popular in the British Isles.

Breakfast may usually be cooked on demand for the guest and may usually feature bacon, eggs, sausages, tomatoes, mushrooms, baked beans. But increasingly, because of either a desire of owners to economize or guests to minimize their calorie intake, a 'continental breakfast' might have become more common. Hotel prices may often be outrageous, Bed and Breakfast's may be a budget option and this tradition may continue in many parts of the world.

However, Bed and Breakfasts in many countries may often be consciously sought to recall earlier days. They may frequently be established in attractive older houses that may have been renovated and/or filled with antique furniture. In some cases, an existing inn may re-label itself as a Bed and Breakfast to improve business and/or move itself 'up-market'. Also in some countries, the Bed and Breakfasts may serve a traditional breakfast as a point of pride. Furthermore, a form of Bed and Breakfast called casa particular (e.g. "private home") became the main form of accommodation outside the tourist resorts. As they may often be run by amateurs, with little lodge management experience, strict laws might govern the operation of Bed and Breakfasts. However, regulations may vary in each jurisdiction in content, extent and in enforcement.

The most common regulations Bed and Breakfasts may have to follow pertain to safety. They may be required to have fire resistance, a sufficient fire escape plan in place, and smoke detectors in each guest room. Kitchens and equipment used to serve meals may also be monitored for sanitation. Most Bed and Breakfasts may generally be compliant with their jurisdiction's laws. However, guests may mostly be unfamiliar with these guidelines and/or may tend to overlook any violations.

While various local governments may have regulations, membership in a state/provincial/national bed and breakfast association may often indicate a higher standard of hospitality. Associations may often review their members and may tend to have additional standards of care. While the associations may also facilitate marketing of the individual bed and breakfasts. They may also provide a stamp of approval that the business in question is reputable.

Guest house (e.g., the guest house property 1504 of FIG. 15) may be a private home which might have been converted for the exclusive use of guest accommodation in the geo-spatial environment. The owner may usually live in an entirely separate area within the property and the guest house may serve as a form of lodging business, similar to a bed and breakfast. The neighborhood (e.g., the neighborhood 1404 of FIG. 14) may be a geographically localized community located within a larger city, town or suburb. The residents of a given neighborhood (e.g., the host 106 of FIG. 14) may be called neighbors.

Traditionally, a neighborhood (e.g., the neighborhood 1404 of FIG. 14) may be small enough that the neighbors may be able to know each other. However in practice, neighbors may not know one another very well at all. Villages may not be divided into neighborhoods, because they may already be small enough that all the villager may know each other.

A leasehold estate may be an ownership interest in land in which any one of a lessee and the tenant may hold real property by some form of title from the landlord. A fixed-term tenancy may last for some fixed period of time. Despite the name tenancy for years, such a tenancy may last for any period of time even a tenancy for one week may be called a tenancy for years. The duration may need not be certain, but may be conditioned upon the happening of some event, (e.g. until the crops are ready for harvest, until the war is over), such that the lease may expire automatically upon the running of the specified time, and/or the occurrence of the specified event. A lease may be purported to be a tenancy for years of more than one year, and it may not be put in writing, then it may automatically become a periodic tenancy, with a rental period equal to the period between lease payments, but of no more than a year.

Figure 23:
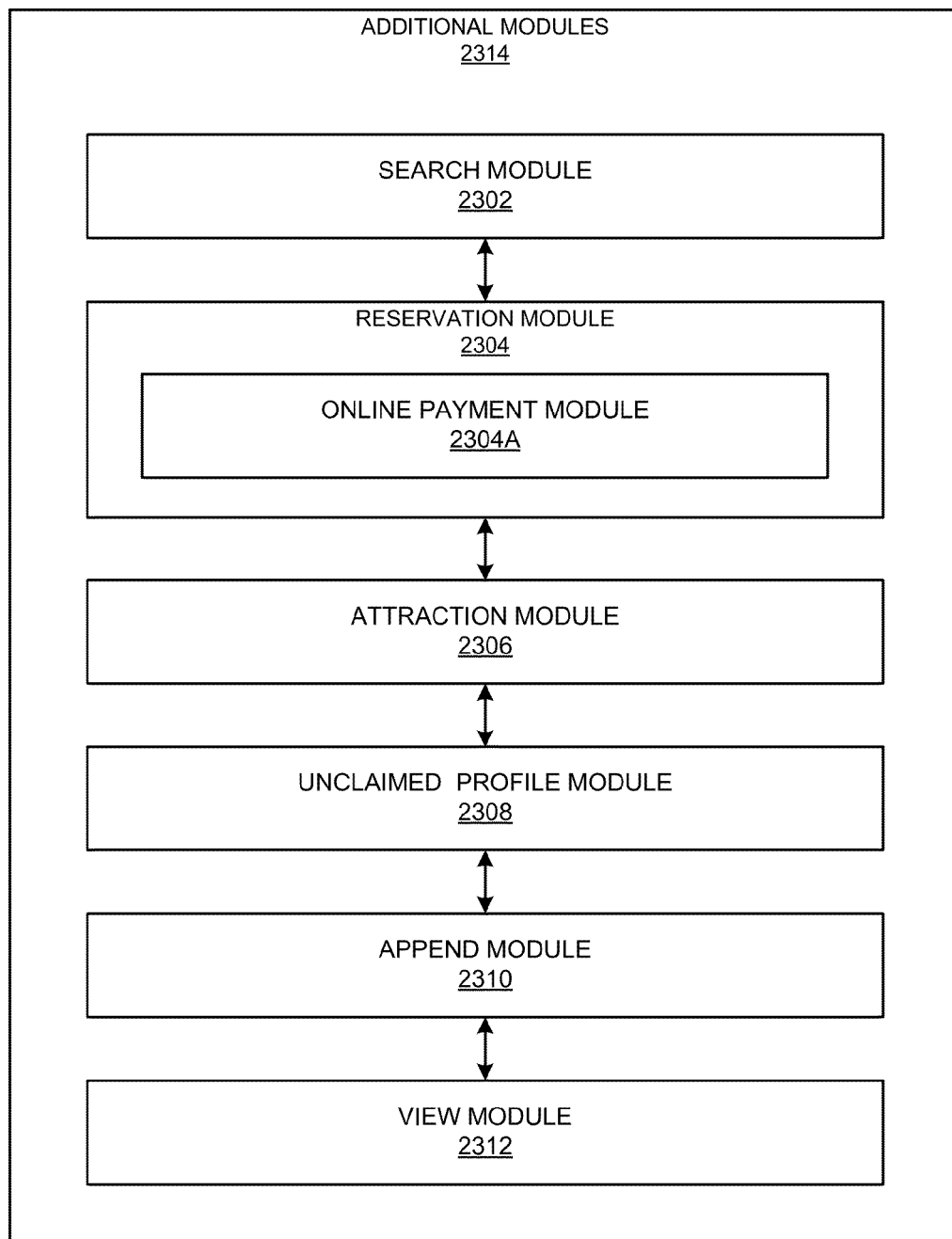
FIG. 23 is an exploded view of additional modules, according to one embodiment.

FIG. 23 is an exploded view of additional modules, according to one embodiment.

The search module 2302 of the additional modules 2314 may generate search criteria for the users to perform a search of the residential space identifiers and/or based on criteria in the geo-spatial environment. The reservation module 2304 may generate online reservations and/or provide reservation information associated with type of accommodations. The online payment module 2304A may generate online payment transactions associated with the reservation information of the type of accommodations. The attraction module 2306 may generate attraction identifiers in the vicinity of the specific geographic location associated with the user profile.

The unclaimed profile module 2308 may generate unclaimed profiles (e.g., the wiki profiles) associated with the user profiles in the display view. The append module 2310 may generate content (e.g., comments, feedback, remarks, etc.) associated with the unclaimed profiles by the users of the geo-spatial environment. The view module 2312 may generate views of accommodations (e.g., the view of a short-term rental, room for rent 1400) associated with the first residential space identifier which is associated with the first user profile.

In the example embodiment illustrated in FIG. 23, the additional modules 2314 include the search module 2302, the reservation module 2304, the attraction module 2306, the unclaimed profile module 2308, the append module 2310, and the view module 2312 communicating with each other. In addition, the reservation module 2304 includes the online payment module 2304A.

The search module 2302 of the geo-spatial environment (e.g., the short-term listing server 100) may generate search criteria, enable selection of at least one search criterion of the search criteria, and to identify and display residential space identifiers matching the search criterion of the search criteria. The reservation module 2304 of the geo-spatial environment may generate a reservation. The online payment module 2304A may generate an online payment transaction associated with the reservation. The attraction module 2306 of the geo-spatial environment may generate and display the attraction identifiers, each attraction identifier associated with an attraction (e.g., museums, amusement parks, national parks, and/or monuments, etc.) in a geographic proximity to the specific neighborhood 1404 associated with the user profile.

The unclaimed profile module 2308 of the geo-spatial environment may generate in the display view, the unclaimed profile associated with the user profile. The append module 2310 of the geo-spatial environment may generate, with at least one unclaimed profile, content associated with the unclaimed profile. The view module 2312 may generate at least one view of an accommodation associated with the first residential space identifier.

Figure 24:
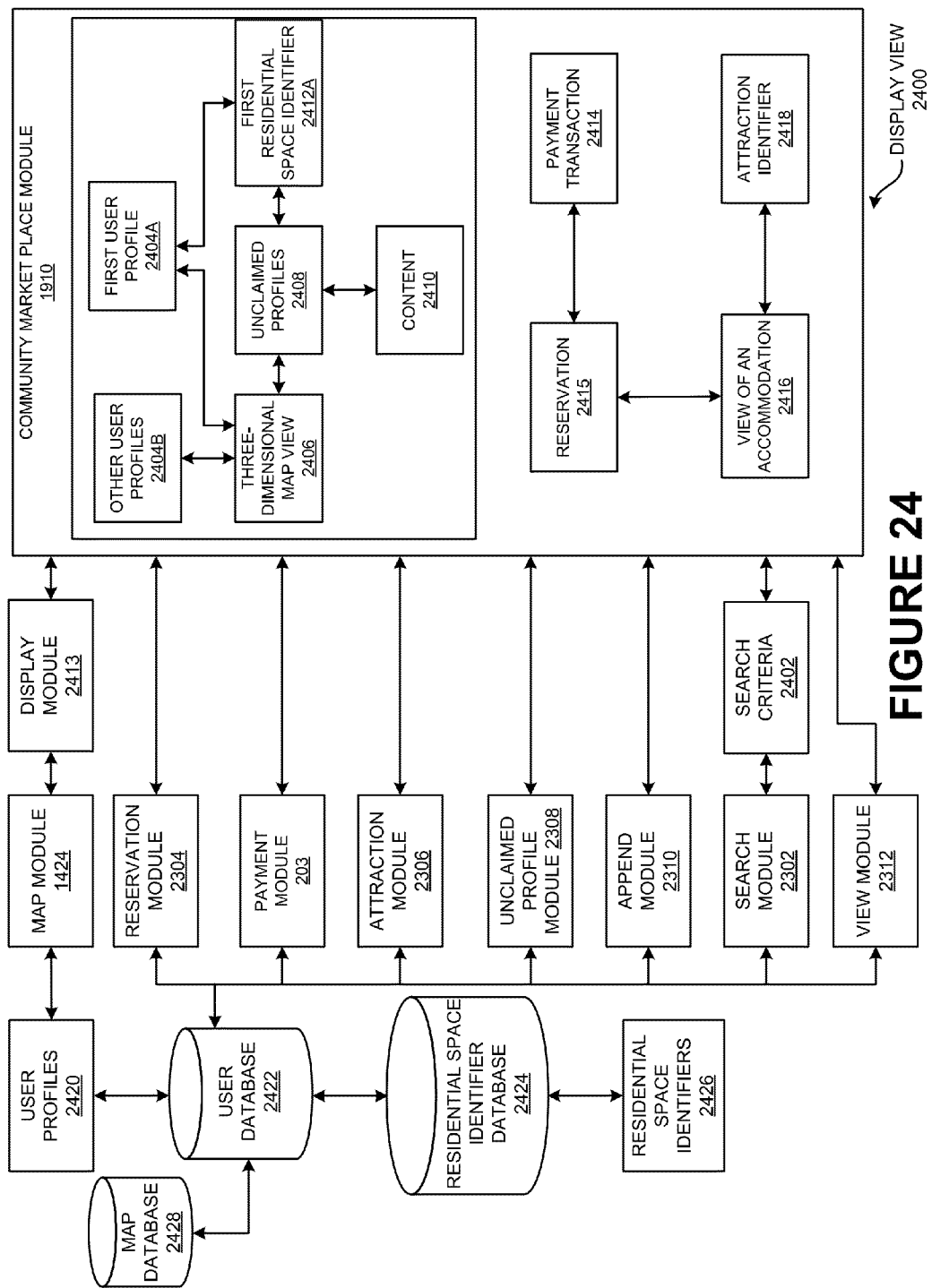
FIG. 24 is a block diagram illustrating generation of a display view associated with reservations and payment transactions through search criteria, according to one embodiment.

FIG. 24 is a block diagram illustrating generation of a display view associated with reservations and payment transactions through search criteria, according to one embodiment.

FIG. 24 is a block diagram illustrating generation of a display view 2400 associated with reservations and payment transactions through a search criteria 2402, according to one embodiment. Particularly, FIG. 24 illustrates the search criteria 2402, the payment module 203, the search module 2302, the reservation module 2304, the online payment module 2304A, the an attraction module 2306, an unclaimed profile module 2308, an append module 2310, the view module 2312, the map module 1424, a display module 2413, a user profiles 2420, a user database 2422, a residential space identifier database 2424, a residential space identifiers 2426, a map database 2428, and the community market place module 1910 according to one embodiment.

The search criteria 2402 may serve as a markup page tool (e.g., search engines) on which the users search for desired type of accommodations based on the residential space identifier associated with the user profiles 2420. The first user profile 2404A, other user profiles 2404B, the unclaimed profiles 2408, the content 2410 associated with the unclaimed profiles 2408 and/or the payment transaction information associated with the reservation status. The three-dimensional map view 2406 may enable the users (e.g., the host, the renter) to visualize the user profiles, type of accommodations, rate range, term lease options, and/or the availability status, etc.

The unclaimed profiles 2408 may be the profiles associated with the users that are displayed in the three-dimensional map view 2406. The content 2410 may provide information of the users associated with the unclaimed profiles 2408 in the geo-spatial environment. The reservation 2415 may enable the users to visualize the status of availability of type of accommodations and/or make online reservations. The payment transaction 2414 may enable the users to make the online payment transactions associated with the reservations. The view of an accommodation 2416 may enable the users (e.g., the renter) to view type of accommodations (e.g., house, room, apartment, office suite, and/or office, etc.) based on the search criteria 2402. The attraction identifier 2418 may be associated with an attraction in a geographic proximity which enables the users (e.g., the host) to attract with the type of accommodations of the specific geographic location associated with the user profiles.

In the example embodiment illustrated in FIG. 24, the display view includes the three-dimensional map view 2406, the unclaimed profiles 2408 generated from the unclaimed profile module 2308 and the content 2410 generated from the append module 2310. The display view also displays the first user profile 2404A, other user profiles 2404B (e.g., from the user database 2422), and the first residential space identifier 2412A associated with the first user profile 2404A. In addition, the display view also includes the reservation 2415 (e.g. reservation status), and the payment transaction 2414 associated with the reservation 2415. The users may also view an accommodation using the view of an accommodation 2416 and/or the attraction identifier 2418 (e.g., based on the search criteria).

The first residential space identifier 2412A associated with the first user profile 2404A may be generated and/or the first display view may be generated to include the three-dimensional map view 2406 embodied by the geospatially constrained social network 142, the first residential space identifier 2412A, and the first user profile 2404A represented at a location in the three-dimensional map view 2406 associated with the specific geographic location of the first user profile. Other user profiles 2404B may be represented simultaneously adjacent to the first user profile 2404A in the three-dimensional map view 2406. The residential space identifiers 2426 (located in the residential space identifier database 2424) may be generated, each residential space identifier 2426 associated with the user profile.

The search of the residential space identifiers 2426 may be generated based on at least one criterion. The residential space identifier 2426 matching the criterion may be identified. A second display view may be generated to include the three-dimensional map view 2406 embodied by the geospatially constrained social network 142, the residential space identifier 2426, and a second user profile associated with the at least one residential space identifier 2426 represented at a location in the three-dimensional map view 2406 associated with the specific geographic location associated with the second user profile. The reservation information may be displayed in the first display view. An online reservation and a financial transaction associated with the first residential space identifier 2412A may be generated.

The first residential space identifier 2426 may be associated with at least one type of accommodation associated with the specific geographic location of the first user profile 2404A. A visual representation associated with the accommodation may be generated and the visual representation associated with the first residential space identifier 2426 may be displayed. The unclaimed profile 2408 associated with the first user profile 2404A may be generated. The unclaimed profile 2408 associated with the first user profile 2404A may be displayed. The content 2410 associated with the unclaimed profile 2408 may be generated. The content 2410 associated with the unclaimed profile 2408 may be displayed (e.g., using the display module 2413).

The content 2410 may include at least one review associated with the first residential space identifier 2412A. The geospatially constrained social network 142 may include a second instruction set integrated with the first instruction set to select the first residential space identifier 2412A associated with the first user profile 2404A. A third instruction set integrated with the first instruction set and the second instruction set may display the three-dimensional map view 2406 embodied by the community network, the first user profile 2404A, the first residential space identifier 2412A, and simultaneously represent other user profiles 2404B adjacent to the first user profile 2404A (e.g., may be displayed at a location in the three-dimensional map view 2406 associated with the specific geographic location of the first user profile 2404A) in the three-dimensional map view 2406.

A fourth instruction set may generate the search criteria 2402, to enable a selection of at least one search criterion of the search criteria 2402, and identify and display in the three-dimensional map view 2406 at least one residential space identifier 2426 matching the search criterion of the search criteria 2402. A fifth instruction set may generate a reservation associated with an accommodation and the first residential space identifier 2412A.

Figure 25:
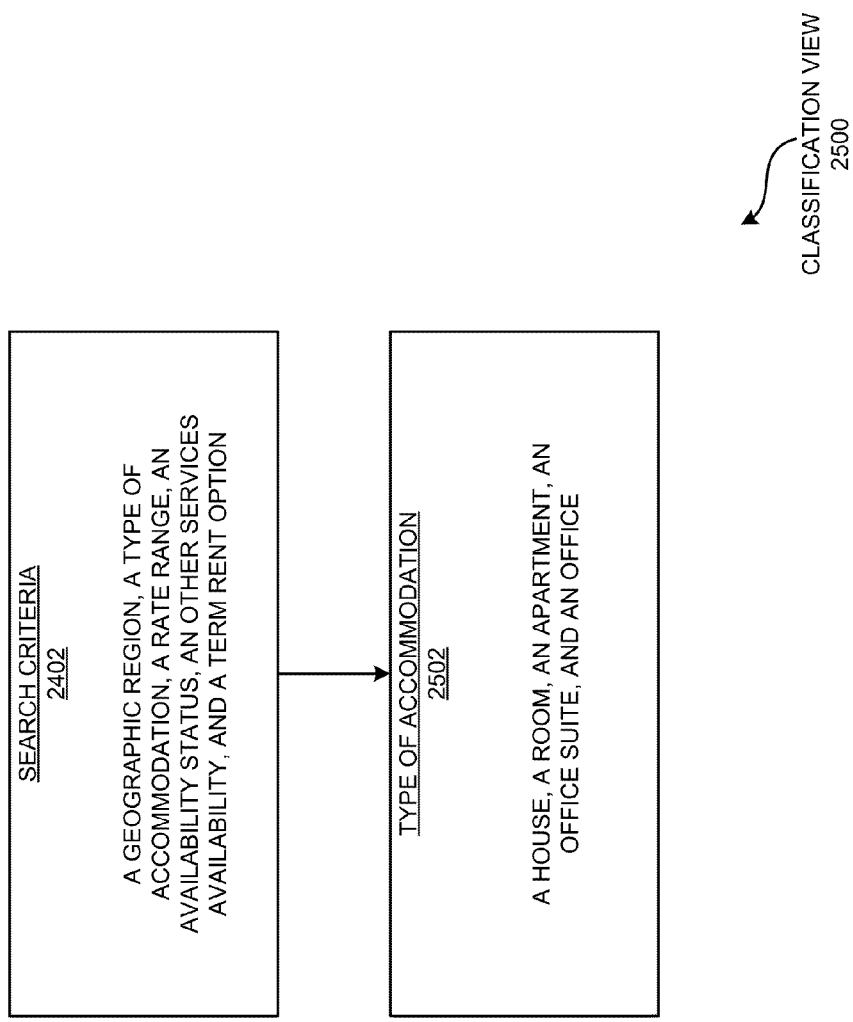
FIG. 25 is a classification view of the search criteria of FIG. 24, according to one embodiment

FIG. 25 is a classification view of the search criteria of FIG. 24, according to one embodiment FIG. 25 is a classification view 2500 of the search criteria 2402 of FIG. 24, according to one embodiment. Particularly, FIG. 25 illustrates the search criteria 2402, and a type of accommodation 2502, according to one embodiment. The type of accommodation 2502 may enable the users (e.g., the renter) to search for an accommodation (e.g., house, room, apartment, office suite, and/or office etc.) through the markup page tool (e.g., using search engines). For example, a user may wish to travel from Palo Alto, Calif. to New York City, N.Y., and desire short-term accommodation facilities upon arrival in New York. The user may search (e.g., using the search engine) for such facilities based on any number of criteria (e.g., a geographic region, a type of accommodation, a rate range, an availability status, another services availability, and/or a term rent option, etc. The user may also select a preferred type of accommodation 2502, based on his/her lodging and/or ambience preferences, as illustrated in FIG. 25.

Figure 26:
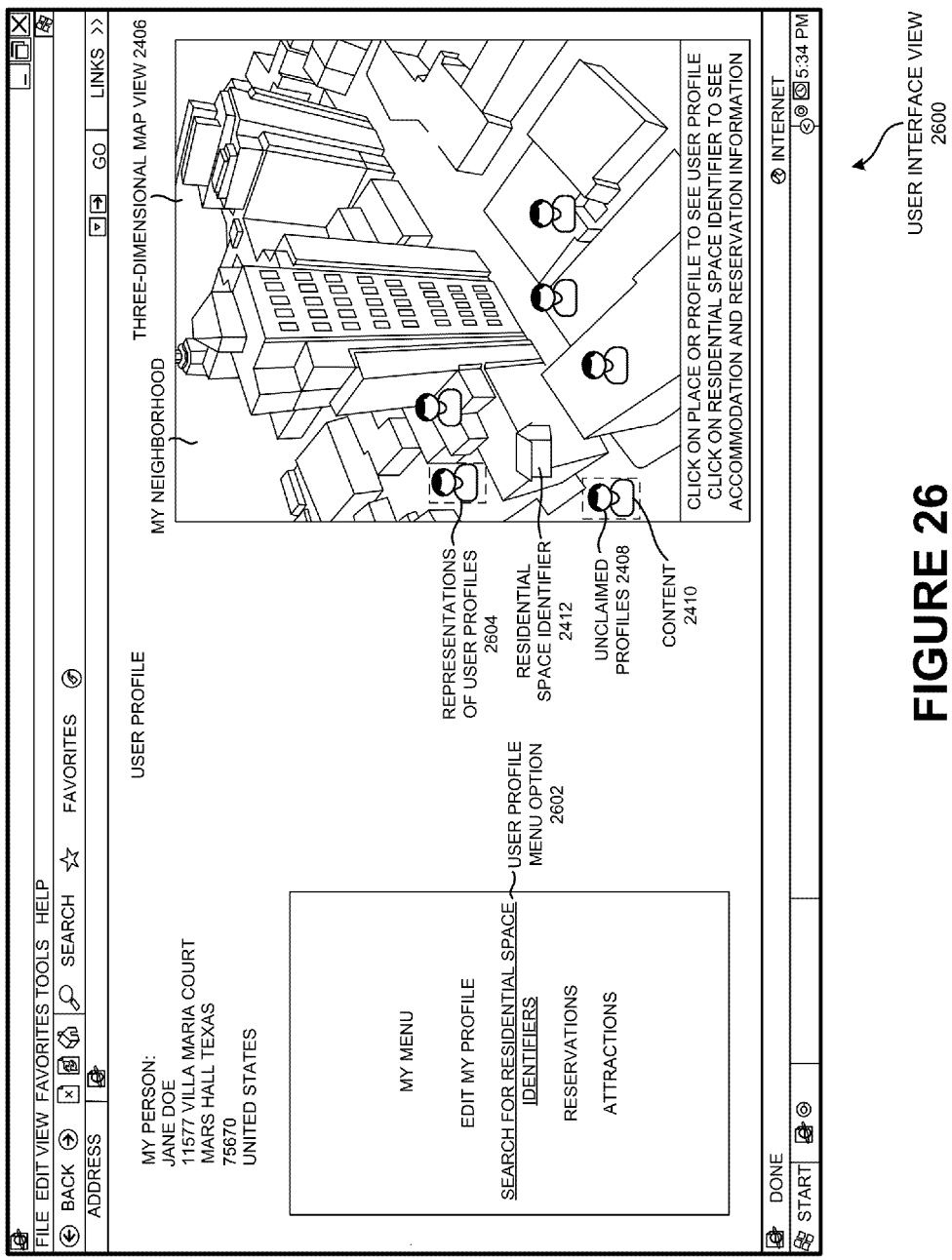
FIG. 26 is a user interface view of a user profile, according to one embodiment.

FIG. 26 is a user interface view of a user profile, according to one embodiment.

FIG. 26 is a user interface view 2600 of a user profile, according to one embodiment. Particularly, FIG. 26 illustrates the residential space identifier 2426, the three-dimensional map view 2406, the unclaimed profiles 2408, the content 2410, and a user profile menu option 2602, according to one embodiment. The user profile menu option 2602 may enable the users (e.g., the renter 107) to view, edit their profiles. The representations of user profiles may display the profiles associated with the users on the three-dimensional map view 2406.

In the example embodiment illustrated in FIG. 26, the user interface view 2600 may enable the users to edit their profiles. For example, Jane Doe having a residential address in United States (e.g., 11577, Villa Maria Court, Cupertino, Calif., 95014) may edit her profile. In addition, Jane Doe may also search for the residential space identifiers 2426 (e.g., by using the search module 1602 of FIG. 23) and/or make reservations for the type of accommodation she is interested in. The user interface view 2600 also displays the residential space identifier 2426, the unclaimed profiles 2408, the content 2410 associated with the unclaimed profiles 2408, the representations of user profiles 2604. In addition, the users may click on links leading to places or wikis to see user profiles and/or click on residential space identifiers link to see accommodation and reservation information.

Figure 27:
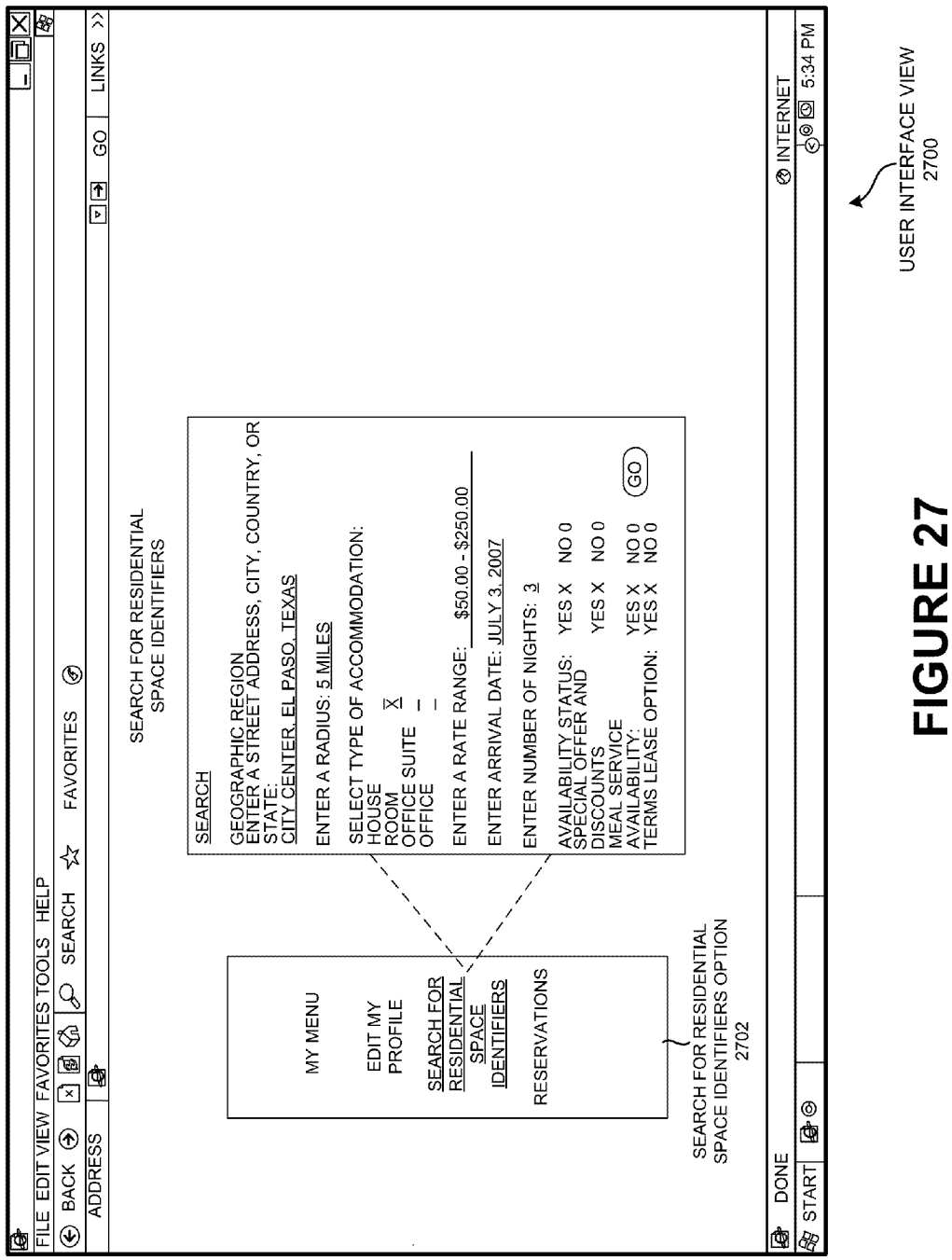
FIG. 27 is a user interface view of searching for residential space identifiers, according to one embodiment.

FIG. 27 is a user interface view of searching for residential space identifiers, according to one embodiment.

FIG. 27 is a user interface view 2700 of searching for residential space identifiers 2412, according to one embodiment. Particularly, FIG. 27 illustrates a search for residential space identifiers option 2702, according to one embodiment. The search for residential space identifiers option 2702 may enable the users (e.g., the renter 107) to search for the residential space identifiers 2426 for reservations in a geographic region.

In the example embodiment illustrated in FIG. 27, the user interface view 2700 may enable the users to edit their profiles and/or search for the residential space identifiers within a threshold radius (e.g., 5 miles around a location) for reservations. For example, Jane Doe may search for the residential space identifiers 2426 in the geographic region by entering street address, city, county and/or state. In addition, Jane Doe may also select the type of accommodation (e.g., house, room, apartment, office suite, and/or office, etc.) by entering a rate range per night (e.g., $50.00-$250.00), arrival date (e.g., Jul. 3, 2007) and number of nights stay (e.g., 3 nights) and/or check for the availability status (e.g., "Yes" if available, "No" if not available), special offer and discounts, and other services availability (e.g., meals, swimming pool, gymnasium, etc.) by clicking on the link "GO". The user interface view 2700 may also enable the users (e.g., Jane Doe) to check for term lease, if applicable to any of the type of accommodations.

Figure 28:
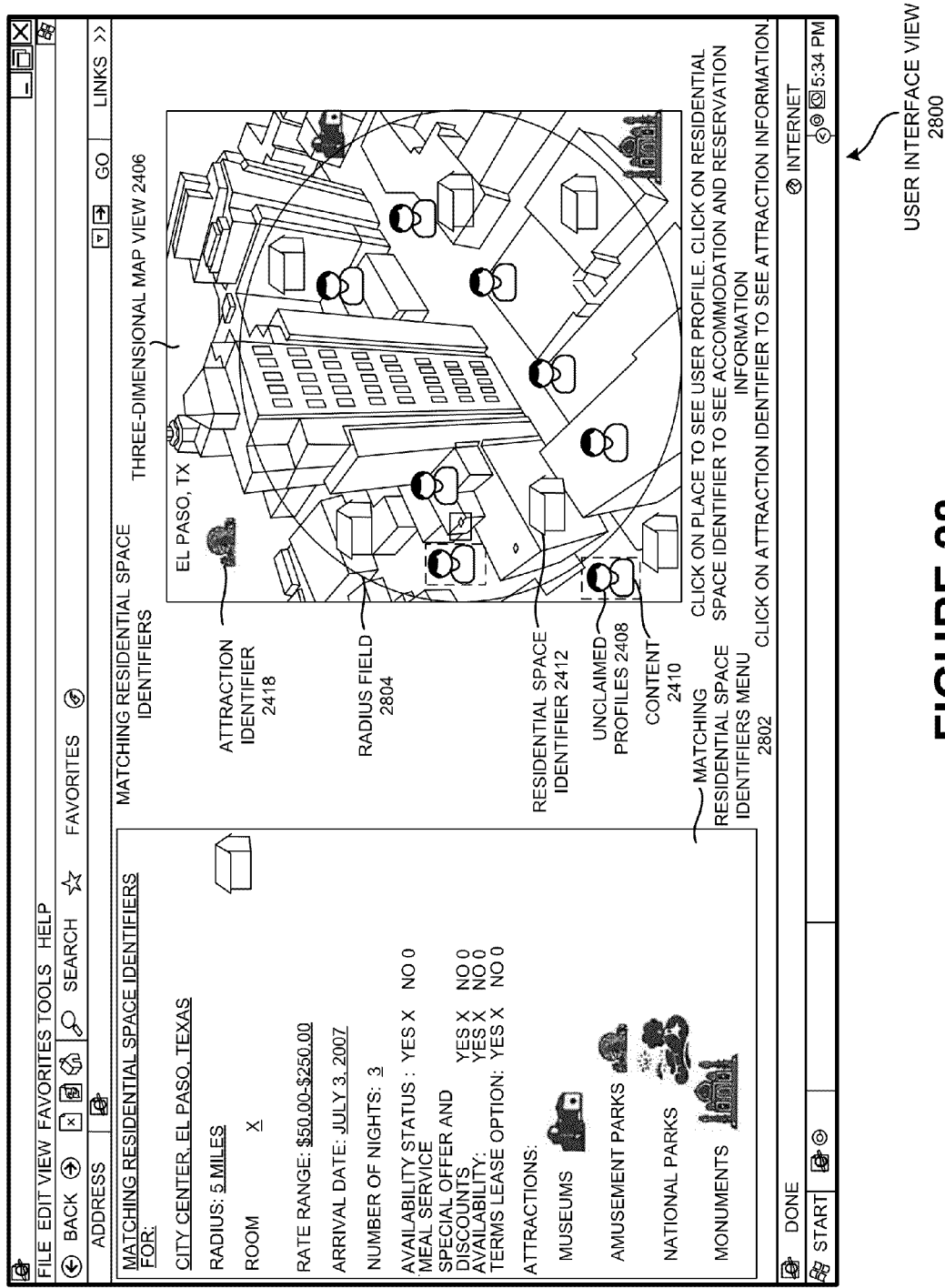
FIG. 28 is a user interface view of matching the residential space identifiers, according to one embodiment.

FIG. 28 is a user interface view of matching the residential space identifiers, according to one embodiment.

FIG. 28 is a user interface view 2800 of matching the residential space identifiers 2412, according to one embodiment. Particularly, FIG. 28 illustrates the residential space identifier 2426, the three-dimensional map view 2406, the unclaimed profiles 2408, the content 2410, the attraction identifier 2418, a matching residential space identifier menu 2802, and a radius field 2804, according to one embodiment. The matching residential space identifier menu 2802 may enable the users to match the residential space identifiers 2426 for a particular geographic region. The radius field 2804 may enable the users to select the residential space identifiers located within a threshold radius away from the user.

In the example embodiment illustrated in FIG. 28, the user interface view 2800 may enable the users (e.g., the renter 107, the host 106) to match residential space identifiers 2426 located within the threshold radius (e.g., 5 miles away from the location). For example, Jane Doe may match for a room (e.g., located at City Center, El Paso, Tex., 5 miles away from the location) based on the rate range per night (e.g., $50.00-$250.00), arrival date (e.g., Jul. 3, 2007) and number of nights stay (e.g., 3 nights) and/or check for the availability status (e.g., "Yes" if available, "No" if not available), special offer and discounts, and other services availability (e.g., meals, swimming pool, gymnasium, etc.).

In addition, Jane Doe may also be interested in the attraction identifiers 2418 (e.g., museums, amusement parks, national parks, and/or monuments, etc.). The user interface view 2800 may enable the users (e.g., Jane Doe) to see attraction information by clicking on the click on attraction identifier link to see attraction information link on the three-dimensional map view 2406.

Figure 29:
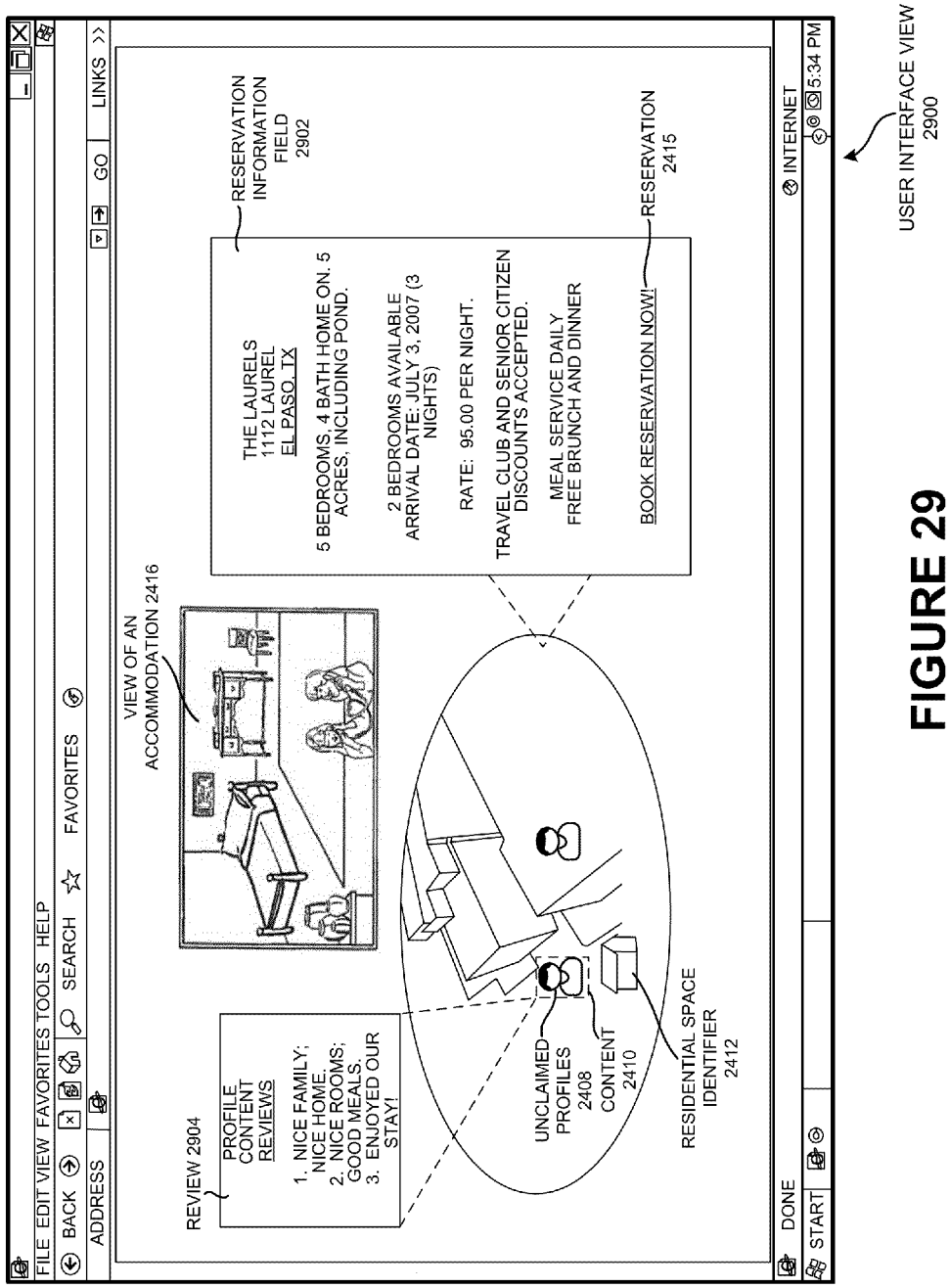
FIG. 29 is a user interface view of booking an online reservation based on the type of accommodations, according to one embodiment.

FIG. 29 is a user interface view of booking an online reservation based on the type of accommodations, according to one embodiment.

FIG. 29 is a user interface view 2900 of booking an online reservation based on the type of accommodations, according to one embodiment. Particularly, FIG. 29 illustrates the residential space identifier 2426, the unclaimed profiles 2408, the content 2410, the view of an accommodation 2416, reservation information field 2902, and a review 2904, according to one embodiment. The reservation information field 2902 may enable the users (e.g., the renter 107) to view the information related to reservation for the type of accommodations. The review 2904 may enable the users to view the wiki profiles contents reviews associated with the user profiles.

In the example embodiment illustrated in FIG. 29, the user interface view 2900 may enable the users to book reservations and/or get reservation information for the accommodation through the book reservation now link. For example, Jane Doe may book a house (e.g., The Laurels, located at 1112, Laurel, El Paso, Tex.). Jane Doe may also book rooms based on their availability (e.g., 2 bedrooms available), and/or rate range (e.g., $95.00 per night). In addition, Jane Doe may also avail discounts on travel club and for senior citizenship and/or free meals and/or dinners services. The user interface view 2900 may also enable the users to view the wiki profile content reviews (e.g., nice family, nice home, nice rooms, good meal, enjoyed our stay, etc.).

Figure 30:
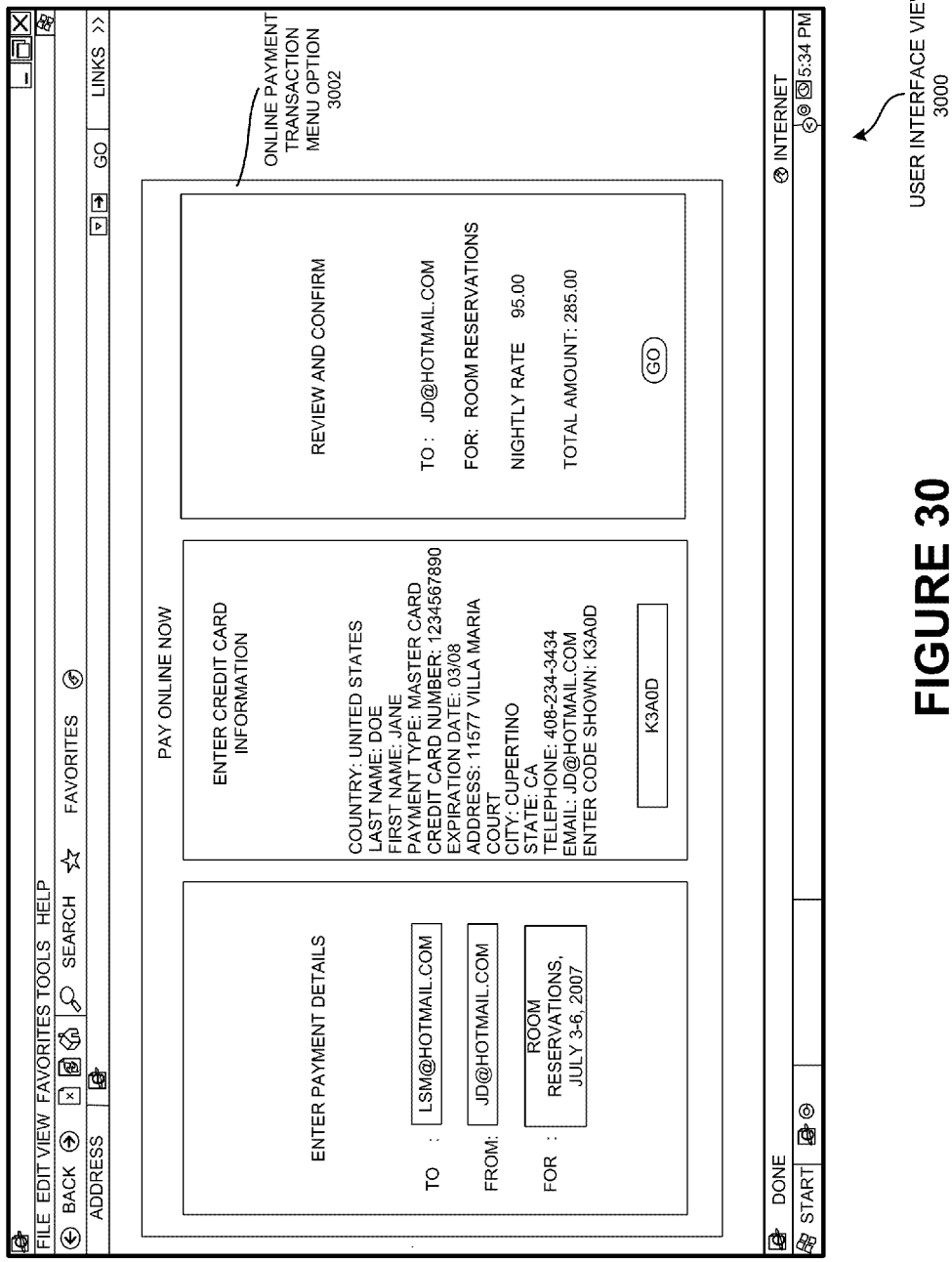
FIG. 30 is a user interface view of making online payment associated with reservations based on the type of accommodations, according to one embodiment.

FIG. 30 is a user interface view of making online payment associated with reservations based on the type of accommodations, according to one embodiment.

FIG. 30 is a user interface view 3000 of making online payments associated with reservations based on the type of accommodations, according to one embodiment. Particularly, FIG. 30 illustrates an online payment transaction menu option 3002, according to one embodiment. The online payment transaction menu option 3002 may enable the users to make online payments related to reservations.

In the example embodiment illustrated in FIG. 30, the user interface view 3000 may enable the users (e.g., the renter 107, the host 106) to enter payment details for the transaction to be made by a user email-ID (e.g., jd@hotmail.com) to provider (e.g., lsm@hotmail.com) for accommodations (e.g., house, room, apartment, office suite, office, etc.). The user interface view 3000 may enable the users to enter credit card information (e.g., Country: United States, Last Name: Doe, First Name: Jane, Payment Type Master Card, Credit Card Number: 1234567890, Expiration Date: March 8, Address: 11577, Villa Maria Court, City: Cupertino, State: CA, Telephone: 408-234-3434, Email: jd@hotmail.com, etc.) related to payment of reservations for accommodations and confirm the details entered by entering a code shown (e.g., "K3AOD)". In addition, the user interface view 3000 may enable the users to preview and confirm the payments made (e.g., nightly rates: $95.00, total amount: $285.00) associated with the reservations for accommodations.

FIG. 31 is a table view of information associated with availability of reservations based on type of accommodations, according to one embodiment.

FIG. 31 is a table view 3100 of information associated with reservations based on type of accommodations, according to one embodiment. Particularly, FIG. 31 illustrates a user profiles field 3102, an accommodations field 3104, a house field 3106, a rooms field 3108, and an online reservations field 3110, according to one embodiment.

The user profiles field 3102 may display the profiles of the users (e.g., the renter 107) associated with the reservations for the accommodations. The accommodations field 3104 may display the status of availability of accommodations for the users. The house field 3106 may display the type of accommodation for the users. The rooms field 3108 may display rooms required for accommodation. The online reservations field 3110 may display the status of online booking done by the users.

In the example embodiment illustrated in FIG. 31, the user profiles field 3102 displays "Kevin John" in the first row, "Jenny Lee" in the second row, and "The Laurels" in the third row of the user profiles field 3102 column. The accommodations field 3104 displays "No" in the first row, "No" in the second row and "Yes" in the third row of the accommodations field 3104 column (e.g., Kevin John and Jenny Lee do not have accommodations while The Laurels provides accommodation). The house field 3106 displays "Yes" in the first row, "Yes" in the second row and "No" in the third row of the house field 3106 column (e.g., Kevin John and Jenny Lee need a house for accommodation and The Laurels does not provide house for rent). The rooms fields 3108 displays "0" for Kevin John in the first row, "0" for Jenny Lee in the second row and "5" for The Laurels in the third row of the rooms field 1108 column (e.g., Kevin John and Jenny Lee do not need rooms for accommodation, while The Laurels have 5 rooms for providing accommodations). The online reservations field 1110 displays "No" in the first row, "No" in the second row and "Yes" in the third row of the online reservations field 3110 column (e.g., Kevin John and Jenny Lee have not made online reservations and The Laurels provides the facility of online reservations for accommodations).

Figure 32:
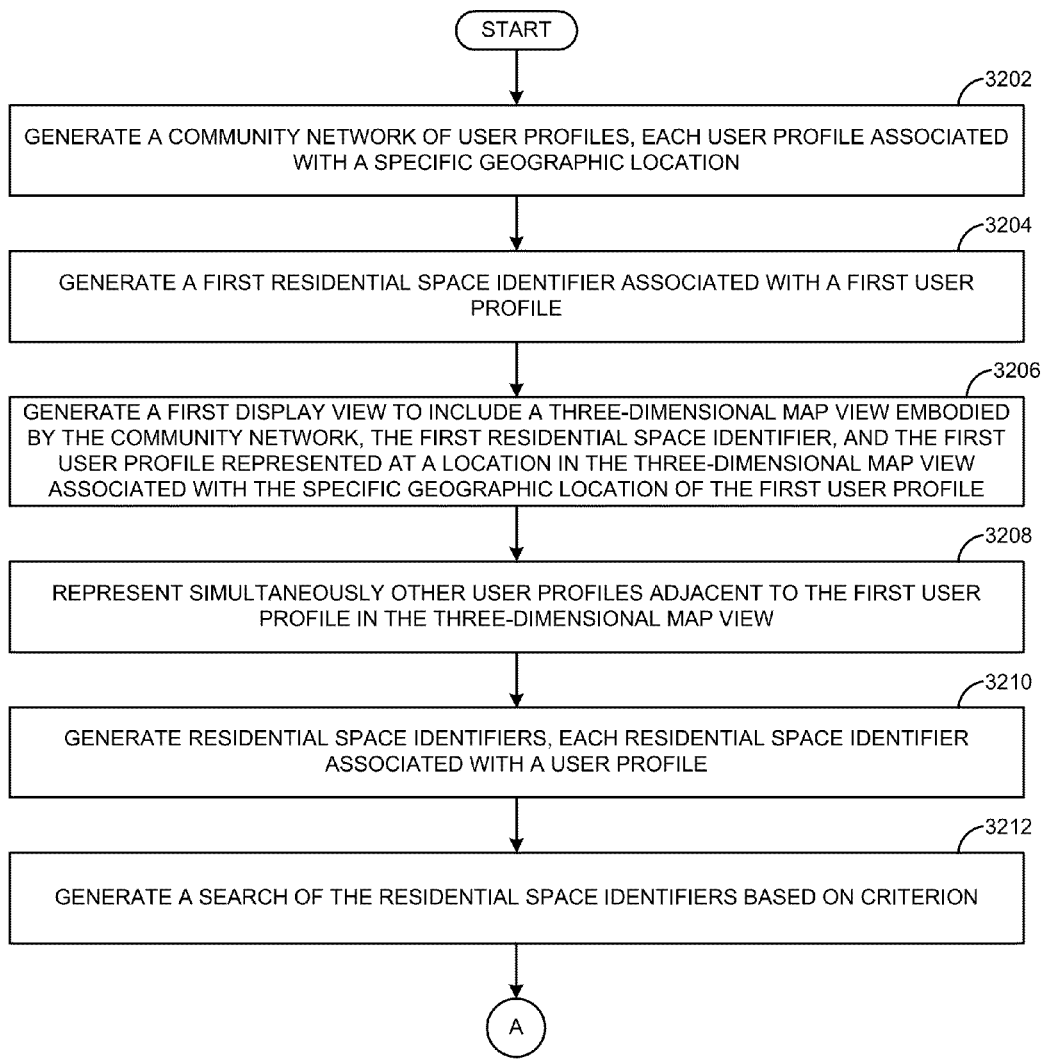
FIG. 32 is a process flow of generating residential space identifiers associated with user profiles in a geo-spatial environment, according to one embodiment.

FIG. 32 is a process flow of generating residential space identifiers associated with user profiles in a geo-spatial environment, according to one embodiment.

FIG. 32 is a process flow of generating residential space identifiers 2412 associated with user profiles in a geo-spatial environment (e.g., the neighborhood 1404), according to one embodiment. In operation 3202, a community network (e.g., the geospatially constrained social network 142) of user profiles (e.g., the host 106, the renter 107) may be generated, each user profile associated with a specific geographic location. In operation 3204, a first residential space identifier (e.g., the first residential space identifier 2412A of FIG. 24) associated with a first user profile (e.g., the first user profile 2404A of FIG. 24) may be generated. In operation 3206, a first display view may be generated to include a three-dimensional map view (e.g., the three-dimensional map view 2406 of FIG. 24) embodied by the geospatially constrained social network 142, the first residential space identifier 2412A, and the first user profile 2404A represented at a location in the three-dimensional map view 2406 associated with the specific geographic location of the first user profile 2404A. In operation 3208, other user profiles (e.g., the other user profiles 2404B of FIG. 24) may be represented simultaneously adjacent to the first user profile 2404A in the three-dimensional map view 2406. In operation 3210, residential space identifiers (e.g., the residential space identifier 2412 of FIG. 24) may be generated, each residential space identifier 2412 associated with the user profile 2404. In operation 3212, a search of the residential space identifiers 212 may be generated (e.g., using the search module 1414 of FIG. 14) based on criterion.

Figure 33:
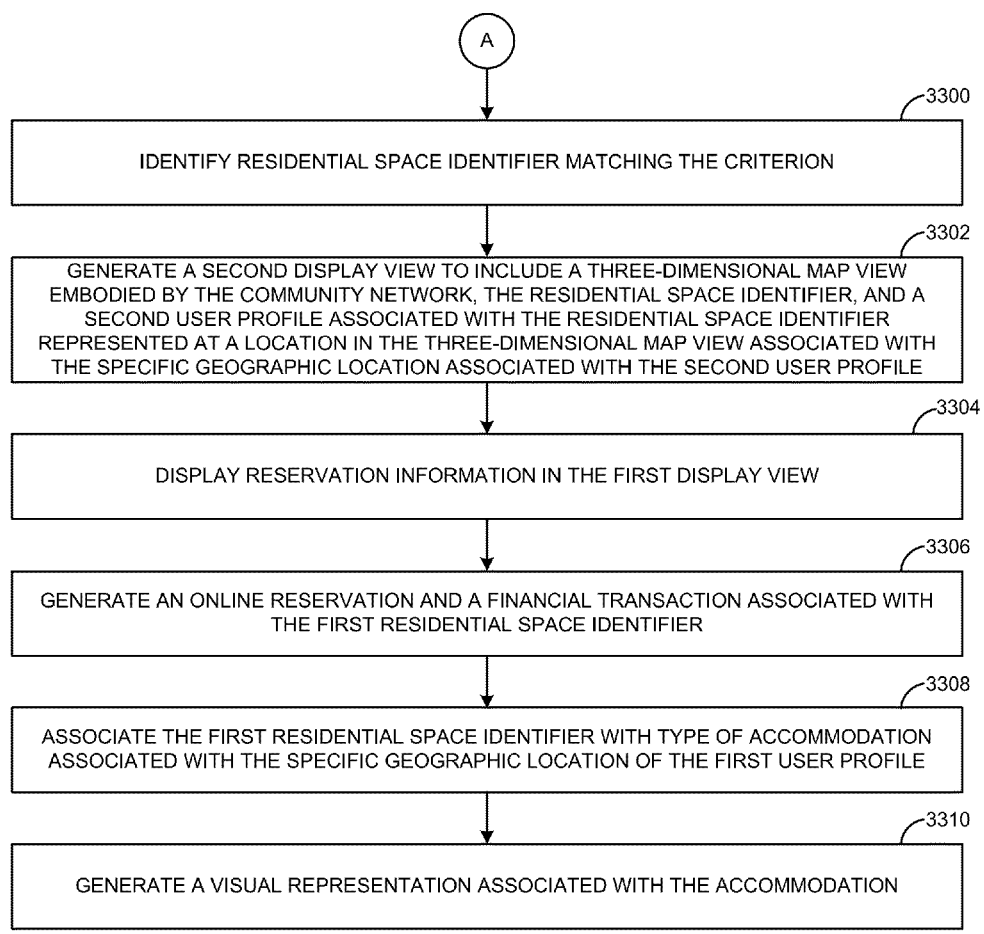
FIG. 33 is a continuation of the process flow of FIG. 32 illustrating additional processes, according to one embodiment.

FIG. 33 is a continuation of the process flow of FIG. 32 illustrating additional processes, according to one embodiment.

FIG. 33 is a continuation of the process flow of FIG. 32 illustrating additional processes, according to one embodiment. In operation 3300, the residential space identifier 2412 matching the criterion may be identified (e.g., using the search criteria 2402 of FIG. 24). In operation 3302, a second display view may be generated to include a three-dimensional map view (e.g., the three-dimensional map view 2406 of FIG. 24) embodied by the geospatially constrained social network 142, the residential space identifier 2412, and a second user profile associated with the residential space identifier 2412 represented at a location in the three-dimensional map view 2406 associated with the specific geographic location associated with the second user profile. In operation 3304, reservation information may be displayed in the first display view. In operation 3306, an online reservation and/or a financial transaction associated with the first residential space identifier 2412 may be generated (e.g., using the reservation module 2304 and the online payment module 2304A of FIG. 23). In operation 3308, the first residential space identifier 2412 may be associated with a type of accommodation associated with the specific geographic location of the first user profile 2404A. In operation 3310, a visual representation associated with the accommodation may be generated (e.g., using the view module 2312 of FIG. 23).

In one embodiment, a method of a short-term listing server 100 comprises validating that a place-to-stay listing data 102 is associated with a verified user (e.g., the host 106 of FIG. 1) of the short-term listing server 100 using a processor 120 and a memory 124, verifying that a set of geospatial coordinates associated with the place-to-stay listing data 102 are trusted based on a claimed geospatial location of the verified user (e.g., the host 106 of FIG. 1) of the short-term listing server 100, determining that a time stamp associated with a creation date and a creation time of the place-to-stay listing data 102 is trusted based the claimed geospatial location of the verified user (e.g., the host 106 of FIG. 1) of the short-term listing server 100, and processing a payment associated with a renter 107 of a space in a private residential home (e.g., the room for rent 1400 and/or the residence 1402 as described in FIG. 14) associated with the place-to-stay listing data 102 through the short-term listing server 100.

The method may automatically publish the place-to-stay listing data 102 on a set of user profiles having associated verified addresses in a threshold radial distance from the set of geospatial coordinates associated with the place-to-stay listing data 102 of the verified user (e.g., the host 106 of FIG. 1) of the short-term listing server 100 using a radial algorithm 240 (e.g., of the radial distribution module 140). Furthermore, the method may process a listing criteria includes a real estate type, a lot size, a square footage, a photograph, a video, a bedroom count, a room size, a description, a cost per month, a rental price, a leasing rate, a number of stories, and/or a location. An availability chart may be populated when a real estate listing associated with the listing criteria may be posted. The availability chart may include a front door key delivery availability timing of the verified user (e.g., the host 106 of FIG. 1), an on-home lockbox access key, and/or an occupancy availability of the real estate listing.

The place-to-stay listing data 102 may be presented as a real estate pushpin of the real estate listing in a geospatial map surrounding pre-populated residential and/or business listings in a surrounding vicinity, such that the real estate pushpin of the real estate listing may be automatically presented on the geospatial map in addition to being presented on the set of user profiles having associated verified addresses in the threshold radial distance from the set of geospatial coordinates associated with the place-to-stay listing data 102 of the verified user (e.g., the host 106 of FIG. 1) of the short-term listing server 100. The place-to-stay listing data 102 may be radially distributed through an on-page posting, an electronic communication, and/or a push notification delivered to desktop and/or mobile devices associated with users and/or their user profiles around an epicenter defined at the set of geospatial coordinates associated with the place-to-stay listing data 102 to all subscribed user profiles in a circular geo-fenced area defined by the threshold distance from the set of geospatial coordinates associated with the place-to-stay listing data 102 through the radial algorithm 240 (e.g., of the radial distribution module 140) of a neighborhood broadcasting system that measures a distance away of each address associated with each user profile from the current geospatial location at the epicenter.

The verified user (e.g., the host 106 of FIG. 1) may be permitted to drag and/or drop the real estate pushpin on any location on the geospatial map, and/or automatically determining a latitude and/or a longitude associated with a placed location. A for-rent view of the real estate may be generated in which the verified user (e.g., the host 106 of FIG. 1) offers the real estate for rent through the short-term listing server 100 to other users in the threshold radial distance from the set of geospatial coordinates associated with the place-to-stay listing data 102 of the verified user (e.g., the host 106 of FIG. 1) of the short-term listing server 100. The geospatial coordinates may be extracted from a metadata associated with the place-to-stay listing data 102 when verifying that the set of geospatial coordinates associated with the place-to-stay listing data 102 are trusted based on the claimed geospatial location of the verified user (e.g., the host 106 of FIG. 1) of the short-term listing server 100.

A relative match between a persistent clock associated with the short-term listing server 100 and/or a digital clock of a data processing system may be used to determine that the time stamp associated with the creation date and/or time of the place-to-stay listing data 102 may be accurate and/or therefore trusted. A publishing of the place-to-stay listing data 102 may be automatically deleted on a set of user profiles having associated verified addresses in the threshold radial distance from the set of geospatial coordinates associated with the place-to-stay listing data 102 of the verified user (e.g., the host 106 of FIG. 1) of the short-term listing server 100 based on a listing expiration time. A set of residential addresses each associated with a resident name in a neighborhood surrounding the data processing system may be geocoded. The set of residential addresses each associated with the resident name as the set of user profiles in the threshold radial distance from the claimed geo spatial location of the verified user (e.g., the host 106 of FIG. 1) of the short-term listing server 100 in a neighborhood curation system communicatively coupled with the short-term listing server 100 may be prepopulated.

The method may permit the verified user (e.g., the host 106 of FIG. 1) to submit reviews in each of the set of user profiles. In addition, the method may track the submitted reviews through the rental listing system (e.g., the short-term listing network 150 of FIG. 1) and/or generate a reversible history journal associated with each of the set of user profiles such that a reviews of the verified user (e.g., the host 106 of FIG. 1) can be undone on a modified user profile page. A reviewing credibility of the verified user (e.g., the host 106 of FIG. 1) may be determined based on an review history of the verified user (e.g., the host 106 of FIG. 1) and/or a community contribution validation of the verified user (e.g., the host 106 of FIG. 1) by other users of the rental listing system (e.g., the short-term listing network 150 of FIG. 1). In addition, the place-to-stay listing data 102 to a set of user profiles having associated verified addresses in a threshold radial distance from the claimed geospatial location of the verified user (e.g., the host 106 of FIG. 1) of the short-term listing server 100 may be automatically published using the radial algorithm 240 (e.g., of the radial distribution module 140).

A claim request of the verified user (e.g., the host 106 of FIG. 1) generating the place-to-stay listing data 102 may be processed through the data processing system to be associated with an address of the rental listing system (e.g., the short-term listing network 150 of FIG. 1). It may be determined if the claimable neighborhood in the rental listing system (e.g., the short-term listing network 150 of FIG. 1) may be associated with a private neighborhood community in the claimable neighborhood of the rental listing system (e.g., the short-term listing network 150 of FIG. 1). The verified user (e.g., the host 106 of FIG. 1) may be associated with the private neighborhood community in the claimable neighborhood of the rental listing system (e.g., the short-term listing network 150 of FIG. 1) if the private neighborhood community has been activated by the verified user (e.g., the host 106 of FIG. 1) and/or a different verified user (e.g., the host 106 of FIG. 1). The verified user (e.g., the host 106 of FIG. 1) may be permitted to draw a set of boundary lines in a form of a geospatial polygon such that the claimable neighborhood in a geospatial region surrounding the claim request creates the private neighborhood community in the rental listing system (e.g., the short-term listing network 150 of FIG. 1) if the private neighborhood community may be inactive.

The claim request of the verified user (e.g., the host 106 of FIG. 1) generating the place-to-stay listing data 102 may be verified through the data processing system to be associated with a neighborhood address of the rental listing system (e.g., the short-term listing network 150 of FIG. 1) when the address may be determined to be associated with a work address and/or a residential address of the verified user (e.g., the host 106 of FIG. 1). The place-to-stay listing data 102 may be simultaneously published on the private neighborhood community associated with the verified user (e.g., the host 106 of FIG. 1) generating the place-to-stay listing data 102 through the data processing system in the threshold radial distance from the address associated with the claim request of the verified user (e.g., the host 106 of FIG. 1) of the rental listing system (e.g., the short-term listing network 150 of FIG. 1) when automatically publishing the place-to-stay listing data 102 on a set of user profiles having associated verified addresses in a threshold radial distance from the claimed geospatial location of the verified user (e.g., the host 106 of FIG. 1) of the short-term listing server 100 based on a set of preferences of the verified user (e.g., the host 106 of FIG. 1) using the radial algorithm 240 (e.g., of the radial distribution module 140).

A summary data may be provided to the verified user (e.g., the host 106 of FIG. 1) generating the place-to-stay listing data 102 through the data processing system of how many user profile pages were updated with an alert of the place-to-stay listing data 102 when publishing the place-to-stay listing data 102 in the private neighborhood community and/or the set of user profiles having associated verified addresses in the threshold radial distance from the claimed geospatial location of the verified user (e.g., the host 106 of FIG. 1) of the short-term listing server 100 based on the set of preferences of the verified user (e.g., the host 106 of FIG. 1).

The place-to-stay listing data 102 may be live broadcasted to the different verified user (e.g., the host 106 of FIG. 1) and/or other verified users in the private neighborhood community and/or currently within the threshold radial distance from the current geospatial location through the short-term listing server 100 using a multicast algorithm such that a live broadcast multicasts to a plurality of data processing systems associated with each of the different user and/or the other verified users simultaneously when the data processing system of the verified user (e.g., the host 106 of FIG. 1) generating the live-broadcast enables broadcasting of the place-to-stay listing data 102 to any one of a geospatial vicinity around the data processing system of the verified user (e.g., the host 106 of FIG. 1) generating the broadcast and/or in any private neighborhood community in which the verified user (e.g., the host 106 of FIG. 1) has a non-transitory connection. The different verified user (e.g., the host 106 of FIG. 1) and/or other verified users in the private neighborhood community may be permitted to bi-directionally communicate with the verified user (e.g., the host 106 of FIG. 1) generating the broadcast through the short-term listing server 100.

Any private neighborhood community in which the verified user (e.g., the host 106 of FIG. 1) has the non-transitory connection may be a residential address of the verified user (e.g., the host 106 of FIG. 1) and/or a work address of the verified user (e.g., the host 106 of FIG. 1) that has been confirmed by the short-term listing server 100 as being associated with the verified user (e.g., the host 106 of FIG. 1). The threshold distance may be between 0.2 and/or 0.4 miles from the set of geospatial coordinates associated with the place-to-stay listing data 102 to optimize a relevancy of the live-broadcast.

The short-term listing server 100 may include a crowd-sourced moderation algorithm in which multiple neighbors to a geospatial area determine what content contributed to the short-term listing server 100 persists and/or which may be deleted. The short-term listing server 100 may permit users to mute messages of specific verified user (e.g., the host 106 of FIG. 1) s to prevent misuse of the short-term listing server 100. The real-estate listing server may permit the place-to-stay listing data 102 to be disseminated to adjacent neighborhoods that have been claimed by different users in a manner such that the place-to-stay listing data 102 may be optionally disseminated to the surrounding claimed neighborhoods based on a preference of the verified user (e.g., the host 106 of FIG. 1). A claimed neighborhood of the verified user (e.g., the host 106 of FIG. 1) may be activated based on a minimum number of other verified users in the threshold radial distance that have been verified through a primary residential address associated with each of the other verified users through a post card verification, a utility bill verification, a privately-published access code, and/or a neighbor vouching method. Access to the place-to-stay listing data 102 may be restricted to the claimed neighborhood of the verified user (e.g., the host 106 of FIG. 1). Access to the place-to-stay listing data 102 may be denied to users having verified addresses outside the claimed neighborhood of the verified user (e.g., the host 106 of FIG. 1).

In another embodiment, a method of a short-term listing server 100 comprises verifying that an address is associated with a residential-property rentable by a host 106, permitting the host 106 to list at least one room in the residential-property on an online rental listing system (e.g., the short-term listing network 150 of FIG. 1), booking the at least one room in the residential-property of the online rental listing system (e.g., the short-term listing network 150 of FIG. 1) based on a request of a renter 107, processing a payment of the renter 107 for the at least one room in the residential-property, permitting the host 106 and the renter 107 to rate and review each other through the online rental listing system (e.g., the short-term listing network 150 of FIG. 1), and creating a group associated with host 106s and renter 107s sharing common interests and previous stays in the at least one room in the residential-property.

In yet another embodiment, a system comprises a short-term listing server 100 to (1) validate that a place-to-stay listing data 102 may be associated with a verified user (e.g., the host 106 of FIG. 1) of the short-term listing server 100 using a processor 120 and/or a memory 124, and (2) verify that a set of geospatial coordinates associated with the place-to-stay listing data 102 are trusted based on a claimed geospatial location of the verified user (e.g., the host 106 of FIG. 1) of the short-term listing server 100. This embodiment also includes a network and a client side device (e.g., the device 104). The client device (e.g., the device 104) is communicatively coupled with the short-term listing server 100 through the network to provide a payment associated with a renter 107 of a space in a private residential home (e.g., the room for rent 1400 and/or the residence 1402 as described in FIG. 14) associated with the place-to-stay listing data 102 through the short-term listing server 100.

Embodiments described herein in FIGS. 1-33 govern a new kind of social network for neighborhoods, according to one embodiment (e.g., may be private and/or wiki-editable search engine based). It should be noted that in some embodiments, the address of an user may be masked from the public search (but still may be used for privacy considerations), according to one embodiment. Some embodiments have no preseeded data, whereas others might. Embodiments described herein may present rich, location specific information on individual residents and businesses.

A user can "Claim" one or more Business Pages and/or a Residential Pages, according to one embodiment. In order to secure their Claim, the user may verify their location associated with the Business Page and/or Residential page within 30 days, or the page becomes released to the community, according to one embodiment. A user can only have a maximum of 3 unverified Claims out at any given time, according to one embodiment. When a user clicks on "Claim this Page" on Business Profile page and/or a Residential Profile page, they can indicate the manner in which they intend to verify their claim, according to one embodiment. Benefits of Claiming a Business Page and/or Residential page may enable the user to mark their page 'Self-Editable only' from the default 'Fully Editable' status, and see "Private" listings in a claimed neighborhood around the verified location, according to one embodiment. Each edit by a user on a Residential Profile page and/or a Business Profile page may be made visible on the profile page, along with a date stamp, according to one embodiment.

Browse function: Based on the user's current location, the browse function may display a local map populated with pushpins for location-specific information, and a news feed, made up of business page edits, public people page edits, any recent broadcasts, etc., according to one embodiment. The news feed may show up on each Business Page and each Residential Page, based on activity in the surrounding area, according to one embodiment. Secure a Neighborhood function: May allow the user to identify and "secure" a neighborhood, restricting certain types of access to verified residents, according to one embodiment. Add a Pushpin function: May allow any registered or verified user to add any type of Pushpin (as described in FIG. 8), according to one embodiment.

In addition to the map, the search results page may display a news feed, made up of business page edits, public people page edits, any recent broadcasts, and auto generated alerts who has moved into the neighborhood, who has moved out of the neighborhood, any recent reviews in the neighborhood, any pushpins placed in the immediate area, etc., according to one embodiment. The news feed may prioritize entries relating to the search results, and will take into account privacy policies and preferences, according to one embodiment.

Example Newsfeeds may include:

Joe Smith moved into the neighborhood in September 2013. Welcome Joe! Like Share; 43 neighbors (hyperlink) moved in to the Cupertino library neighborhood in July 2013. Like Share; 12 neighbors (hyperlink) verified in to the Cupertino library neighborhood in July 2013 Like Share; Raj Abhyanker invited Paul Smith, a guest to the Cupertino neighborhood. Raj indicates Paul is a friend from college looking to move into the neighborhood. Welcome Paul!; Joe Harrison posted a spare bedroom for rent for $35 a day, in mountain view Rent now Like Share This content may feed each Profile Page and helps to increase Search Engine value for content on the site, according to one embodiment. Alerts may be created and curated (prioritized, filtered) automatically and/or through crowd-sourcing, to keep each page vibrant and actively updating on a regular basis (ideally once a day or more), according to one embodiment.

A Multi-Family Residence page will display a list of residents in the entire building, according to one embodiment. Clicking on any resident will display a Single Family Residence page corresponding to the individual living unit where that person resides, according to one embodiment.

For example, suppose that John Smith and Jane Smith live in apartment 12 of a large building. Their names are included in the list of residents. When a user clicks on either John Smith or Jane Smith, we will display a "Single Family Residence" page showing both John and Jane, just as if apartment 12 was a separate structure, according to one embodiment.

The broadcast feature (e.g., associated with the place-to-stay listing data 102 and generated by the radial algorithm 240 of the radial distribution module 140) may be a "Radio" like function that uses the device 104's current geospatial location to send out information to neighbors around the present geospatial location of the user 106, according to one embodiment. Broadcasts may be posted to neighbor pages in the geospatial vicinity (e.g., in the same neighborhood) on public and private pages in the geospatial social network, according to one embodiment. These broadcasts may enable any user, whether they live in a neighborhood or not to communicate their thoughts to those that live or work (or have claimed) a profile in the neighborhood around where the broadcaster is physically at, regardless of where the broadcaster lives, according to one embodiment. Broadcasts can be audio, video, pictures, and or text, according to one embodiment. For accountability, the broadcaster may be a verified user and their identity made public to all users who receive the broadcast in one embodiment.

This means that the broadcast feature may be restricted to be used only by devices (E.g. mobile phones) that have a GPS chip (or other geolocation device) that an identify a present location of where the broadcast is originating from, according to one embodiment. The broadcast may be sent to all users who have claimed a profile in the geospatial vicinity where the broadcast originates, according to one embodiment. This can either be broadcast live to whoever is "tuned" in to a broadcast of video, audio, picture, and text in their neighborhood, or can be posted on each users profile if they do not hear the broadcast to the neighborhood in a live mode in one embodiment.

When a broadcast is made neighbors, around where the broadcast is made, they may receive a message that says something like:

Raj Abhyanker, a user in Menlo Park just broadcast "Japanese cultural program" video from the Cupertino Union church just now. Watch, Listen, View This broadcast may be shared with neighbors around Menlo park, and or in Cupertino. This way, Raj's neighbors and those in Cupertino can know what is happening in their neighborhoods, according to one embodiment. In one embodiment, the broadcast only goes to one area (Cupertino or Menlo park in the example above).

Broadcasts could be constrained to devices that have geospatial accuracy of present location and a current only (mobile devices for example). Otherwise, broadcasts won't mean much, according to one embodiment (would otherwise be just like thoughts/video upload without this). Broadcasts shouldn't be confused with 'upload videos', according to one embodiment. Different concepts. Why? Broadcasts have an accuracy of time and location that cannot be altered by a user, according to one embodiment. Hence, mobile is the most likely medium for this not desktop computer, according to one embodiment. We should not let the user set their own location for broadcasts (like other pushpin types), according to one embodiment. Also time is fixed, according to one embodiment. Fixing and not making these two variables editable give users confidence that the broadcast was associated with a particular time and place, and creates a very unique feature, according to one embodiment. For example, it would be not useful if the broadcast is untrusted as to location of origination, according to one embodiment. E.g., I broadcast when I am somewhere only about the location I am at, according to one embodiment.

Broadcasts are different that other pushpins because location of where a broadcast, and time of broadcast is

*current location* and *current time*, according to one embodiment. They are initiated wherever a broadcaster is presently at, and added to the news feed in the broadcasters neighborhood and in the area wherever a broadcaster is presently at, according to one embodiment.

Broadcast rules may include:

1. If I post a Broadcast in my secured neighborhood, only my neighbors can see it, according to one embodiment.

2. If I post a Broadcast in different secured neighborhood then my own, my neighbors can see it (e.g., unless I turn this off in my privacy setting) and neighbors in the secured neighborhood can see it (e.g., default not turn-offable, but I can delete my broadcast), according to one embodiment.

3. If I post a Broadcast in different unsecured neighborhood then my own, my neighbors can see it (unless I turn this off in my privacy setting) and the broadcast is publicly visible on user pages of public user profiles in the unsecured neighborhood until profiles are claimed and/or the neighborhood is secured, according to one embodiment.

4. If an outsider in a secure neighborhood posts a broadcast in my secure neighborhood, it's not public, according to one embodiment.

5. If an outsider in a unsecure neighborhood posts a broadcast in my secure neighborhood, the system does not post on profiles in his unsecure neighborhood (to prevent stalking, burglary), but does post in my secure neighborhood, according to one embodiment.

Privacy settings. For each verified residential or business location, the user may set Privacy to Default, Public, Private, or Inactive, according to one embodiment. The Default setting (which is the default) means that the profile will be public, until the neighborhood is secured; in a secured neighborhood, the profile will be Private, according to one embodiment. By changing this setting, the user may force the profile to be Public or Private, regardless of whether the neighborhood is secured, according to one embodiment. For each verified residential location, the user may set edit access to Group Editable or Self Editable, according to one embodiment.

Residential Privacy example. The residential profiles can be: Public: anyone can search, browse, or view the user profile, according to one embodiment. This is the default setting for unsecured neighborhoods (initially, all the content on the site), according to one embodiment. Private: only people in my neighborhood can search, browse, or view the user's profile, according to one embodiment. This is the default for secured neighborhoods, according to one embodiment. Inactive: nobody can search, browse, or view the profile, even within a secured neighborhood, according to one embodiment. A user may have at least one active (public or private), verified profile in order to have edit capabilities, according to one embodiment; if the user makes all profiles inactive, that user is treated (for edit purposes) as an unverified user, according to one embodiment.

Verified users can edit the privacy setting for their profile and override the default, according to one embodiment. Group Editable: anyone with access to a profile based on the privacy roles above can edit the profile, according to one embodiment. This is the default setting, according to one embodiment Self Editable, only the verified owner of a profile can edit that profile, according to one embodiment.

Exceptions Guest User. A verified user in another neighborhood is given "Guest" access to a neighborhood for a maximum of 60 days by a verified user in the neighborhood in which the guest access is given, according to one embodiment. In effect, the guest becomes a member of the neighborhood for a limited period, according to one embodiment. Friend. When a user has self-elected being friends with someone in a different neighborhood, they can view each other's profiles only (not their neighbors), according to one embodiment. One way for a user to verify a location is to submit a scanned utility bill, according to one embodiment.

When a moderator selects the Verify Utility Bills function, the screen will display a list of items for processing, according to one embodiment. Accept the utility bill as a means of verification, according to one embodiment. This will verify the user's location, and will also generate an e-mail to the user, according to one embodiment. Or Decline the utility bill as a means of verification, according to one embodiment. There will be a drop-down list to allow the moderator to select a reason, according to one embodiment; this reason will be included in an e-mail message to the user. Reasons may include: Name does not match, address does not match, name/address can't be read, not a valid utility bill, according to one embodiment.

An example embodiment will now be described. An entity (e.g., a person, an organization, a non-profit institution, a home owner, a tenant, a manager) may post a real estate listing (e.g., a house for rent, a room for rent, an office for rent) on a geospatially constrained social network (e.g., Fatdoor.com, Nextdoor.com). The entity may receive communications (e.g., offers, inquiries, leads, etc.) from potentially interested parties responding to the real estate listing based on a place-to-stay listing data 102 that they broadcast (e.g., post using the radial algorithm 240) using a desktop computer at their work address and/or through their mobile device. The entity may be able to review offers for the real estate (e.g., to rent, to lease, etc.) from potentially interested parties who send communications from a geospatial vicinity of where the entity is listing the real estate. Communications may be received from active and passive parties who may be ideally suited for the real estate listing because they live or work close by and wish to continue to do so.

In some cases, a person may already have an apartment, house, or office space and may receive the place-to-stay listing data 102 through their mobile device (e.g., even when their mobile device is physically at a different location than a location in which they live). The person may be become aware of the real estate listing as a result of their participation through the geospatially constrained social network 142 having the short-term listing server 100. Therefore, the person may discover a real estate opportunity when the real estate listing is in a location geographically proximate to an address where the preferred candidate has a non-transitory association (e.g., an existing home address, an existing work address).

Sometimes, the person may wish to pursue the real estate opportunity despite having an apartment, house, or office space when the real estate listing is presented to them because of geospatial proximity of the real estate listing to the non-transitory location(s) associated with the person. Because the person may be presented with the real estate listing through the embodiments of described in FIGS. 1-11 using the radial algorithm 240 of the radial distribution module 140 of the short-term listing server 100, the entity listing the real estate may have a chance to offer and/or complete a real estate transaction (e.g., to rent, sell, lease, etc. the real estate) with the person. Therefore, entity listing the real estate may save time in completing the real estate transaction and may ultimately receive a better price for the real estate due to the avoidance of fees and expenses (e.g., to real estate brokers) and due to the improved price that may be obtained from a person who is very satisfied with the real estate being acquired (e.g., a person who lives close by and already likes the neighborhood).

For example, an employer Bob Jones may post a real estate listing for a home for rent in the Potrero Hill neighborhood on Nextdoor.com (or Fatdoor.com). Bob Jones may receive applications from people responding to the real estate listing based on a place-to-stay listing data 102 that they broadcast (e.g., post using the radial algorithm 240) using a desktop computer at their work address and/or through their mobile device. Bob Jones may be able to communicate with people who send messages from Potrero Hill and/or from the adjacent SOMA neighborhood of San Francisco, both nearby areas of where the Bob Jones's real estate is located. Offers may be received from active real estate seekers living in the Potrero Hill (and/or SOMA) neighborhood and passive real estate seekers who currently have a house, apartment, or office but may be ideally suited for the real estate listing because they live close by and are open to real estate opportunities.

In some cases, a potential renter of an office space, Jane Smith, a resident of Potrero Hill, may receive the place-to-stay listing data 102 through her mobile device (e.g., even when Jane and her mobile device is physically at work across town in the North Beach area of San Francisco). Jane may hate the commute each day through the traffic of the city, and may be open to working closer to her home given the difficulty in getting to work. Jane may be become aware of an opportunity to rent a room as an office in Bob Jones's building as a result of her participation through the geographically constrained social network Nextdoor.com or Fatdoor.com. Therefore, Jane may discover an option to rent an office in Bob's building (or any other offices for rent around her home) when they are broadcast from a location geographically proximate to an address to her home in Potrero Hill.

Because Jane may be presented with the real estate listing through the embodiments of described in FIGS. 1-11, Bob may have a chance to sell or rent his real estate to Jane even though she already had an office where she worked. Therefore, Bob may save time and money in listing the real estate by successfully attracting an optimal renter (e.g., a candidate who lives close by and wishes to continue to do so).

Bob and Jane may live in the Lorelei neighborhood of Menlo Park, and for this reason receive the place-to-stay listing data. If Bob creates an emergency broadcast, Bob may choose to restrict dissemination of his emergency broadcast just to the Lorelei neighborhood because it is an 'active' neighborhood around where Bob lives. Particularly, a minimum number of Bob's neighbors in the Lorelei neighborhood, such as 10 neighbors in the Lorelei neighborhood, may have signed up and verified their profiles through an online neighborhood social network (e.g., Fatdoor.com). If Bob is the first user that creates a private network for his neighborhood (e.g., a 'founding member'), he may need to draw geospatial boundaries and/or claim geospatial boundaries around his neighborhood and invite a threshold number of neighbors (e.g., 10 neighbors) to activate it. An amount of time for Bob to invite and activate his neighborhood may be limited (e.g., 21 days). However, Bob may request an extension of time from the geospatially constrained social network 142 if Bob needs more time to invite users, and the geospatially constrained social network 142 may grant this extra time. In other words, if Bob is a founding member, he may have the ability to define the neighborhood boundary and choose the neighborhood name.

The geo-spatially constrained social network 142 may internally make corrections to either the boundaries or name that Bob set based on feedback from other neighbors and/or based on internal policies. These internal policies may include a preference for a use of official names for a community (e.g., based on local thoroughfares, a nearby park, or landmark for inspiration), a neighborhood name that is short and sweet (e.g., eliminating unnecessary words like city, state, neighbors, neighborhood, HOA, friends, etc.), with correct capitalization (e.g., to ensure that a first letter of each word is capitalized), and/or use of spaces between each word in a neighborhood name. In one embodiment, Bob may designate neighborhood 'leads' who can adjust boundaries of their neighborhood through an adjust boundaries tool. Bob may be part of an elite group of neighborhood 'leads' who keep the geospatially constrained social network 142 operating smoothly by organizing information and posting neighborhood-wide information. The neighborhood leads like Bob may have special privileges such as removing inappropriate messages, adjusting neighborhood boundaries, verifying unverified members, editing the about section on a neighborhood feed, and/or promoting other members to become neighborhood leads.

Bob and his neighbors may have each verified their addresses through a postcard verification system in which they received a postcard at their home with an access code that permits each of them to access their private Lorelei neighborhood community information including emergency broadcast alerts in the online neighborhood social network (e.g., the Fatmail postcard system through which an access code may have been received at a respective Lorelei home that uniquely identifies and verifies a home in the Lorelei neighborhood). Bob may have invited a threshold number (e.g., 10) of his Lorelei neighbors prior to the Lorelei neighborhood becoming active. Bob may choose to disseminate his place-to-stay listing data to a neighborhood adjacent to Lorelei, such as Menlo Park downtown (e.g., using the radial algorithm 240 of the radial distribution module 140). Optionally, Bob may choose to restrict his place-to-stay listing data just to Lorelei neighbors (e.g., using the radial algorithm 240 of the radial distribution module 140). In other words, users of the neighborhood social network in an entirely different neighborhood, such as the Financial District neighborhood of San Francisco (about 20 miles away) may not be able to access the place-to-stay listing data that Bob generates.

For example, the place-to-stay listing data may be disseminated to adjacent neighborhoods that have been claimed by different users in a manner such that the place-to-stay listing data is optionally disseminated to the surrounding claimed neighborhoods based on Bob's preference.

It will be understood with those skill in the art that in some embodiments, the radial distribution module 140 may restrict dissemination of broadcast data by verified users to claimed neighborhoods in a private neighborhood social network (e.g. the geospatially constrained social network 142 may be a private social network, the neighborhood curation system described herein may also be part of the private neighborhood social network) in which the broadcaster resides (e.g., has a home) using the radial algorithm 140. The geo-spatially constrained social network 142 may include online communities designed to easily create private websites to facilitate communication among neighbors and build stronger neighborhoods (e.g., to help neighbors build stronger and safer neighborhoods).

Further, it follows that the threshold radial distance 119 may take on a variety of shapes other than purely circular and is defined to encompass a variety of shapes based on associated geographic, historical, political and/or cultural connotations of associated boundaries of neighborhoods and/or as defined by a city, municipality, government, and/or data provider (e.g., Maponics®, Urban Mapping®), in one embodiment. For example, the threshold radial distance 119 may be based on a particular context, such as a school boundary, a neighborhood boundary, a college campus boundary, a subdivision boundary, a parcel boundary, and/or a zip code boundary.

In an alternative embodiment, the threshold radial distance 119 generated by the geospatially constrained social network 142 may be restricted to a shared apartment building (e.g., and/or an office building). In addition, it will be understood with those skilled in the art that the real-estate listing server 100 may be operate as a function of the geo-spatially constrained social network 142 (e.g., a neighborhood social network).

In addition, it will be understood that in some embodiments, the place-to-stay listing data 102 is generated by the police department 309C (e.g., and/or others of the emergency services 109) in the form of crime alerts, health alerts, fire alerts, and other emergency alerts and provided as a feed (e.g., a Real Simple Syndication (RSS) feed) to the geo-spatially constrained social network 142 for distribution to relevant ones of the claimed neighborhoods in the geo-spatially constrained social network 142. It will be understood that the place-to-stay listing data 102 may appear in a 'feed' provided to users of the geo-spatially constrained social network 142 (e.g., a private social network for neighbors) on their profile pages based on access control privileges set by the radial broadcast module 140 using the radial algorithm 240. For example, access to the place-to-stay listing data 102 may be limited to just a claimed neighborhood (e.g., as defined by neighborhood boundaries) and/or optionally adjacent neighborhoods.

In one embodiment, the geo-spatially constrained social network 142 may provide police departments and other municipal agencies with a separate login in which they can invite neighbors themselves, provide for a virtual neighborhood watch and emergency preparedness groups, and conduct high value crime and safety related discussions from local police and fire officials without requiring any technical integration. This may provide police departments and municipalities with a single channel to easily broadcast information across neighborhoods that they manage, and receive and track neighborhood level membership and activity to identify leaders of a neighborhood.

For example, communications defined from one broadcasting user to an adjacent neighborhood o may involve sharing information about a suspicious activity that might affect several neighborhoods, explaining about a lost pet that might have wandered into an adjoining neighborhood, to rally support from neighbors from multiple neighborhoods to address civic issues, to spread the word about events like local theater production or neighborhood garage sales, and/or to ask for advice or recommendations from the widest range of people in a community). In one embodiment, the geospatially constrained social network 142 may prevent self-promotional messages that are inappropriate (e.g., a user sending such messages may be suspended from the geospatially constrained social network using the crowd sourced moderation algorithm 204. In one embodiment, the user 106 may personalize nearby neighborhoods so that the user can choose exactly which nearby neighborhoods (if any) they wish to communicate with. The user 106 may be able to flag a neighborhood feeds from adjacent neighborhoods. In addition, leaders from a particular neighborhood may be able to communicate privately with leaders of an adjoining neighborhood to plan and organize on behalf of an entire constituency. Similarly, users 106 may be able to filter feeds to only display messages from the neighborhood that they reside in. The user 106 may be able to restrict posts (e.g., pushpin placements) only in the neighborhood they are presently in. In one embodiment, nearby neighbors may (or may not) be able to access profiles of adjacent neighborhoods.

It will also be understood that in some embodiments, that users may be 'verified through alternate means, for example through a utility bill verification (e.g., to verify that a user's address on a utility bill matches the residential address they seek to claim), a credit card verification (e.g., or debit card verification), a phone number verification (e.g., reverse phone number lookup), a privately-published access code (e.g., distributed to a neighborhood association president, and/or distributed at a neighborhood gathering), and a neighbor vouching method (e.g., in which an existing verified neighbor 'vouches' for a new neighbor as being someone that they personally know to be living in a neighborhood.

In one embodiment, the geospatially constrained social network 142 ensures a secure and trusted environment for a neighborhood website by requiring all members to verify their address. In this embodiment, verification may provide assurance the assurance that new members are indeed residing at the address they provided when registering for an account in the geo-spatially constrained social network 142. Once a neighborhood has launched out of pilot status, only members who have verified their address may be able access to their neighborhood website content.

It will be understood that among the various ways of verifying an address, a user of the geo-spatially constrained social network 142 may uses the following methods to verify the address of every member:

A. Postcard. The geo-spatially constrained social network 142 can send a postcard to the address listed on an account of the user 106 with a unique code printed on it (e.g., using the Fatmail postcard campaign). The code may allow the user 106 to log in and verify their account.

B. Credit or debit card. The geo-spatially constrained social network 142 may be able to verify a home address through a credit or debit card billing address.

In one embodiment, billing address may be confirmed without storing personally identifiable information and/or charging a credit card.

C. Home phone. If a user 106 has a landline phone, the user may receive an automated phone call from the geo-spatially constrained social network 142 that may provide with a unique code to verify an account of the user 106.

D. Neighborhood leader. A neighborhood leader of the geo-spatially constrained social network can use a verify neighbors feature of the geo-spatially constrained social network 142 to vouch for and verify neighbors.

E. Mobile phone. A user 106 may receive a call to a mobile phone associated with the user 106 to verify their account.

F. Neighbor invitations. A neighbor who is a verified member of the geo-spatially constrained social network 142 can vouch for, and may invite another neighbor to join the geo-spatially constrained social network 142. Accepting such an invitation may allow the user 106 to join the geo-spatially constrained social network 142 as a verified member, according to one embodiment.

H. Social Security Number (SSN). The geo-spatially constrained social network 142 can verify a home address when the user 106 provides the last 4 digits of a SSN (e.g., not stored by the geospatially constrained social network 142 for privacy reasons).

It will be also understood that in a preferred embodiment neighborhood boundaries defined by the radial distribution module 140 using the radial algorithm 140 may be constrained to work in neighborhoods having a threshold number of homes (e.g., 100 homes in a neighborhood) and more (e.g., up to thousands of homes) as this may be needed to reach the critical mass of active posters that is needed to help the geo-spatially constrained social network 142 succeed. In one embodiment, 'groups' may be creatable in smaller neighborhoods having fewer than the threshold number of homes for communications in micro-communities within a claimed neighborhood.

It will also be appreciated that in some embodiments, a device 104 may be a desktop computer, a laptop computer, and/or a non-transitory broadcasting module. In addition, it will be understood that the prepopulated data (e.g., preseeded data) described herein may not be created through data licensed from others, but rather may be user generated content of organically created profiles in the geo-spatial social network created by different users who have each verified their profiles.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structures and methods may be embodied using transistors, logic gates, and electrical circuits (e.g., application specific integrated (ASIC) circuitry and/or Digital Signal Processor (DSP) circuitry).

In addition, it will be appreciated that the various operations, processes, and methods disclosed herein may be embodied in a machine-readable medium and/or a machine accessible medium compatible with a data processing system. Accordingly, the specification and drawings are to be regarded in an illustrative rather than a restrictive sense.

What is claimed is:
1. A method of a short-term listing server comprising:
    validating that a place-to-stay listing data is associated with a verified user of the short-term listing server using a processor and a memory;
    verifying that a set of geospatial coordinates associated with the place-to-stay listing data are validated based on a claimed geospatial location of the place-to-stay listing data associated with the verified user of the short-term listing server;
    determining that a time stamp comprising any one of a creation date and a creation time of the place-to-stay listing data is acceptable based on a validation of the place-to-stay listing data of the claimed geospatial location of the verified user of the short-term listing server;

processing a payment associated with a renter of a space in a private residential home associated with the place-to-stay listing data through the short-term listing server;

determining a relative match between a clock associated with the short-term listing server and at least one of another clock of a data processing system of the verified user and a table of the short-term listing server to determine that the time stamp associated with the creation date and the creation time of the place-to-stay listing data is valid and therefore trustable; and automatically deleting a publishing of bookable dates now passed of the place-to-stay listing data associated with a host profile in a neighborhood area within a neighborhood boundary associated with the place-to-stay listing data of the verified user of the short-term listing server based on a requested expiration date.

2. The method of claim 1 further comprising:

automatically publishing the place-to-stay listing data on a set of user profiles having associated verified addresses in a threshold radial distance from the set of geospatial coordinates associated with the place-to-stay listing data of the verified user of the short-term listing server using a radial algorithm;

processing at least one of a listing criteria comprising at least one of a real estate type, a lot size, a square footage, a photograph, a video, a bedroom count, a room size, a description, a cost per month, a rental price, a leasing rate, a number of stories, and a location;

populating an availability chart when a real estate listing associated with the listing criteria is posted, wherein the availability chart includes at least one of a front door key delivery availability timing of the verified user, an on-home lockbox access key, and an occupancy availability of the real estate listing;

presenting the place-to-stay listing data as a real estate pushpin of the real estate listing in a geospatial map surrounding pre-populated residential and business listings in a surrounding vicinity, such that the real estate pushpin of the real estate listing is automatically presented on thea geospatial map in addition to being presented on the set of user profiles having associated verified addresses in the threshold radial distance from the set of geospatial coordinates associated with the place-to-stay listing data of the verified user of the short-term listing server, wherein the place-to-stay listing data is radially distributed through at least one of an on-page posting, an electronic communication, and a push notification delivered to desktop and mobile devices associated with users and their user profiles around an epicenter defined at the set of geospatial coordinates associated with the place-to-stay listing data to all subscribed user profiles in a circular geo-fenced area defined by the threshold distance from the set of geospatial coordinates associated with the place-to-stay listing data through the radial algorithm of a neighborhood broadcasting system that measures a distance away of each address associated with each user profile from a current geospatial location at the epicenter.

3. The method of claim 2 further comprising:

permitting the verified user to drag and drop the real estate pushpin on any location on the geospatial map, and automatically determining a latitude and a longitude associated with a placed location, and generating a for-rent view of the real estate in which the verified user offers the real estate for rent through the short-term listing server to other users in the threshold radial distance from the set of geospatial coordinates associated with the place-to-stay listing data of the verified user of the short-term listing server.

4. The method of claim 3 further comprising:

extracting the set of geospatial coordinates from a metadata associated with the place-to-stay listing data when verifying that the set of geospatial coordinates associated with the place-to-stay listing data are trusted based on the claimed geospatial location of the verified user of the short-term listing server.

5. The method of claim 1 further comprising:

geocoding a set of residential addresses each associated with a resident name in a neighborhood surrounding the data processing system; and prepopulating the set of residential addresses each associated with the resident name as the set of user profiles in the threshold radial distance from the claimed geospatial location of the verified user of the short-term listing server in a neighborhood curation system communicatively coupled with the short-term listing server.

6. The method of claim 5 further comprising:

permitting the verified user to submit reviews in each of the set of user profiles;

tracking submitted reviews through a rental listing system;

generating a reversible history journal associated with each of the set of user profiles such that reviews of the verified user can be undone on a modified user profile page;

determining an reviewing credibility of the verified user based on an review history of the verified user and a community contribution validation of the verified user by other users of the rental listing system; and automatically publishing the place-to-stay listing data to the set of user profiles having associated verified addresses in the threshold radial distance from the claimed geospatial location of the verified user of the short-term listing server using the radial algorithm.

7. The method of claim 6 further comprising:

processing a claim request of the verified user generating the place-to-stay listing data through the data processing system to be associated with an address of the rental listing system;

determining if a claimable neighborhood in the rental listing system is associated with a private neighborhood community in the claimable neighborhood of the rental listing system;

associating the verified user with the private neighborhood community in the claimable neighborhood of the rental listing system if the private neighborhood community has been activated by at least one of the verified user and a different verified user;

permitting the verified user to draw a set of boundary lines in a form of a geospatial polygon such that the claimable neighborhood in a geospatial region surrounding the claim request creates the private neighborhood community in the rental listing system if the private neighborhood community is inactive;

verifying the claim request of the verified user generating the place-to-stay listing data through the data processing system to be associated with a neighborhood address of the rental listing system when the address is determined to be associated with at least one of a work address and a residential address of the verified user; and simultaneously publishing the place-to-stay listing data on the private neighborhood community associated with the verified user generating the place-to-stay listing data through the data processing system in the threshold radial distance from the address associated with the claim request of the verified user of the rental listing system when automatically publishing the place-to-stay listing data on the set of user profiles having associated verified addresses in the threshold radial distance from the claimed geospatial location of the verified user of the short-term listing server based on a set of preferences of the verified user using the radial algorithm.

8. The method of claim 7 further comprising:

providing a summary data to the verified user generating the place-to-stay listing data through the data processing system of how many user profile pages were updated with an alert of the place-to-stay listing data when publishing the place-to-stay listing data in at least one of the private neighborhood community and the set of user profiles having associated verified addresses in the threshold radial distance from the claimed geospatial location of the verified user of the short-term listing server based on the set of preferences of the verified user.

9. The method of claim 8 further comprising:

live broadcasting the place-to-stay listing data to the different verified user and other verified users in at least one of the private neighborhood community and currently within the threshold radial distance from the current geospatial location through the short-term listing server using a multicast algorithm such that a live broadcast multicasts to a plurality of data processing systems associated with each of the different verified user and the other verified users simultaneously when the data processing system of the verified user generating the live-broadcast enables broadcasting of the place-to-stay listing data to any one of a geospatial vicinity around the data processing system of the verified user generating the live-broadcast and in any private neighborhood community in which the verified user has a non-transitory connection; and permitting the different verified user and the other verified users in at least one of the private neighborhood community to bi-directionally communicate with the verified user generating the live-broadcast through the short-term listing server, wherein any private neighborhood community in which the verified user has the non-transitory connection is at least one of the residential address of the verified user and the work address of the verified user that has been confirmed by the short-term listing server as being associated with the verified user, wherein the threshold distance is between 0.2 and 0.4 miles from the set of geospatial coordinates associated with the place-to-stay listing data to optimize a relevancy of the live-broadcast, and wherein the short-term listing server includes a crowd-sourced moderation algorithm in which multiple neighbors to a geospatial area determine what content contributed to the short-term listing server persists and which is deleted, wherein the short-term listing server permits users to mute messages of specific verified users to prevent misuse of the short-term listing server, wherein a real-estate listing server permits the place-to-stay listing data to be disseminated to adjacent neighborhoods that have been claimed by different users in a manner such that the place-to-stay listing data is optionally disseminated to the surrounding claimed neighborhoods based on a preference of the verified user, wherein a claimed neighborhood of the verified user is activated based on a minimum number of other verified users in the threshold radial distance that have been verified through a primary residential address associated with each of the other verified users through at least one of a post card verification, a utility bill verification, a privately-published access code, and a neighbor vouching method, wherein access to the place-to-stay listing data is restricted to the claimed neighborhood of the verified user, and wherein access to the place-to-stay listing data is denied to users having verified addresses outside the claimed neighborhood of the verified user.

* * * * *